United States Patent
Teranishi et al.

(10) Patent No.: US 7,940,343 B2
(45) Date of Patent: May 10, 2011

(54) LIQUID CRYSTAL DISPLAY DEVICE AND IMAGE DISPLAYING METHOD OF LIQUID CRYSTAL DISPLAY DEVICE

(75) Inventors: Yasuyuki Teranishi, Kanagawa (JP); Yoshiharu Nakajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 79 days.

(21) Appl. No.: 12/286,918

(22) Filed: Oct. 3, 2008

(65) Prior Publication Data

US 2009/0096947 A1    Apr. 16, 2009

(30) Foreign Application Priority Data

Oct. 15, 2007  (JP) ................ P2007-267376
Oct. 15, 2007  (JP) ................ P2007-267378

(51) Int. Cl.
*G02F 1/1333*    (2006.01)
(52) U.S. Cl. .......................... 349/38; 349/33
(58) Field of Classification Search .......... 349/38, 349/39, 41, 42, 56, 139, 140, 141, 143, 144, 349/104, 106, 103, 33
See application file for complete search history.

(56) References Cited

U.S. PATENT DOCUMENTS

| | | | |
|---|---|---|---|
| 6,226,058 B1 * | 5/2001 | Ohi | 349/38 |
| 2006/0066765 A1 * | 3/2006 | Koyama | 349/38 |
| 2006/0220033 A1 * | 10/2006 | Yamasaki | 257/79 |
| 2007/0069998 A1 * | 3/2007 | Naugler et al. | 345/81 |
| 2009/0096947 A1 * | 4/2009 | Teranishi et al. | 349/38 |

FOREIGN PATENT DOCUMENTS

JP    09-243995    9/1997

* cited by examiner

*Primary Examiner* — Brian M Healy
(74) *Attorney, Agent, or Firm* — Robert J. Depke; Rockey, Depke & Lyons, LLC

(57) ABSTRACT

The present invention provides a liquid crystal display device for displaying a desired image by a display unit, the display unit being formed by sandwiching a liquid crystal layer between a thin film transistor substrate and a CF substrate and arranging liquid crystal cells formed by the liquid crystal layer in a form of a matrix, wherein the thin film transistor substrate is created by disposing at least a transistor used to drive a liquid crystal cell and a pixel electrode of the liquid crystal cell on an insulating substrate, and a part or all of a storage capacitor of an adjacent liquid crystal cell is created in a layer below the pixel electrode with a shield layer interposed between the pixel electrode and the storage capacitor.

12 Claims, 35 Drawing Sheets

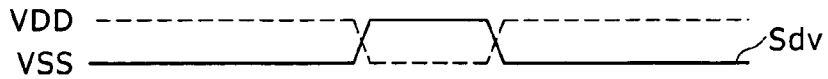
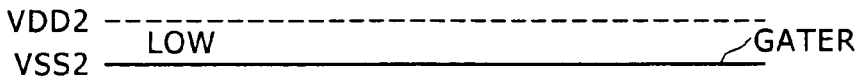
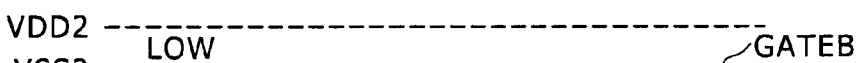
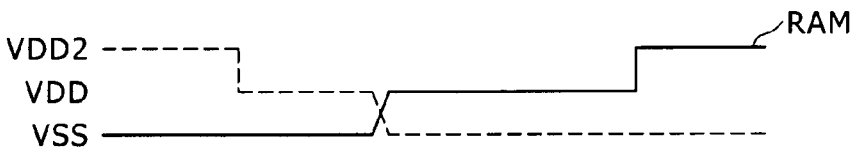
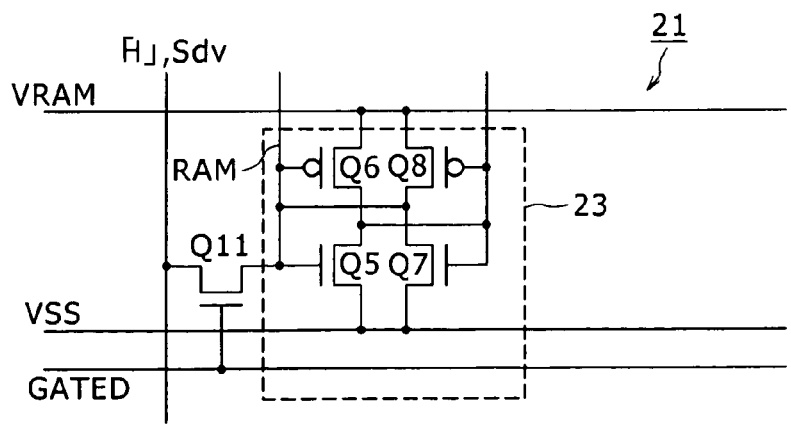

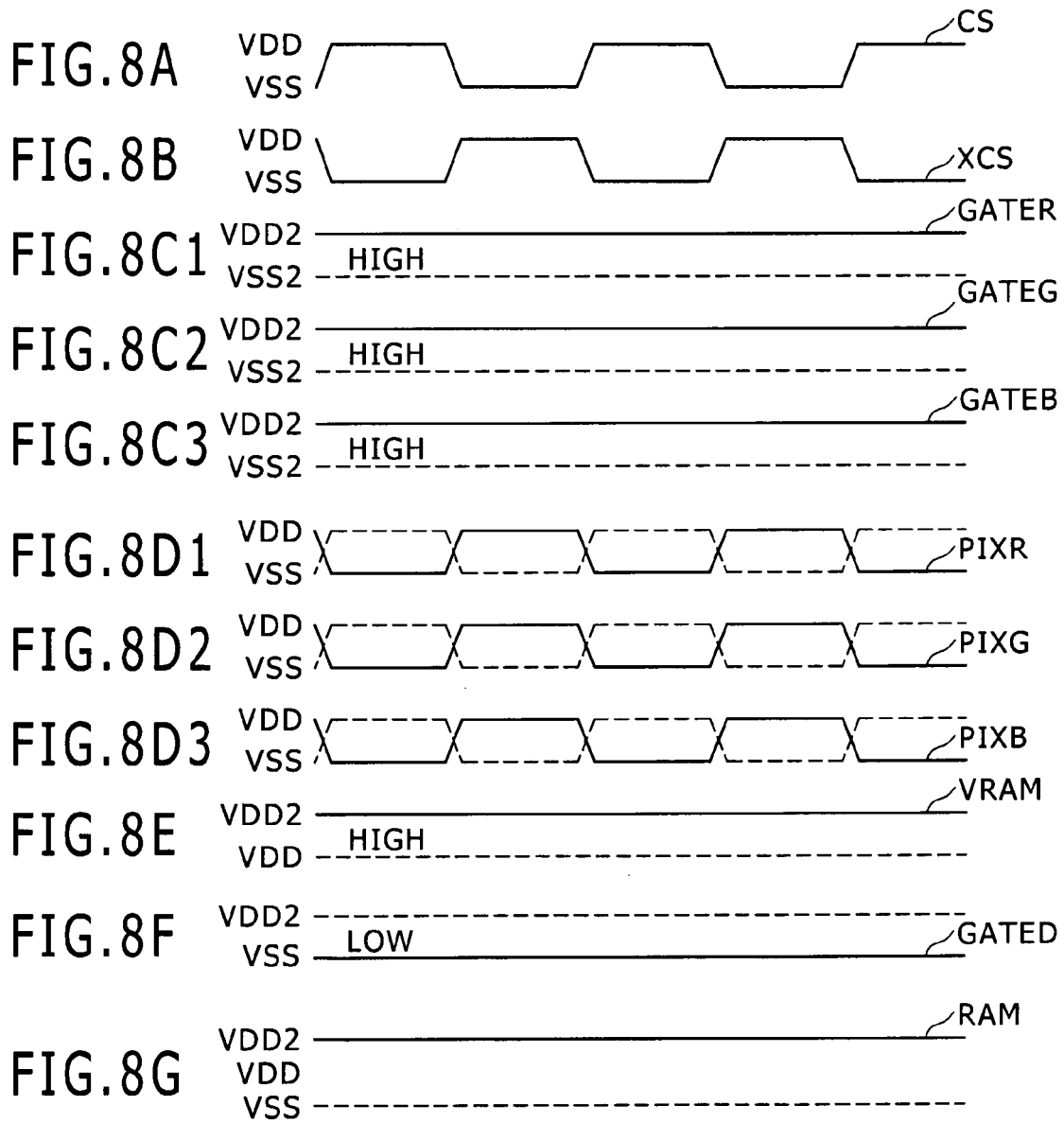

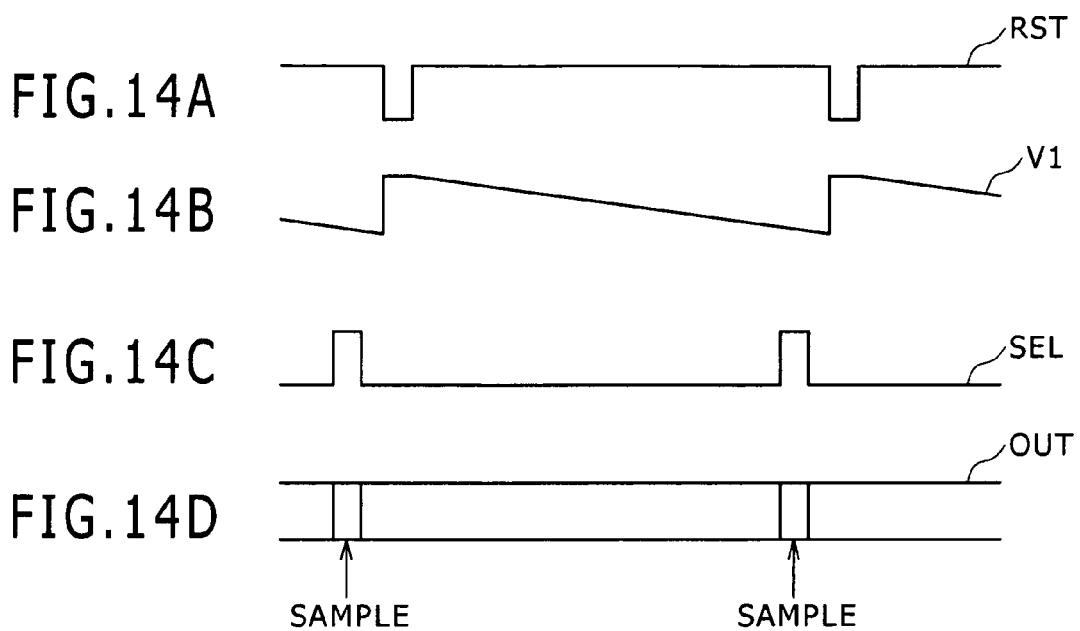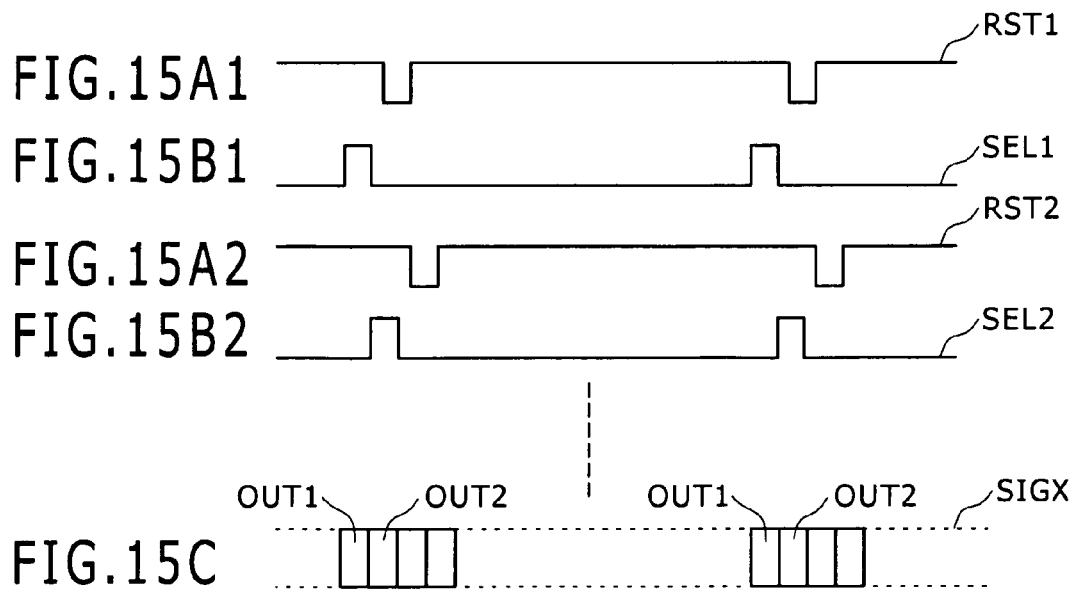

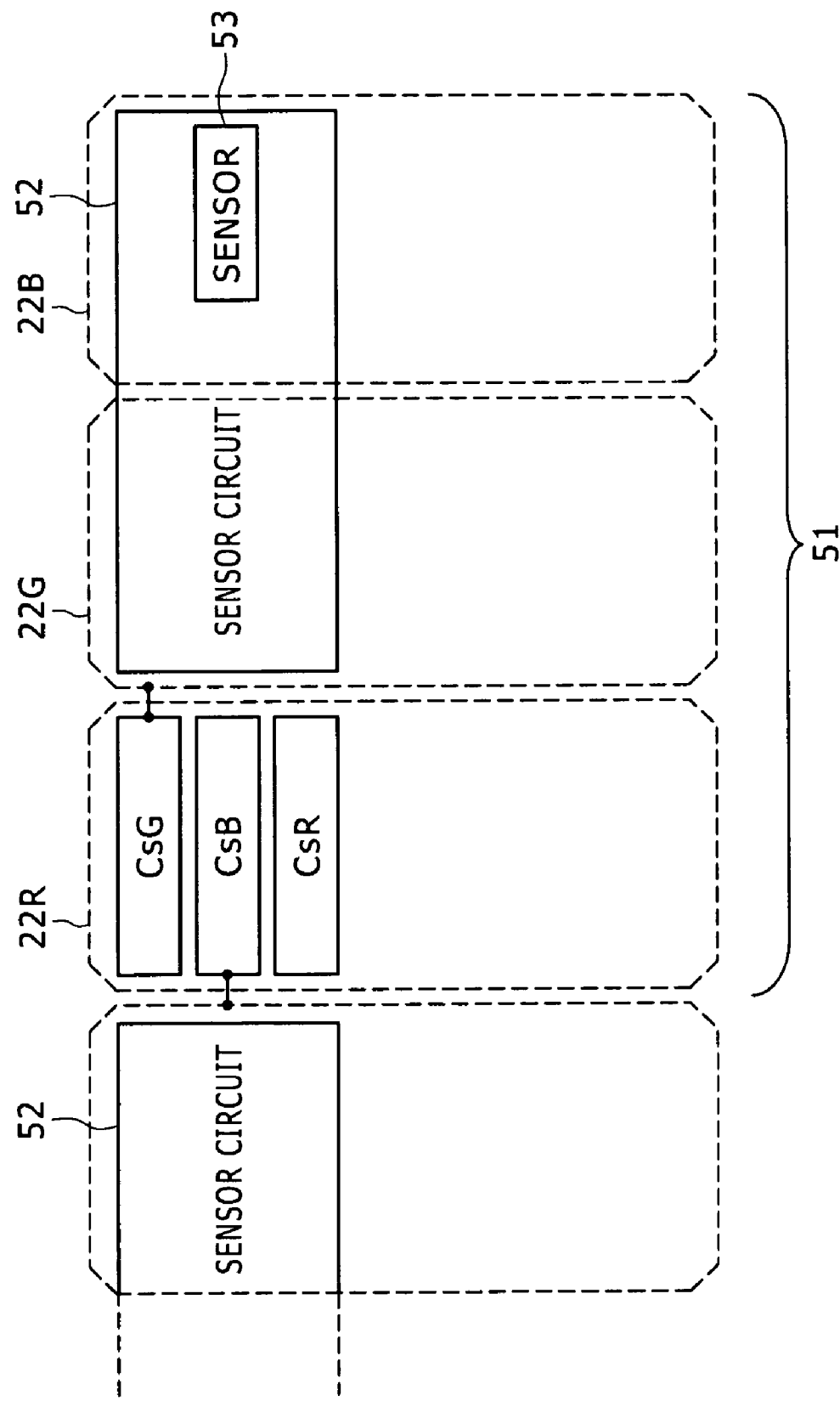

FIG.25B1 
FIG.25B2 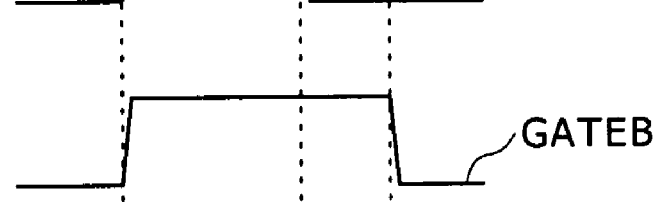
FIG.25B3 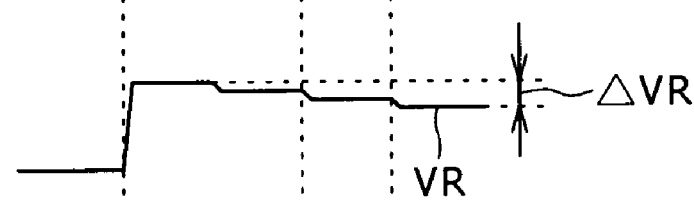
FIG.25C1 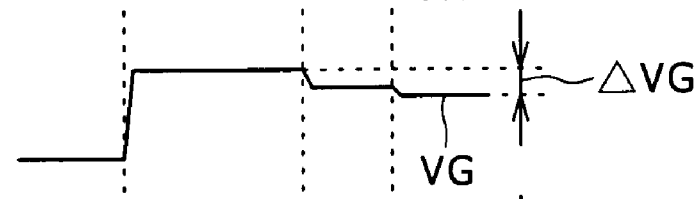
FIG.25C2 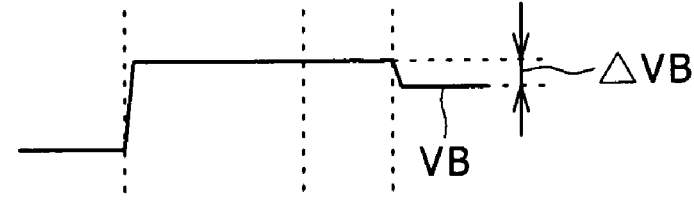
FIG.25C3

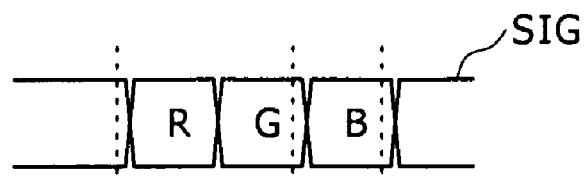
FIG.29A
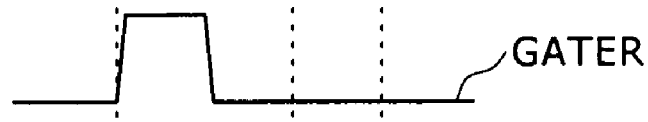
FIG.29B1
FIG.29B2
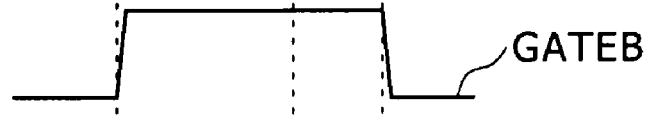
FIG.29B3
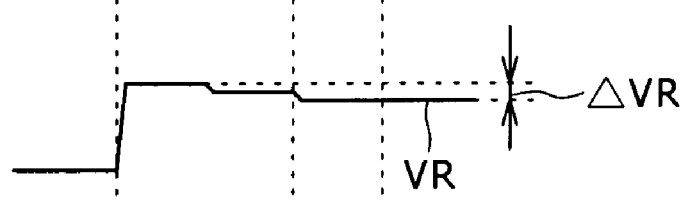
FIG.29C1
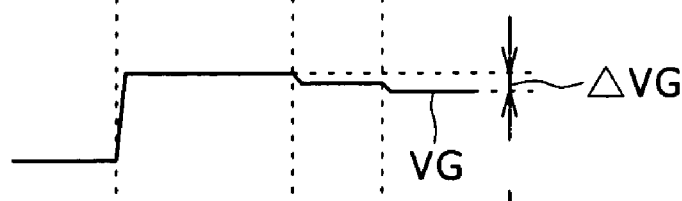
FIG.29C2
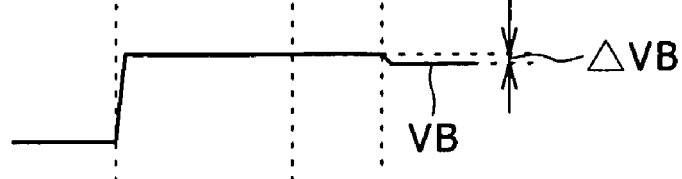
FIG.29C3

FIG.30B1 
FIG.30B2 
FIG.30B3 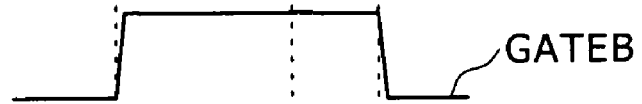
FIG.30C1 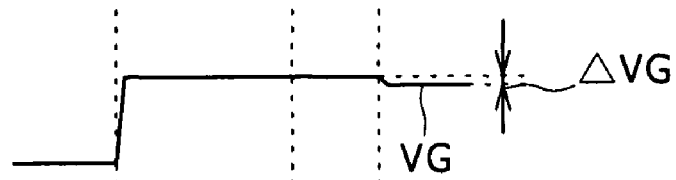
FIG.30C2 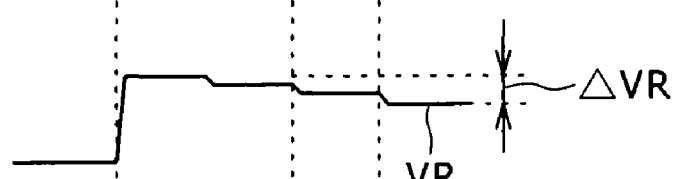
FIG.30C3 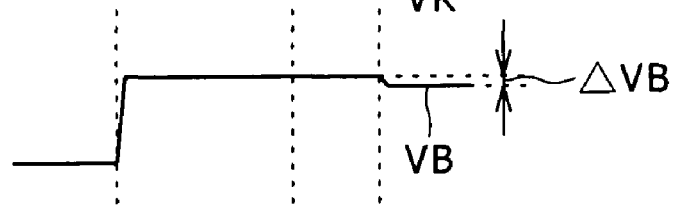

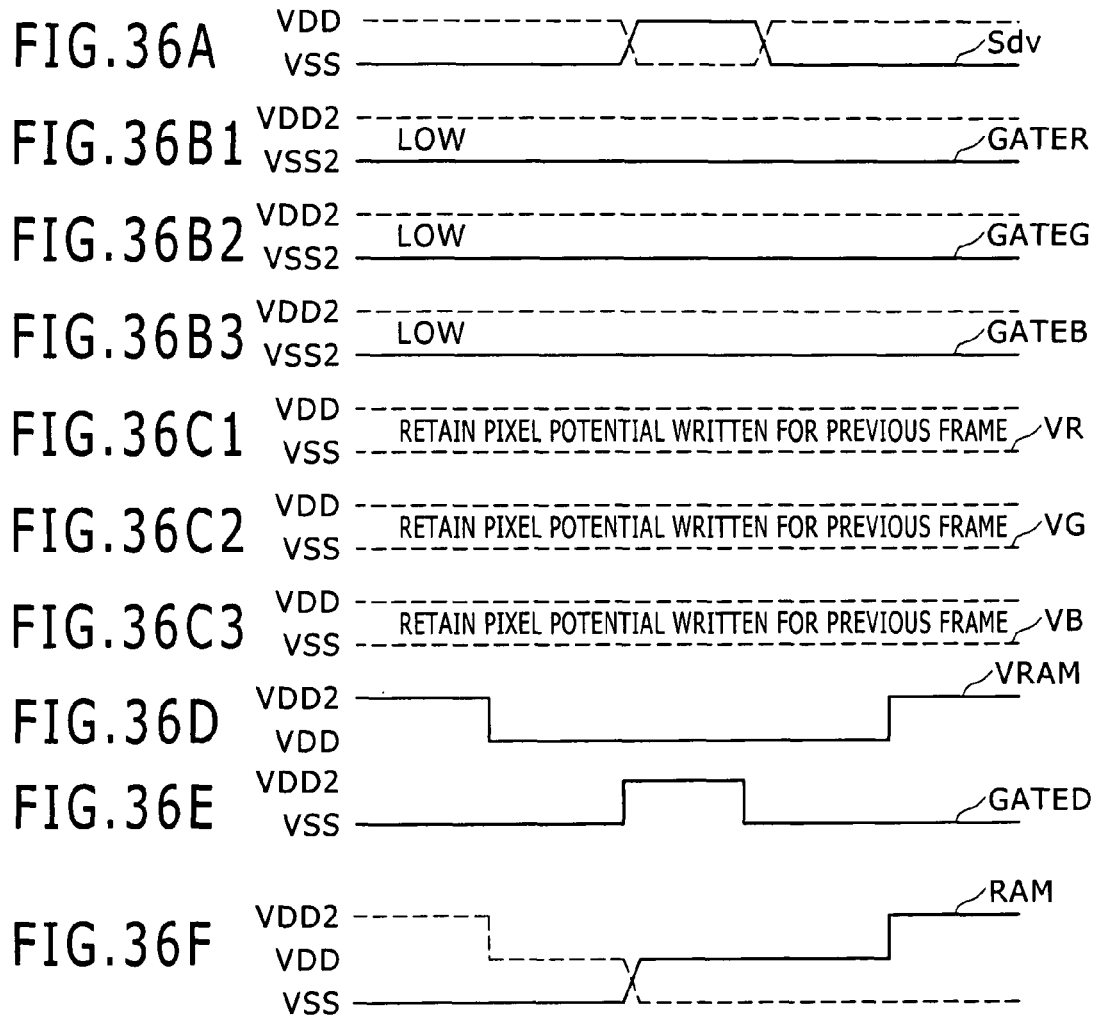
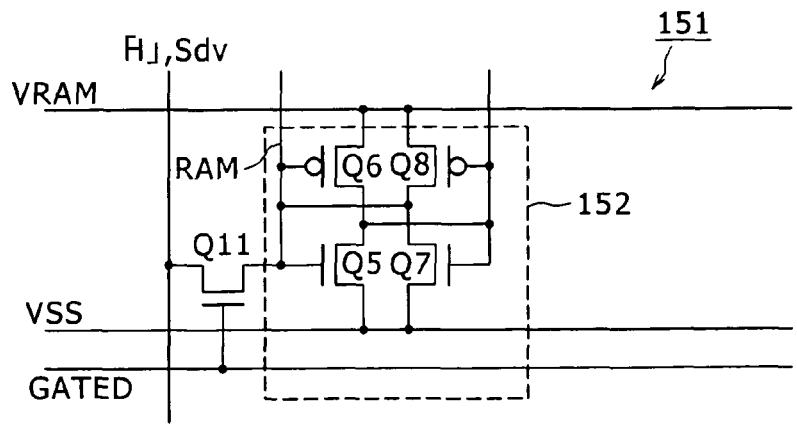

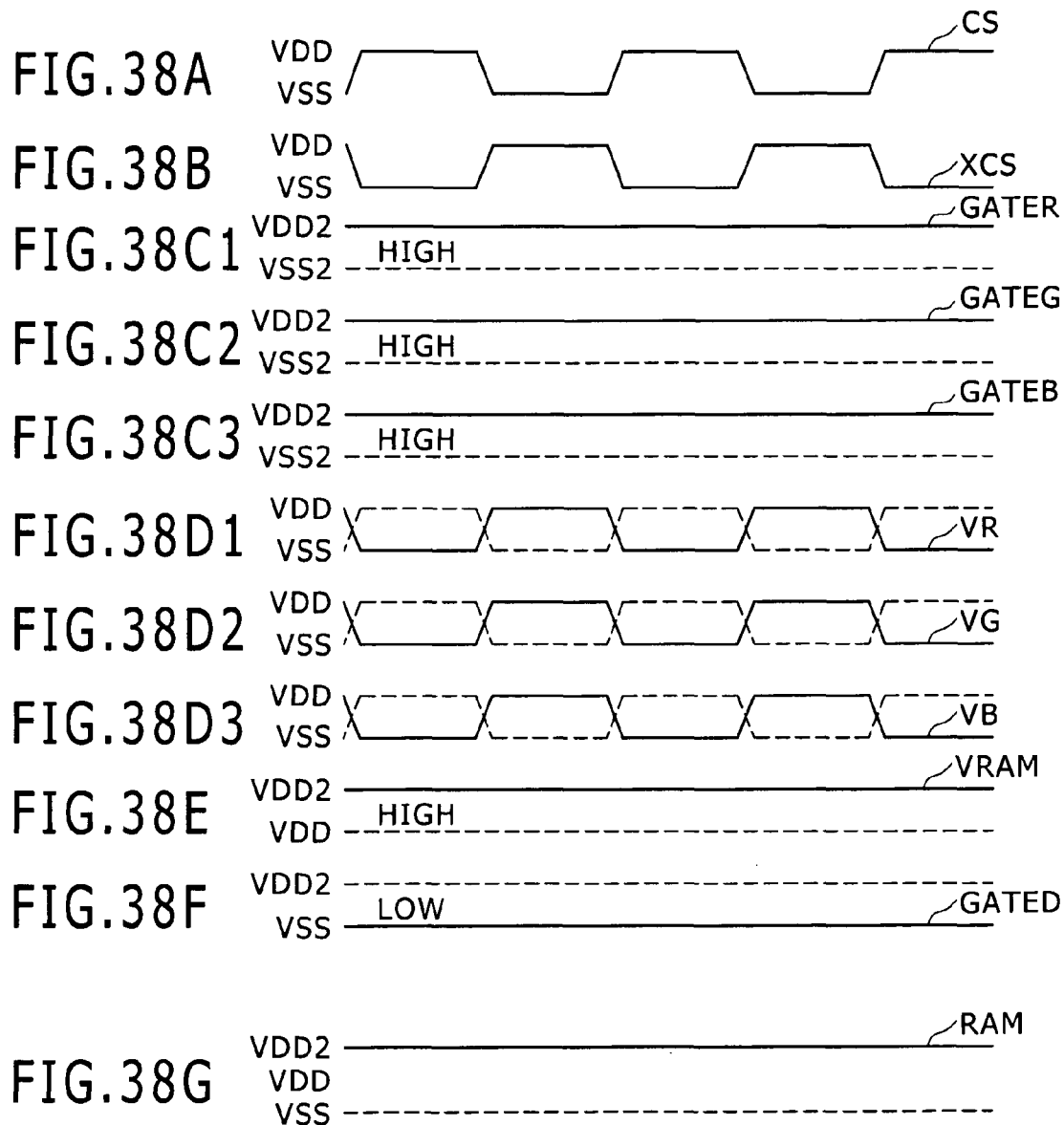

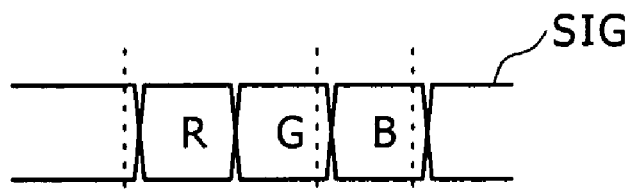
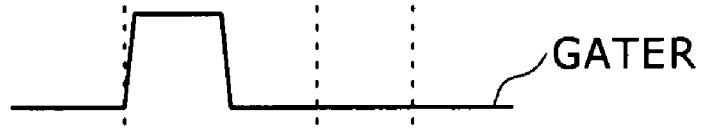
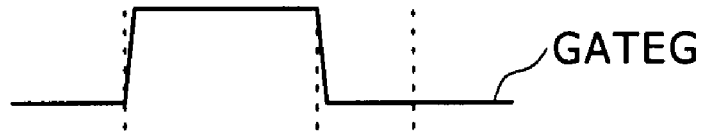
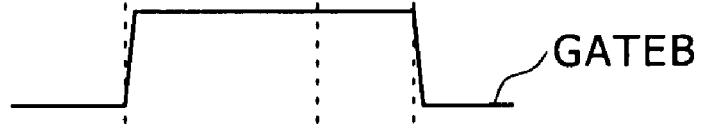
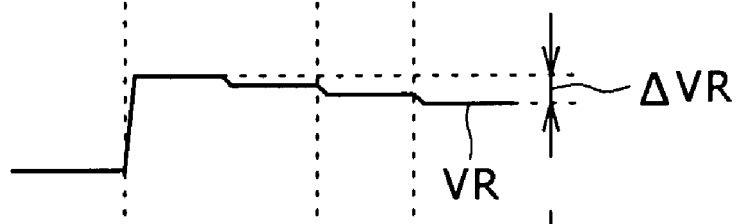
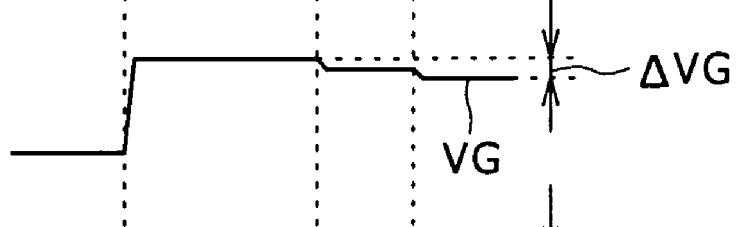
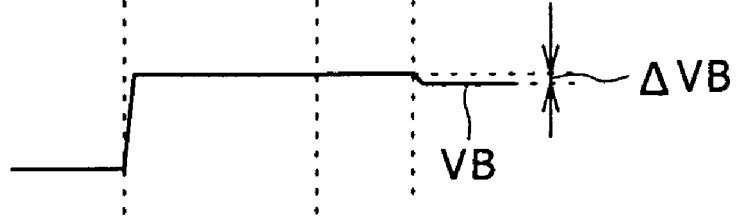

LIQUID CRYSTAL DISPLAY DEVICE AND IMAGE DISPLAYING METHOD OF LIQUID CRYSTAL DISPLAY DEVICE

CROSS REFERENCES TO RELATED APPLICATIONS

The present invention contains subject matter related to Japanese Patent Application JP 2007-267376 and JP 2007-267378, filed in the Japan Patent Office on Oct. 15, 2007, the entire contents of which being incorporated herein by reference.

BACKGROUND OF THE INVENTION

1. Field of the Invention

The present invention relates to a liquid crystal display device and an image displaying method of the liquid crystal display device, and is for example applicable to a liquid crystal display device that switches operation between an analog driving system and a memory system. The present invention makes it possible to secure a necessary storage capacitor sufficiently even when an area in which the storage capacitor can be disposed is small, by creating the storage capacitor of an adjacent liquid crystal cell in a layer below a pixel electrode with a shield layer interposed between the storage capacitor and the pixel electrode, or by creating the storage capacitor of a liquid crystal cell in a layer below a pixel electrode by laminating counter electrodes in three layers or more. In addition, the present invention relates to a liquid crystal display device, and is particularly applicable to a liquid crystal display device based on a so-called intra-pixel selector system.

The present invention prevents application of a direct-current electric field to a liquid crystal between a plurality of liquid crystal cells assigned to one selector by the intra-pixel selector system, by making a setting so as to increase a capacitance between the pixel electrode of a liquid crystal cell to which a pixel electrode potential is set later among the plurality of liquid crystal cells assigned to the one selector and a scanning line for a corresponding gate signal.

2. Description of the Related Art

In related art, the display unit of a liquid crystal display device is formed by arranging pixels formed by liquid crystal cells in the form of a matrix. In the liquid crystal display device, each liquid crystal cell is provided with a TFT (Thin Film Transistor) used to drive the liquid crystal cell. A horizontal driving unit and a vertical driving unit arranged on the periphery of the display unit control the operation of this TFT to display a desired image on the display unit. In related art, the liquid crystal display device is created by sandwiching a liquid crystal layer between a TFT substrate having the TFT disposed thereon and a CF (Color Filter) substrate having a color filter disposed thereon. The liquid crystal cells are arranged in the form of a matrix according to a layout of the TFT substrate and the CF substrate, and the horizontal driving unit and the vertical driving unit are arranged on the periphery of the display unit on the TFT substrate.

FIG. 19 is a plan view of the layout of the TFT substrate. The TFT substrate 1 and the CF substrate of the liquid crystal display device are laid out such that the liquid crystal cells are respectively formed in rectangular areas AR2. In addition, in the TFT substrate 1, for example, areas AR3 at corner parts of the respective rectangular areas AR2 are assigned as areas for disposing TFTs, and a storage capacitor Cs for supplying a lack of capacitance of each liquid crystal cell is provided in all or a part of a remaining area of each rectangular area AR2.

As shown in FIG. 20, in the TFT substrate 1, a TFT is created by forming a gate layer 5 and the like on a transparent insulating substrate 4 of glass or the like, and thereafter an insulting film 6 is created. Next, in the TFT substrate 1, the TFT is wired by creating a wiring layer 7 of polysilicon. Next, an insulating film 8 is created, and thereafter a wiring layer 9 of aluminum or the like is created. Next, an insulating layer 10 is created, and thereafter a pixel electrode 11 is created. The pixel electrode 11 is connected to the TFT by the wiring layer 9 below the pixel electrode 11. The TFT substrate 1 has an alignment layer not shown in the figure created on the pixel electrode 11. Incidentally, in a case of an ISP mode or the like, the TFT substrate 1 has a common electrode disposed in a layer below the pixel electrode 11.

As shown in FIG. 21, in related art, in the TFT substrate 1, counter electrodes forming a storage capacitor Cs are respectively created by the gate layer 5 and the wiring layer 7. The counter electrode on the wiring layer 7 side is connected to the pixel electrode 11. The electrode on the gate layer 5 side of the storage capacitor Cs is supplied with a driving signal CS involved in a precharge process, and maintained at the potential of the driving signal CS.

In related art, the liquid crystal display device sequentially changes the voltage of a signal line disposed in the display unit to a gradation voltage indicating the gradation of each pixel, and sequentially sets the voltage of each pixel electrode 11 to the voltage of the signal line by controlling the TFT of each liquid crystal cell in such a manner as to be interlocked with the changing of the voltage of the signal line. The liquid crystal display device thereby sets the gradation of each pixel. Incidentally, this driving system will hereinafter be referred to as an analog driving system.

In regard to such a liquid crystal display device, Japanese Patent Laid-Open No. Hei 9-243995 discloses a constitution in which a memory unit is provided for each pixel and each pixel is driven according to a recording of the memory unit. This system will hereinafter be referred to as a memory system. This memory system makes it possible to omit a gradation setting process for each pixel once the gradation of each pixel is set, and can thus reduce power consumption.

It is considered that in a liquid crystal display device based on the memory system, when a plurality of pixels share a memory, the number of memories of the liquid crystal display device as a whole can be reduced, and the constitution of the liquid crystal display device as a whole can be simplified. However, when a plurality of pixels share a memory, an imbalance occurs between the plurality of pixels in the layout of a TFT substrate, and an area in which a storage capacitor can be created in a particular pixel is reduced. Consequently, the liquid crystal display device has a problem in that it is difficult to provide a sufficient opening and secure a storage capacitor necessary in the particular pixel.

Besides, in the liquid crystal display device, a spacer is disposed at a predetermined pixel pitch, and a gap between the TFT substrate and a CF substrate is secured by this spacer. Hence, in the liquid crystal display device, an imbalance also occurs in the layout of the TFT substrate due to the disposition of the spacer, and an area in which a storage capacitor can be created in a particular pixel having the spacer disposed therein is reduced. Consequently, in this case, the liquid crystal display device has a problem in that it is difficult to provide a sufficient opening and secure a storage capacitor necessary in the particular pixel due to an increase in resolution or the like.

As a method for solving this problem, the storage capacitors of these particular pixels may be created in an adjacent pixel, so that the layout of storage capacitors is made unbalanced with respect to the arrangement of consecutive pixels. However, in this case, as shown in FIG. 22, a wiring layer 7 in a layer below a pixel electrode 11 in a pixel in question is maintained at the pixel potential of the adjacent pixel. Capacitive coupling between the pixel electrode 11 and the wiring layer 7 changes the pixel potential of the pixel in question, so that a correct gradation cannot be displayed.

Further, in the first place, an area where a storage capacitor can be disposed in each pixel is reduced due to an increase in resolution of the liquid crystal display device even when such an imbalance in the layout of the TFT substrate does not occur. In this case, it is difficult to secure a necessary storage capacitor in all pixels.

SUMMARY OF THE INVENTION

The present invention has been made in view of the above points. It is desirable to propose a liquid crystal display device and an image displaying method of the liquid crystal display device that can secure a necessary storage capacitor sufficiently even when an area where the storage capacitor can be disposed is small. It is also desirable to propose a liquid crystal display device that can prevent application of a direct-current electric field to a liquid crystal when each liquid crystal cell is driven by an intra-pixel selector system.

According to a first embodiment of the present invention, there is provided a liquid crystal display device for displaying a desired image by a display unit, the display unit being formed by sandwiching a liquid crystal layer between a TFT substrate and a CF substrate and arranging liquid crystal cells formed by the liquid crystal layer in a form of a matrix, wherein the TFT substrate is created by disposing at least a transistor used to drive a liquid crystal cell and a pixel electrode of the liquid crystal cell on an insulating substrate, and a part or all of a storage capacitor of an adjacent liquid crystal cell is created in a layer below the pixel electrode with a shield layer interposed between the pixel electrode and the storage capacitor.

According to a second embodiment of the present invention, there is provided a liquid crystal display device for displaying a desired image by a display unit, the display unit being formed by sandwiching a liquid crystal layer between a TFT substrate and a CF substrate and arranging liquid crystal cells formed by the liquid crystal layer in a form of a matrix, wherein the TFT substrate is created by disposing at least a transistor used to drive a liquid crystal cell and a pixel electrode of the liquid crystal cell on an insulating substrate, and a storage capacitor of the liquid crystal cell is created by a first counter electrode, a second counter electrode connected to the pixel electrode, and a third counter electrode connected to the first counter electrode in a layer below the pixel electrode.

According to a third embodiment of the present invention, there is provided an image displaying method of a liquid crystal display device for displaying a desired image by a display unit, the display unit being formed by sandwiching a liquid crystal layer between a TFT substrate and a CF substrate and arranging liquid crystal cells formed by the liquid crystal layer in a form of a matrix, the image displaying method including the steps of: forming the TFT substrate by disposing at least a transistor used to drive a liquid crystal cell and a pixel electrode of the liquid crystal cell on an insulating substrate; and creating a part or all of a storage capacitor of an adjacent liquid crystal cell in a layer below the pixel electrode with a shield layer interposed between the pixel electrode and the storage capacitor.

According to a fourth embodiment of the present invention, there is provided an image displaying method of a liquid crystal display device for displaying a desired image by a display unit, the display unit being formed by sandwiching a liquid crystal layer between a TFT substrate and a CF substrate and arranging liquid crystal cells formed by the liquid crystal layer in a form of a matrix, the image displaying method including the steps of: forming the TFT substrate by disposing at least a transistor used to drive a liquid crystal cell and a pixel electrode of the liquid crystal cell on an insulating substrate; and creating a storage capacitor of the liquid crystal cell by a first counter electrode, a second counter electrode connected to the pixel electrode, and a third counter electrode connected to the first counter electrode in a layer below the pixel electrode.

According to a fifth embodiment of the present invention, there is provided a liquid crystal display device for displaying a desired image by a display unit formed by sequentially arranging a basic unit, wherein the basic unit includes a plurality of liquid crystal cells and a selector for sequentially setting gradations of the plurality of liquid crystal cells by sequentially setting pixel electrodes of the plurality of liquid crystal cells to a setting of a signal line by a transistor performing on-off operation according to a gate signal, and a setting is made so as to increase a capacitance between the pixel electrode of a liquid crystal cell to which a gradation is set later among the plurality of liquid crystal cells and a scanning line for the corresponding gate signal.

According to the constitution of the first embodiment or the third embodiment of the present invention, the storage capacitor of the adjacent liquid crystal cell can be disposed in a layer below the pixel electrode while effectively avoiding effect of pixel potential of the adjacent liquid crystal cell by the shield layer. Hence, when an area where a storage capacitor can be disposed in a particular liquid crystal cell is small due to an imbalance in layout or the like, a necessary storage capacitor can be secured by disposing the storage capacitor of the particular liquid crystal cell in an adjacent liquid crystal cell.

In addition, according to the constitution of the second embodiment or the fourth embodiment of the present invention, a storage capacitor having a large capacitance can be created in a small area by laminating the counter electrodes. Hence, when an area where a storage capacitor can be disposed is small in all pixels due to an increase in resolution, for example, a necessary storage capacitor can be secured.

In addition, according to the constitution of the fifth embodiment of the present invention, by increasing a capacitance between the pixel electrode of a liquid crystal cell to which a gradation is set later and whose change in pixel electrode voltage due to gate coupling is small and the scanning line for the corresponding gate signal, the change in pixel electrode voltage due to the gate coupling can be increased. It is thus possible to reduce differences between changes in voltage of pixel electrodes in a plurality of liquid crystal cells assigned to one selector, and prevent application of a direct-current electric field to a liquid crystal in the plurality of liquid crystal cells.

According to the present invention, it is possible to secure a necessary storage capacitor sufficiently even when an area in which the storage capacitor can be disposed is small. In addition, according to the present invention, it is possible to prevent application of a direct-current electric field to a liquid crystal when each liquid crystal cell is driven by an intra-pixel selector system.

BRIEF DESCRIPTION OF THE DRAWINGS

FIGS. 4A, 4B1, 4B2, 4B3, 4C1, 4C2, 4C3, 4D, 4E, and 4F are time charts of assistance in explaining operation of the basic unit of FIG. 3;

FIGS. 6A, 6B1, 6B2, 6B3, 6C1, 6C2, 6C3, 6D, 6E, and 6F are time charts of assistance in explaining setting of a memory unit in the basic unit of FIG. 3;

FIG. 7 is a connection diagram of assistance in explaining the setting of the memory unit in the basic unit of FIG. 3;

FIGS. 8A, 8B, 8C1, 8C2, 8C3, 8D1, 8D2, 8D3, 8E, 8F, and 8G are time charts of assistance in explaining operation of the basic unit of FIG. 3 by a memory system;

FIGS. 14A, 14B, 14C, and 14D are time charts of assistance in explaining the operation of the sensor unit in the basic unit of FIG. 12;

FIGS. 15A1, 15B1, 15A2, 15B2, and 15C are time charts of assistance in explaining operation of basic units in the liquid crystal display device of FIG. 11;

FIG. 16 is a plan view of a layout of a TFT substrate in the liquid crystal display device of FIG. 11;

FIGS. 25A, 25B1, 25B2, 25B3, 25C1, 25C2, and 25C3 are time charts of assistance in explaining operation of the basic unit of FIG. 23;

FIGS. 29A, 29B1, 29B2, 29B3, 29C1, 29C2, and 29C3 are time charts of assistance in explaining effects of gate coupling in a liquid crystal display device according to a ninth embodiment of the present invention;

FIGS. 30A, 30B1, 30B2, 30B3, 30C1, 30C2, and 30C3 are time charts of assistance in explaining effects of gate coupling in an example different from FIGS. 29A to 29C3;

FIGS. 34A, 34B1, 34B2, 34B3, 34C1, 34C2, 34C3, 34D, 34E, and 34F are time charts of assistance in explaining operation of the basic unit of FIG. 33 in the analog driving system;

FIGS. 36A, 36B1, 36B2, 36B3, 36C1, 36C2, 36C3, 36D, 36E, and 36F are time charts of assistance in explaining operation at a time of setting of a memory unit in the basic unit of FIG. 33;

FIG. 37 is a connection diagram of assistance in explaining the operation at the time of setting of the memory unit in the basic unit of FIG. 33;

FIGS. 38A, 38B, 38C1, 38C2, 38C3, 38D1, 38D2, 38D3, 38E, 38F, and 38G are time charts of assistance in explaining operation of the basic unit of FIG. 33 by the memory system;

FIGS. 41A, 41B1, 41B2, 41B3, 41C1, 41C2, and 41C3 are time charts of assistance in explaining operation of the basic unit of FIG. 40;

FIGS. 43A, 43B1, 43B2, 43B3, 43C1, 43C2, and 43C3 are time charts of assistance in explaining gate coupling in the basic unit of FIG. 40.

DETAILED DESCRIPTION OF PREFERRED EMBODIMENTS

Figure 1:
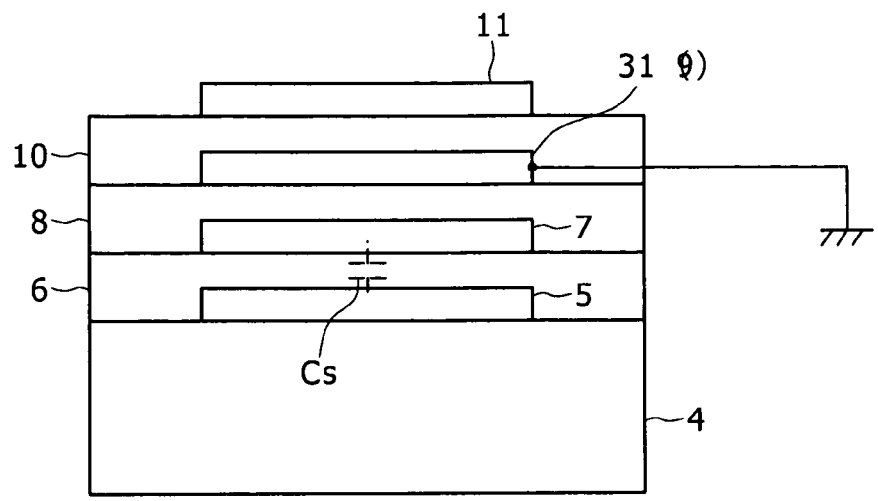
FIG. 1 is a sectional view of a constitution of a TFT substrate in a liquid crystal display device according to a first embodiment of the present invention.

Preferred embodiments of the present invention will hereinafter be described in detail referring to the drawings as appropriate.

First Embodiment (1) Constitution of Embodiment

Figure 2:
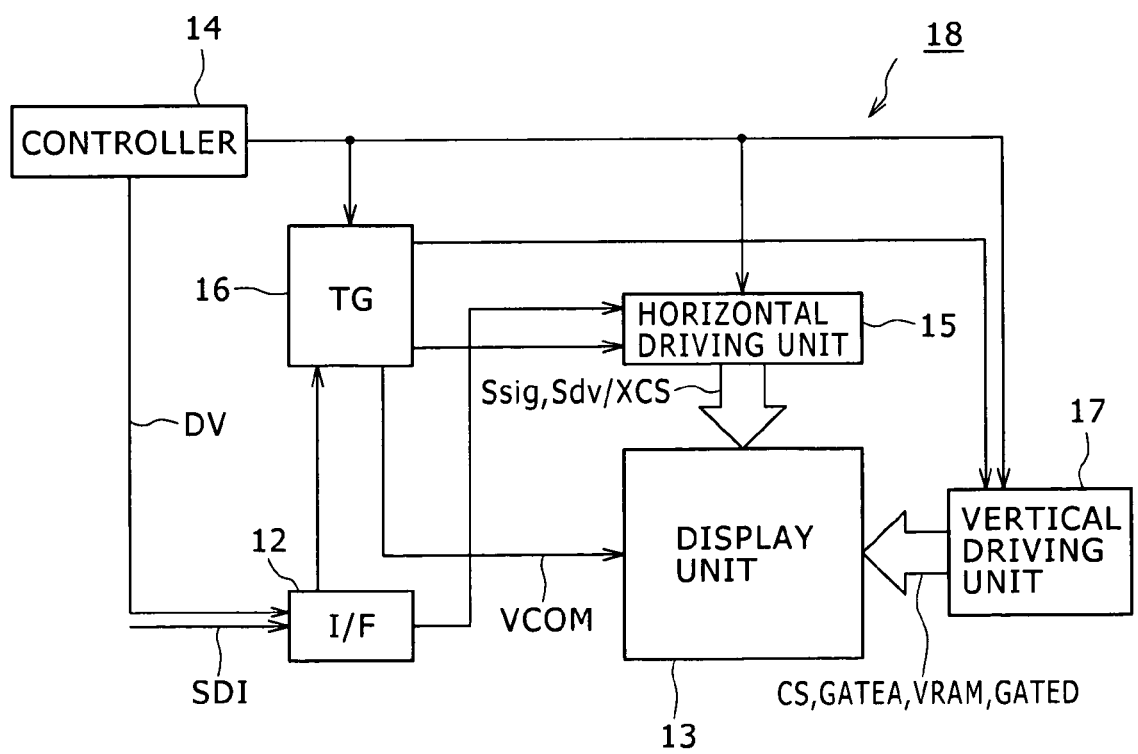
FIG. 2 is a block diagram showing the liquid crystal display device according to the first embodiment of the present invention.

FIG. 2 is a block diagram showing a liquid crystal display device according to a first embodiment of the present invention. This liquid crystal display device 18 for example displays a moving image or a still image based on video data output from a tuner unit, an external device or the like not shown in the figure on a display unit 13 by an analog driving system, and displays various menu images and the like on the display unit 13 by a memory system.

In this liquid crystal display device 18, an interface (I/F) 12 is supplied with image data SDI formed by serial data sequentially indicating the gradation of each pixel and various timing signals synchronized with the image data SDI. Incidentally, the image data SDI is image data to be displayed on the display unit 13 by the analog driving system. In addition, the interface 12 is supplied from a controller 14 with binary image data DV to be displayed on the display unit 13 by the memory system. The interface 12 outputs the image data SDI and DV and the various timing signals input to the interface 12 to respective parts under control of the controller 14.

A timing generator (TG) 16 under control of the controller 14 generates various timing signals necessary for the memory system and the analog driving system, and then outputs the various timing signals to a horizontal driving unit 15 and a vertical driving unit 17. The timing generator 16 also generates a driving power VCOM for a common electrode of liquid crystal cells, and then outputs the driving power VCOM (Common Voltage) to the display unit 13. Incidentally, the display unit 13 in the present embodiment may be a reflective type, a transmissive type, or a combined type of a reflective type and a transmissive type.

The horizontal driving unit 15 switches operation between the analog driving system and the memory system under control of the controller 14. In the analog driving system, the horizontal driving unit 15 sequentially distributes the image data SDI input from the interface 12 to each signal line SIG, subjects the image data SDI to digital-to-analog conversion processing, and generates a driving signal Ssig for each signal line SIG on the basis of field reversal, frame reversal, line reversal, or the like. The horizontal driving unit 15 in the analog driving system outputs the driving signal Ssig to each signal line SIG of the display unit 13.

The horizontal driving unit 15 in the memory system outputs a driving signal Sdv corresponding to the logical value of the binary image data DV output from the controller 14 to a corresponding signal line SIG, and thereafter outputs a predetermined driving signal XCS to the signal line.

The vertical driving unit 17 switches operation between the analog driving system and the memory system under control of the controller 14. The vertical driving unit 17 outputs a predetermined driving signal to a scanning line of the display unit 13.

Figure 3:
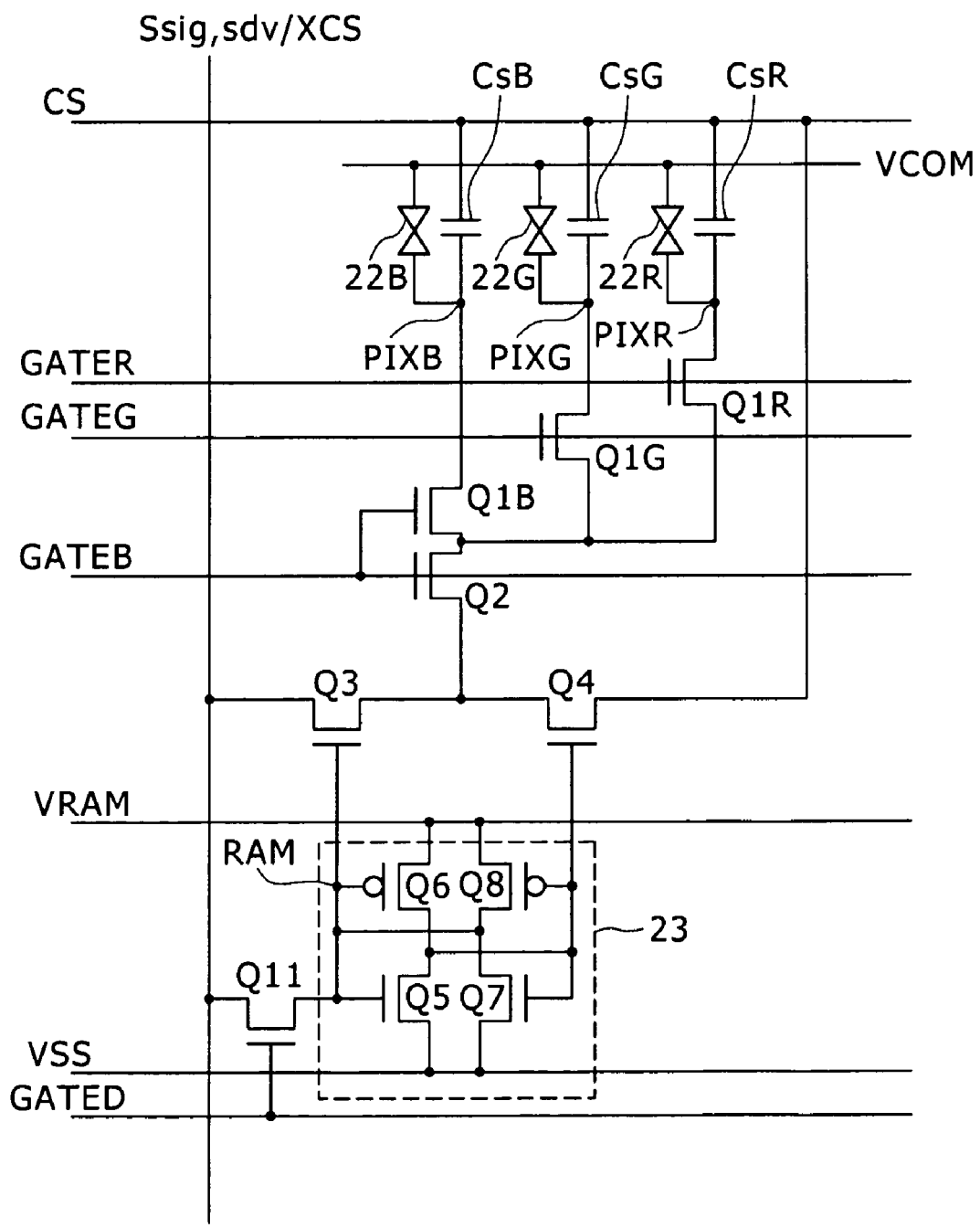
FIG. 3 is a connection diagram showing a basic unit of the liquid crystal display device of FIG. 2.
Figure 4:
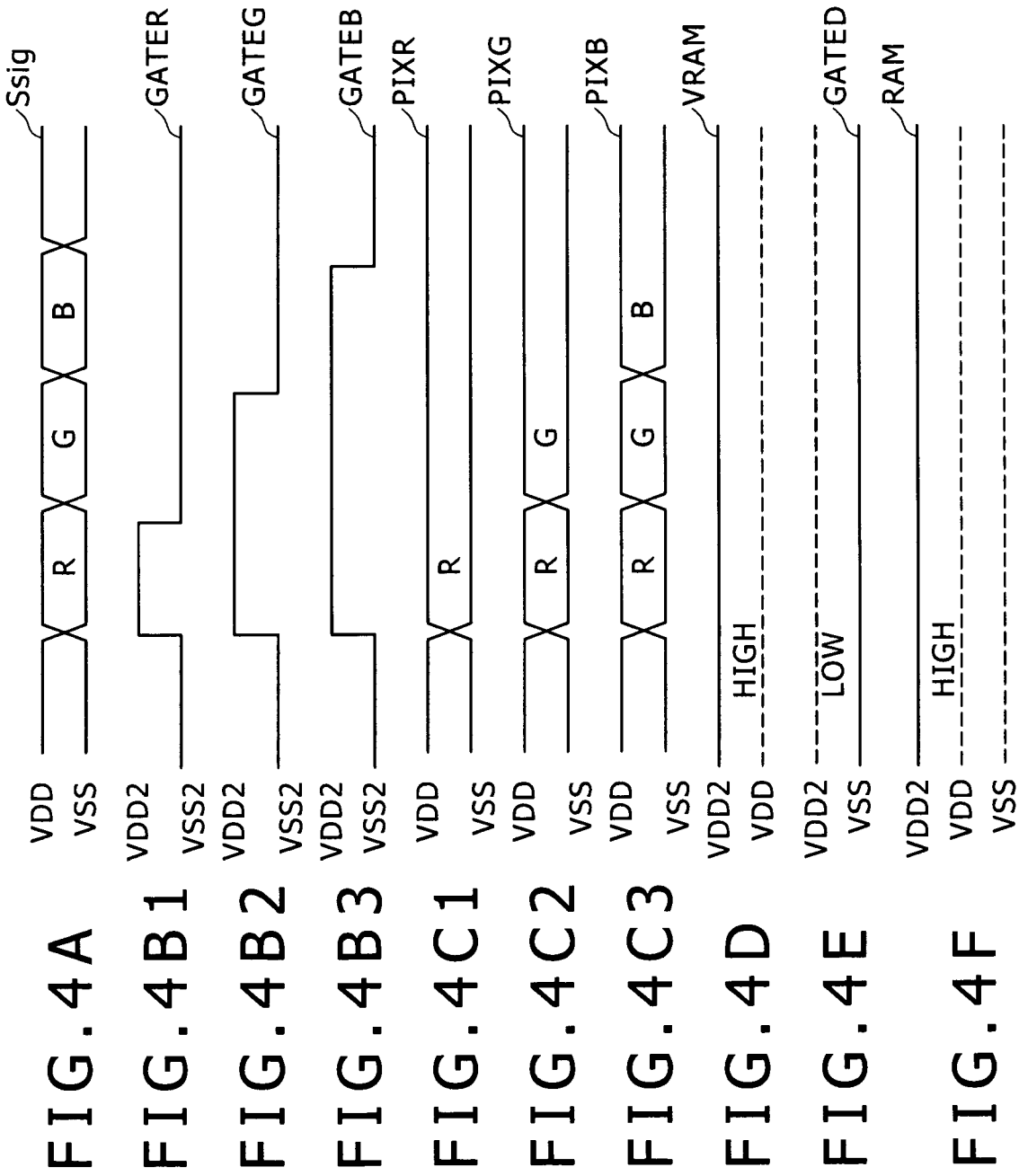

The display unit 13 operates according to the various signals output from the horizontal driving unit 15 and the vertical driving unit 17 to display an image based on the image data SDI or DV. FIG. 3 is a connection diagram showing a basic unit of the display unit 13. The basic unit 21 is a constituent element of the display unit 13. The basic unit 21 in the present embodiment includes liquid crystal cells 22R, 22G, and 22B of red, green, and blue, and a peripheral circuit of the liquid crystal cells 22R, 22G, and 22B. In the display unit 13, basic units 21 as shown in FIG. 3 are arranged in the form of a matrix in a TFT substrate, and liquid crystal cells 22R, 22G, and 22B of red, green, and blue respectively forming red, green, and blue pixels are arranged in the form of a matrix, such that these liquid crystal cells 22R, 22G, and 22B continue sequentially and cyclically.

Storage capacitors CsR, CsG, and CsB of these liquid crystal cells 22R, 22G, and 22B of red, green, and blue in the basic unit 21 each have one terminal supplied with a driving signal CS involved in a precharge process, and each have another terminal connected to the pixel electrode of the corresponding liquid crystal cell 22R, 22G, or 22B. The common electrode of the liquid crystal cells 22R, 22G, and 22B is supplied with the driving power VCOM whose signal level is changed in such a manner as to be interlocked with the driving signal CS.

The pixel electrodes of the liquid crystal cells 22R, 22G, and 22B are connected to an NMOS (N-channel Metal-Oxide Semiconductor) transistor Q2 via NMOS transistors Q1R, Q1G, and Q1B, which perform on/off operation according to gate signals GATER, GATEG, and GATEB, respectively. The NMOS transistor Q2 performs on/off operation according to the gate signal GATEB for blue. The NMOS transistor Q2 connects the NMOS transistors Q1R, Q1G, and Q1B to the signal line SIG or a line supplying the driving signal CS via NMOS transistors Q3 and Q4, respectively, which perform on/off operation according to output from a memory unit 23.

The memory unit 23 in the basic unit 21 is an SRAM (Static Random Access Memory) formed by a CMOS (Complementary Metal-Oxide Semiconductor) inverter of an NMOS transistor Q5 and a PMOS (P-channel Metal-Oxide Semiconductor) transistor Q6 whose gates are connected to each other and whose drains are connected to each other and a CMOS inverter of a similar NMOS transistor Q7 and a similar PMOS transistor Q8. The memory unit 23 outputs an output RAM (Random Access Memory) corresponding to the logical level of the signal line SIG and an inverted output having an opposite logical level from the output RAM to the NMOS transistors Q3 and Q4, respectively. The memory unit 23 thereby subjects these transistors Q3 and Q4 to complementary on-off control. The memory unit 23 is connected to the signal line SIG via an NMOS transistor Q11, which performs an on operation according to a gate signal GATED.

Figure 5:
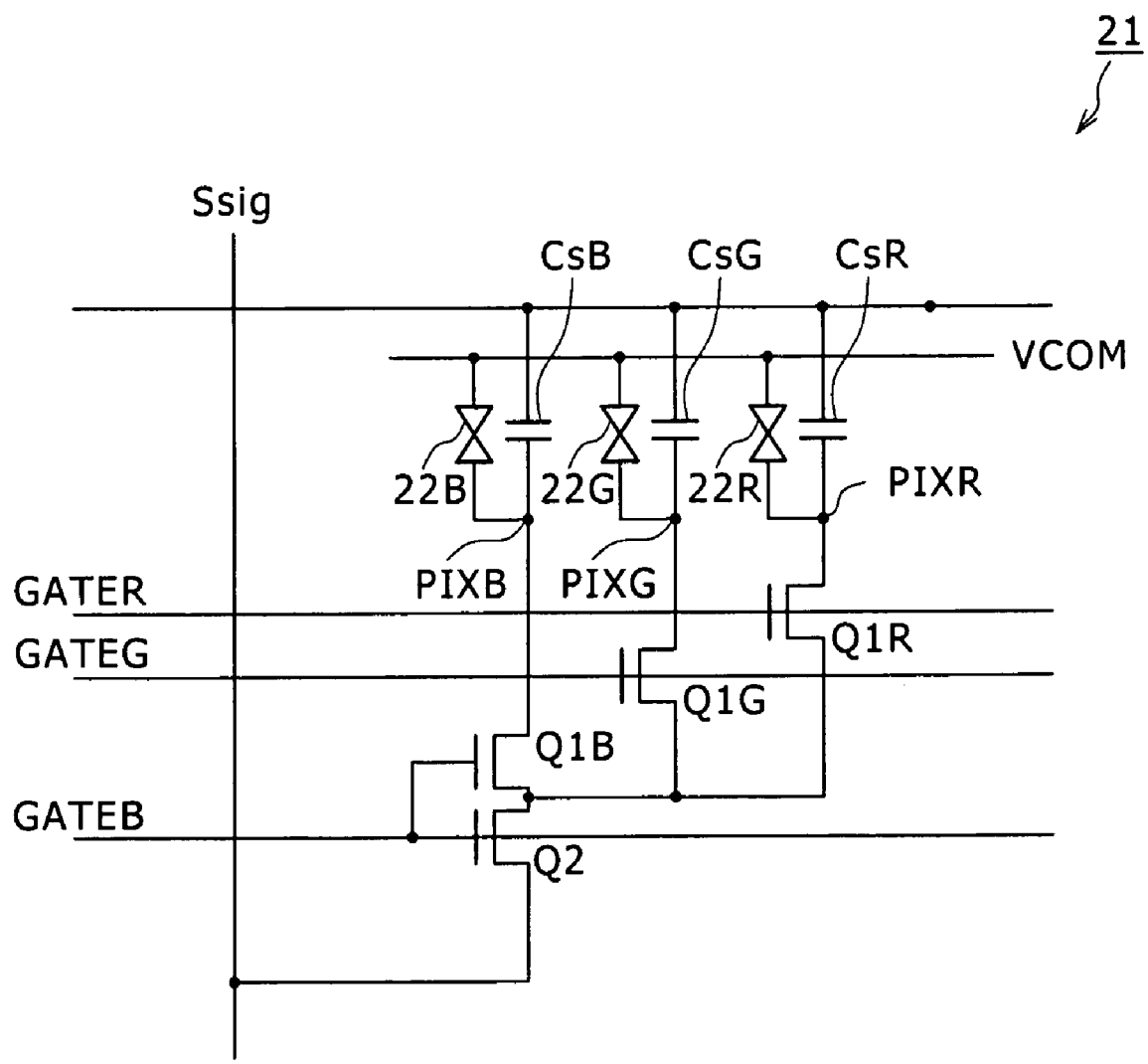
FIG. 5 is a connection diagram of assistance in explaining operation of the basic unit of FIG. 3 by an analog driving system.

In the basic unit 21, as shown in FIGS. 4A to 4F and FIG. 5, in the case of the analog driving system, the horizontal driving unit 15 and the vertical driving unit 17 set the memory unit 23 in advance so that the transistor Q3 is set in an on state (FIGS. 4D and 4E), and thereafter sequentially change settings of the gate signals GATER, GATEG, and GATEB (FIGS. 4B1 to 4B3), whereby the liquid crystal cells 22R, 22G, and 22B are sequentially connected to the signal line SIG, as shown in FIG. 5. Incidentally, FIG. 5 is a diagram showing a simplified configuration of the basic unit 21 by contrast with FIG. 3 for the description of the connection between the signal line SIG and the liquid crystal cells 22R, 22G, and 22B.

In the basic unit 21, in the case of the analog driving system, the horizontal driving unit 15 sequentially sets the driving signal Ssig of the signal line SIG to gradation voltages R, G, and B indicating the gradations of the liquid crystal cells 22R, 22G, and 22B, respectively (FIG. 4A). The settings of the gate signals GATER, GATEG, and GATEB are changed sequentially in such a manner as to correspond to the settings of the signal line SIG (FIGS. 4B1 to 4B3). Thereby the basic unit 21 sets potentials PIXR, PIXG, and PIXB on the pixel electrode sides of the liquid crystal cells 22R, 22G, and 22B to the gradation voltages R, G, and B by the driving signal Ssig. Thereby the basic unit 21 sets the gradations of the liquid crystal cells 22R, 22G, and 22B by the analog driving system. Incidentally, in the configuration of FIG. 3, with the transistor Q2 in an on state, the transistors Q1R and Q1G for red and green may be alternately made to perform an on operation to set the gradations of the liquid crystal cells 22R and 22G of red and green sequentially.

On the other hand, at a time of advance setting of the memory unit 23 in the analog driving system, or at a time of writing by the memory system, as shown in FIGS. 6A to 6F and FIG. 7, the basic unit 21 sets the transistors Q1R, Q1G, and Q1B in an off state by the gate signals GATER, GATEG, and GATEB (FIGS. 6B1 to 6B3 and 6C1 to 6C3), temporarily lowers the power supply voltage VRAM (Video Random Access Memory) of the memory unit 23 to a voltage VDD corresponding to the H-level of the signal line SIG (FIGS. 6A and 6D), and sets the transistor Q11 in an on state by the gate signal GATED, so that the memory unit 23 is connected to the signal line SIG (FIG. 6E). Thereby the basic unit 21 sets the logical level of the driving signal Sdv output to the signal line SIG (FIG. 6F). The basic unit 21 thereafter raises the power supply voltage VRAM to a voltage VDD2 corresponding to the driving voltage of the liquid crystal cells 22R, 22G, and 22B (FIGS. 6D and 6F), and thus sets the power supply voltage VRAM such that the transistors Q3 and Q4 can be controlled to be on or off. Incidentally, FIG. 7 is a diagram showing a simplified configuration of the basic unit 21 shown in FIG. 3 for the description of the operation of writing the memory unit 23.

In the basic unit 21, at a time of advance setting of the memory unit 23 in the analog driving system, the signal line SIG is set to an H-level by the horizontal driving unit 15, and the above series of operations is performed, whereby the memory unit 23 is set such that the transistor Q3 is set in an on state. At a time of writing by the memory system, on the other hand, the signal line SIG is set to the logical value of image data DV by the horizontal driving unit 15, whereby the logical value of the image data DV is set in the memory unit 23. When the logical value is at an H-level, the memory unit 23 is set such that the transistor Q3 is set in an on state. When the logical value is at an L-level, on the other hand, the memory unit 23 is set such that the transistor Q4 is set in an on state.

Figure 9:
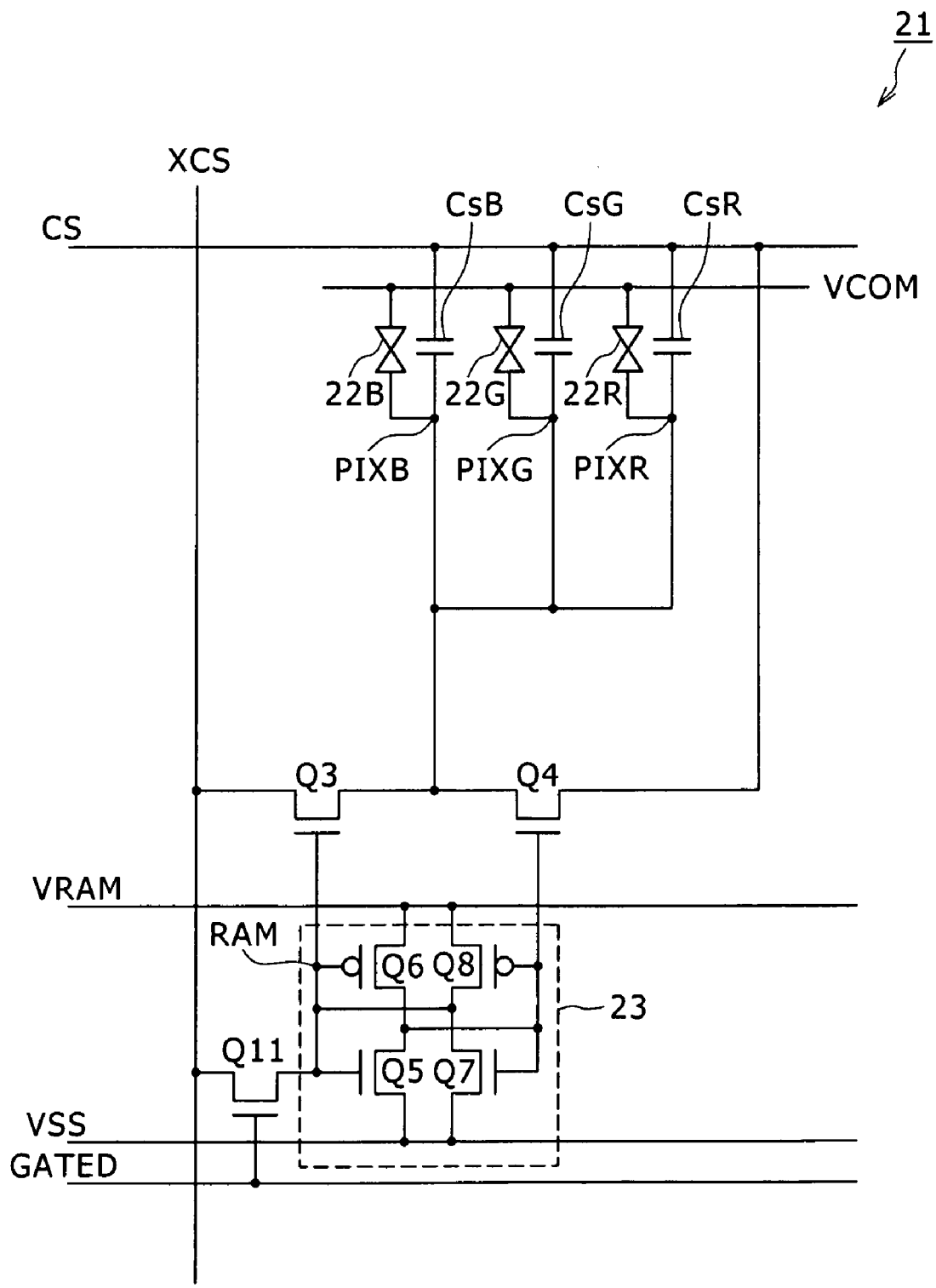
FIG. 9 is a connection diagram of assistance in explaining the operation of the basic unit of FIG. 3 by the memory system.

At a time of display by the memory system, in the basic unit 21, as shown in FIGS. 8A to 8G and FIG. 9, the inverted signal XCS of the driving signal CS, the signal level of the inverted signal XCS being changed complementarily to the driving signal CS, is supplied from the horizontal driving unit 15 to the signal line SIG (FIGS. 8A and 8B). In addition, the gate signals GATER, GATEG, and GATEB are supplied from the horizontal driving unit 15 so as to make all of the transistors Q1R, Q1G, Q1B, and Q2 perform an on operation (FIGS. 8C1 to 8C3). The basic unit 21 selectively sets the transistor Q3 or Q4 in an on state according to the logical value set in the memory unit 23, and thereby selectively supplies the inverted signal XCS or the driving signal CS to the pixel electrodes of the liquid crystal cells 22R, 22G, and 22B (FIGS. 8D1 to 8D3). The liquid crystal cells 22R, 22G, and 22B are thereby set to a black gradation or a white gradation in correspondence with the logical value of the image data DV set in the memory unit 23. Incidentally, FIG. 9 is a diagram showing a simplified configuration of the basic unit 21 shown in FIG. 3 for the description of the display by the memory system.

Figure 10:
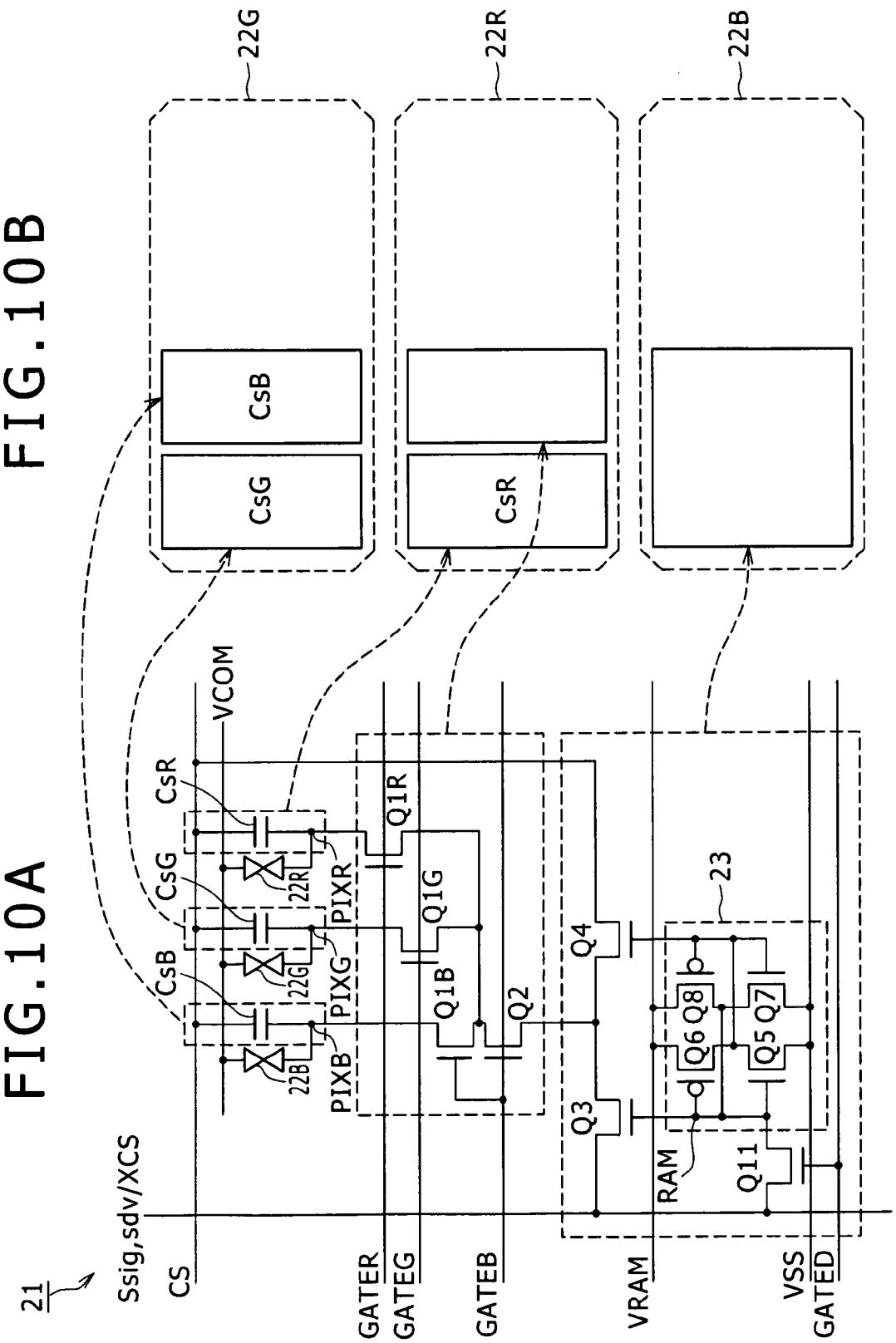
FIGS. 10A and 10B are diagrams of assistance in explaining a layout of the TFT substrate in the liquid crystal display device of FIG. 2.

FIGS. 10A and 10B are diagrams of assistance in explaining a layout of the basic unit 21 in a TFT substrate. In the basic unit 21 shown in FIG. 3, the number of scanning lines is significantly larger than the number of signal lines. When the liquid crystal cells 22R, 22G, and 22B are arranged so as to be aligned in a horizontal direction, the arrangement of the scanning lines becomes complex. Accordingly, in the present embodiment, pixels formed by liquid crystal cells 22R, 22G, and 22B in one basic unit 21 are arranged so as to be aligned in a direction in which the signal line extends. The display unit 13 is thus formed by so-called horizontal stripes. In addition, scanning lines are arranged between the pixels formed by the liquid crystal cells 22R, 22G, and 22B and between pixels of basic units 21 adjacent to each other. Thus, in the present embodiment, the TFT substrate is laid out efficiently, and a decrease in area of openings in the display unit 13 is prevented.

Further, as shown by arrows in FIGS. 10A and 10B, the memory unit 23 and the transistors Q3, Q4, and Q11 are disposed in the pixel formed by the liquid crystal cell 22B of blue among the three liquid crystal cells 22R, 22G, and 22B of red, green, and blue in the basic unit 21. The transistors Q1R, Q1G, Q1B, and Q2 and the storage capacitor CsR of the red liquid crystal cell 22R are disposed in the pixel formed by the red liquid crystal cell 22R. The storage capacitors CsG and CsB of the green liquid crystal cell 22G and the blue liquid crystal cell 22B are disposed in the pixel formed by the green liquid crystal cell 22G. Thus, the present embodiment secures a sufficient area of openings assignable to the red, green, and blue pixels by arranging the transistors Q1 to Q11 efficiently, and prevents an imbalance between the areas of the openings in the red, green, and blue pixels.

Further, as shown in FIG. 1, for at least the storage capacitor CsB of the blue liquid crystal cell 22B which capacitor is disposed in the pixel formed by the green liquid crystal cell 22G, a shield layer 31 is provided between an electrode of the storage capacitor CsB which electrode is formed by a wiring layer 7 and a pixel electrode 11. In the liquid crystal display device 18, the shield layer 31 is made by a wiring layer 9 for connecting the pixel electrode 11 to the basic unit 21. In the basic unit 21, the shield layer 31 is connected to a ground or a fixed potential.

(2) Operation of Embodiment

When the liquid crystal display device 18 (FIG. 2) of the above configuration displays a moving image or a still image based on image data SDI output from a tuner unit, an external device or the like, the controller 14 controls each part to input the image data SDI input to the interface 12 to the horizontal driving unit 15, where the image data SDI is subjected to digital-to-analog conversion processing, and a driving signal Ssig for the signal line SIG on the basis of field reversal, frame reversal, line reversal, or the like is generated. The liquid crystal display device 18 sets the gradation of each pixel provided in the display unit 13 by the driving signal Ssig as an analog signal, and displays the moving image or the still image by the analog driving system.

When a menu image or the like from the controller 14 is displayed, on the other hand, binary image data DV output from the controller 14 is input to the horizontal driving unit 15 via the interface 12. In the liquid crystal display device 18, the logical level of the signal line SIG is sequentially set according to the logical level of the image data DV, and the logical level of the signal line SIG is stored in the memory unit 23 disposed in the display unit 13 (FIG. 3). The gradation of each pixel is set according to the logical level stored in the memory unit 23. Thereby the menu image is displayed by the memory system.

More specifically, in the display unit 13 (FIG. 3, FIGS. 6A to 6F, and FIG. 7), in an advance process in the case of display by the analog driving system, the horizontal driving unit 15 sets the logical level of each signal line SIG to an H-level, and the memory unit 23 is connected to the signal line SIG by the gate signal GATED in a state in which the power VRAM of the memory unit 23 is lowered. The logical value of the signal line SIG is thereby set in the memory unit 23. In addition, as a result of the setting of the logical value, the transistor Q3 is set in an on state, so that the transistor Q2 is connected to the signal line SIG.

Further, in the case of display by the analog driving system (FIGS. 3 to 6F), the horizontal driving unit 15 sequentially sets the signal level of the signal line SIG to gradation voltages indicating the gradations of the red, green, and blue liquid crystal cells 22R, 22G, and 22B, respectively, and the transistors Q1R, Q1G, Q1B, and Q2 are sequentially set in an on state in such a manner as to correspond to the setting of the signal level of the signal line SIG, so that the gradation voltages of the respective pixels are set at the pixel electrodes of the liquid crystal cells 22R, 22G, and 22B. In addition, the driving signals VCOM and CS are supplied to the common electrode of the liquid crystal cells 22R, 22G, and 22B and the storage capacitors CsR, CsG, and CsB in such a manner as to correspond to the above setting.

The liquid crystal display device 18 repeats the setting of the liquid crystal cells 22R, 22G, and 22B by the signal line SIG in frame units, for example. Thereby a moving image or a still image can be displayed by the analog driving system.

In the case of the memory system (FIG. 3, FIGS. 6A to 6F, and FIG. 7), on the other hand, the signal level of the signal line SIG is set to a logical level corresponding to emission or non-emission of the liquid crystal cells 22R, 22G, and 22B, and the memory unit 23 is driven in the same manner as in the advance process of the analog driving system. The logical level of image data DV is thereby set in the memory unit 23.

Next, the transistor Q3 or Q4 is selectively set in an on state according to the logical value set in the memory unit 23 (FIG. 3, FIGS. 8A to 8G, and FIG. 9), whereby the inverted signal XCS of the driving signal CS or the driving signal CS is selected. In the liquid crystal display device 18, the selected inverted signal XCS or the selected driving signal CS is supplied to the pixel electrodes of the liquid crystal cells 22R, 22G, and 22B via the transistors Q1R, Q1G, Q1B, and Q2. These liquid crystal cells 22R, 22G, and 22B are thereby set for display or non-display according to the logical value set in the signal line SIG. The liquid crystal display device 18 thus displays an image that does not need to be updated in frame cycles, such as a menu image or the like, by the memory system, so that power consumption can be reduced.

In addition, in the liquid crystal display device 18, one memory unit 23 is assigned to the red, green, and blue liquid crystal cells 22R, 22G, and 22B, and an image is displayed by the memory system. It is thereby possible to reduce the number of memories provided in the display unit, and simplify the configuration.

In addition, the display unit 13 is formed by so-called horizontal stripes by sequentially arranging the red, green, and blue liquid crystal cells 22R, 22G, and 22B to which one memory unit 23 is assigned in the extending direction of the signal line SIG. It is thereby possible to lay out the TFT substrate efficiently, and prevent a decrease in area of openings in the display unit 13.

However, when the plurality of pixels adjacent to each other thus shares the memory unit 23, an imbalance occurs between the plurality of pixels in the layout of the TFT substrate, and an area in which a storage capacitor can be created in a particular pixel is reduced. That is, in this case, when the memory unit 23 is disposed in one of the pixels, it is difficult to secure a sufficient opening and allocate a sufficient area to the storage capacitor in the pixel having the memory unit 23 disposed therein.

Accordingly, in the present embodiment, the memory unit 23 and the transistors Q3, Q4, and Q11 are disposed in the pixel formed by the liquid crystal cell 22B of blue among the three liquid crystal cells 22R, 22G, and 22B of red, green, and blue in the basic unit 21. The transistors Q1R, Q1G, Q1B, and Q2 and the storage capacitor CsR of the red liquid crystal cell 22R are disposed in the pixel formed by the red liquid crystal cell 22R. The storage capacitors CsG and CsB of the green liquid crystal cell 22G and the blue liquid crystal cell 22B are disposed in the pixel formed by the green liquid crystal cell 22G. Thus, the present embodiment secures a sufficient area of openings assignable to the red, green, and blue pixels by arranging the transistors Q1 to Q11 efficiently, and prevents an imbalance between the areas of the openings in the red, green, and blue pixels.

However, when the storage capacitors CsG and CsB of the green liquid crystal cell 22G and the blue liquid crystal cell 22B are thus disposed in the pixel formed by the green liquid crystal cell 22G, the storage capacitor CsB of the blue liquid crystal cell 22B is disposed in a layer below the green liquid crystal cell 22G. As a result, there is a fear that the green liquid crystal cell 22G may be affected by the pixel potential of the blue liquid crystal cell 22B and thus become unable to represent a correct gradation.

Accordingly, in the present embodiment (FIG. 1), for at least the storage capacitor CsB of the blue liquid crystal cell 22B which capacitor is disposed in the pixel formed by the green liquid crystal cell 22G, the shield layer 31 is provided by the wiring layer 9 between an electrode of the storage capacitor CsB which electrode is formed by the wiring layer 7 and the pixel electrode 11. The shield layer 31 is connected to a ground or a fixed potential.

Thus, in the present embodiment, shielding by the shield layer 31 prevents the pixel potential of the green liquid crystal cell 22G from being affected by the pixel potential of the blue liquid crystal cell 22B. Thereby a green pixel can be displayed at a correct gradation. Thus, in the present embodiment, a necessary storage capacitor can be secured sufficiently even when an area in which the storage capacitor can be disposed is small.

(3) Effect of Embodiment

According to the above constitution, the storage capacitor of the adjacent pixel is created in a layer below the pixel electrode, and shielding is provided by disposing the shield layer 31 between the electrode on the pixel electrode side which electrode forms the storage capacitor of the adjacent pixel and the pixel electrode. Thus, a necessary storage capacitor can be secured sufficiently even when an area in which the storage capacitor can be disposed is small.

In addition, because the shield layer is formed by the wiring layer for connecting the pixel electrode to the TFT, the shield layer can be provided by making effective use of an existing process. Thus, with a simple constitution, a necessary storage capacitor can be secured sufficiently even when an area in which the storage capacitor can be disposed is small.

In addition, even when there is an extreme imbalance in the layout of the TFT substrate in the constitution in which one memory unit is assigned to a plurality of pixels adjacent to each other and display is made by the memory system, a necessary storage capacitor can be secured sufficiently.

In addition, even when there is an extreme imbalance in the layout of the TFT substrate in the constitution in which images are displayed by the memory system, the analog driving system and the like, a necessary storage capacitor can be secured sufficiently.

Second Embodiment

Figure 11:
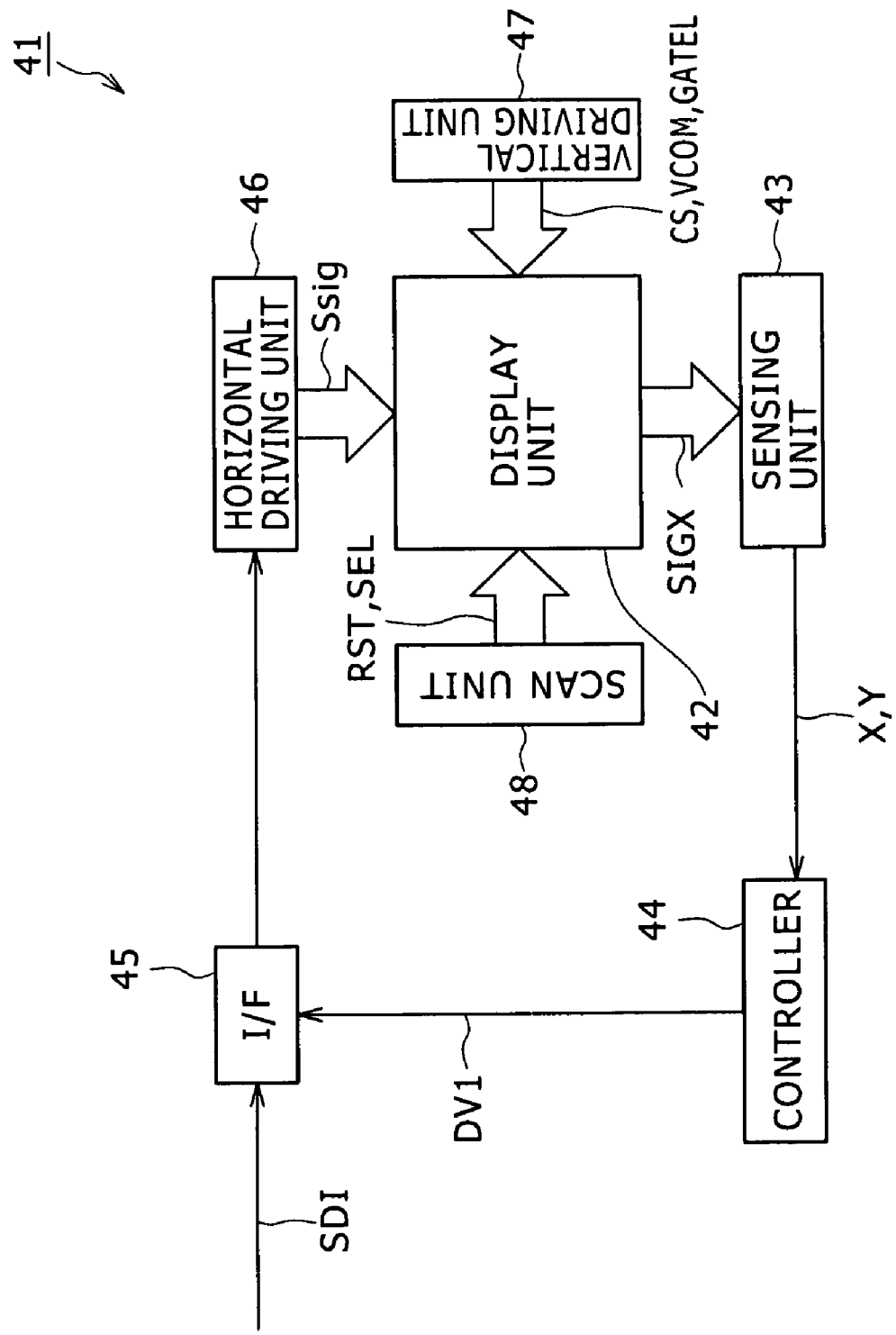
FIG. 11 is a block diagram showing a liquid crystal display device according to a second embodiment of the present invention.

FIG. 11 is a block diagram showing a liquid crystal display device according to a second embodiment of the present invention. This liquid crystal display device 41 displays a moving image or a still image based on image data SDI on a display unit 42 by the analog driving system, and displays a menu image based on image data DV1. In addition, the liquid crystal display device 41 detects a selection of a menu displayed on the display unit 42 by a controller 44, and changes display or the like on the display unit 42.

In the liquid crystal display device 41, an interface (I/F) 45 is supplied with the image data SDI output from a tuner unit, an external device or the like, various timing signals synchronized with the image data SDI, and the image data DV1 output from the controller 44. The interface 45 outputs the image data SDI and DV1 and the various timing signals input to the interface 45 to each part under control of the controller 44.

A horizontal driving unit 46 distributes the image data SDI and DV1 output from the interface 45 to each signal line SIG provided for the display unit 42, and subjects the distributed image data to digital-to-analog conversion processing. The horizontal driving unit 46 thereby generates a driving signal Ssig for each signal line SIG, and outputs the driving signal Ssig to the display unit 42. A vertical driving unit 47 generates a timing signal GATEL corresponding to the driving signal Ssig generated by the horizontal driving unit 46 as well as driving signals VCOM and CS, and outputs the timing signal GATEL and the driving signals VCOM and CS to the display unit 42.

The display unit 42 is a transmissive type or a semi-transmissive type of liquid crystal display panel in which sensor circuits forming a touch sensor are provided at a predetermined pixel pitch. The display unit 42 is driven by the horizontal driving unit 46 and the vertical driving unit 47 to display a moving image or a still image based on image data SDI and display a menu image based on image data DV1.

A scan unit 48 generates and outputs various timing signals RST and SEL used to drive a sensor circuit provided in the display unit 42. A sensing unit 43 subjects an output signal SIGX of the sensor circuit which signal is output from the display unit 42 to signal processing to detect coordinates X and Y of a part that a use has touched. The sensing unit 43 outputs the detected coordinates X and Y to the controller 44.

The controller 44 is controlling means for controlling the operation of each part. The controller 44 controls the operation of the interface 45 to display a predetermined menu screen on the display unit 42. In addition, the controller 44 detects a selection of a menu on the menu screen on the basis of coordinates X and Y notified by the sensing unit 43, changes the display of the display unit 42 in response to the selection of the menu, and changes a source of the image data SDI or the like.

Figure 12:
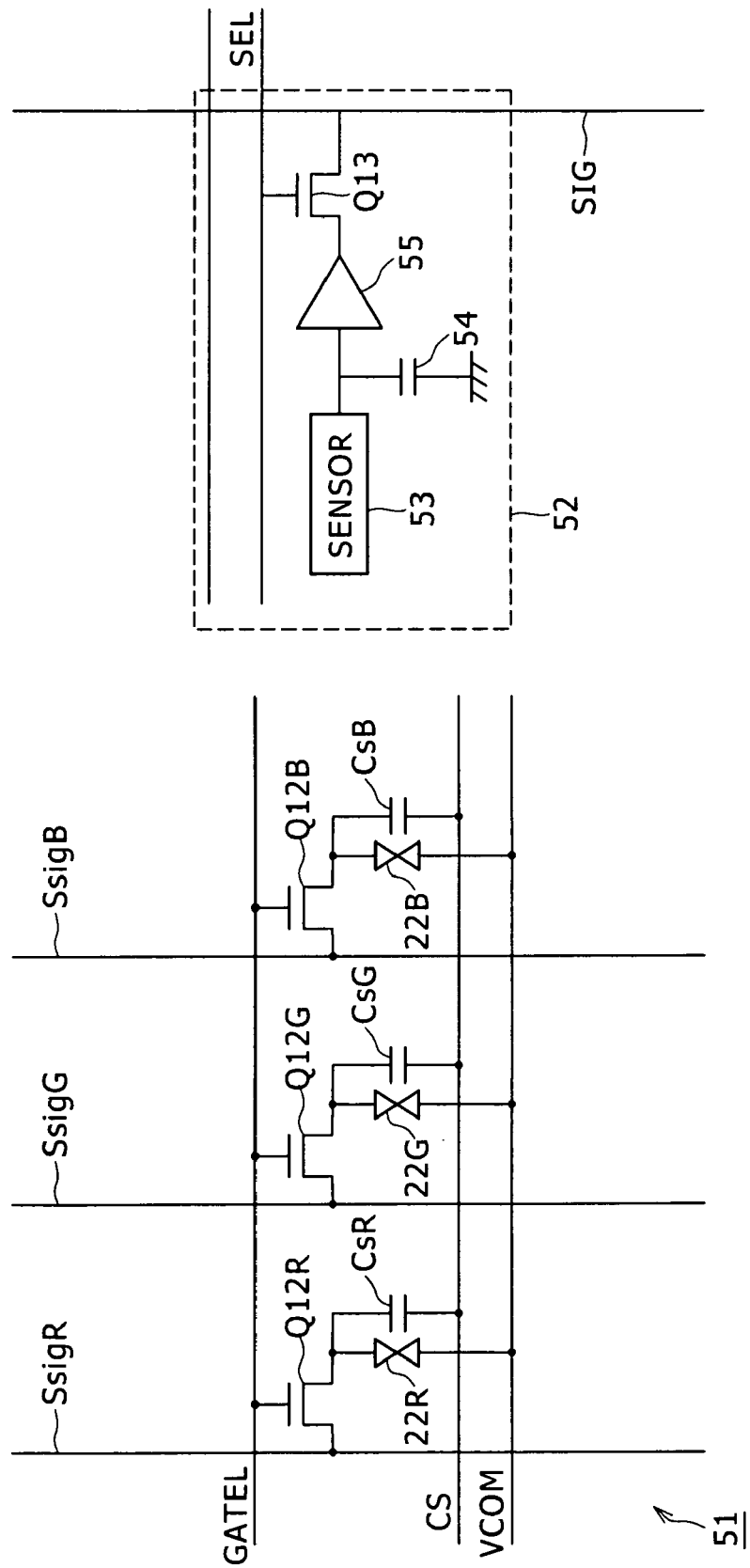
FIG. 12 is a connection diagram showing a basic unit of the liquid crystal display device of FIG. 11.

FIG. 12 is a block diagram showing a basic unit of the display unit 42. In this basic unit 51, the same constituent elements as in the basic unit 21 of FIG. 3 are identified by the corresponding reference numerals, and repeated description thereof will be omitted. The basic unit 51 in this case is a constituent unit of the display unit 42. The basic unit 51 in the present embodiment includes consecutive liquid crystal cells 22R, 22G, and 22B of red, green, and blue and one sensor unit 52. In the display unit 42, basic units 51 are arranged in the form of a matrix in a TFT substrate such that liquid crystal cells 22R, 22G, and 22B of red, green, and blue continue sequentially and cyclically. Thereby pixels formed by these liquid crystal cells 22R, 22G, and 22B are arranged in the form of a matrix.

In the basic unit 51, the liquid crystal cells 22R, 22G, and 22B of red, green, and blue are connected to signal lines SIGR, SIGG, and SIGB for red, green, and blue, respectively, via NMOS transistors Q12R, Q12G, and Q12B that perform on/off operation according to a gate signal GATEL output from the vertical driving unit 47. Thereby the gradations of the liquid crystal cells 22R, 22G, and 22B are set by the analog driving system.

When a finger or the like approaches the display screen of the display unit 42, light emitted from the display unit 42 is reflected by the finger or the like, so that returned light returned to the display unit 42 occurs. The sensor unit 52 includes: a sensor 53 for receiving the returned light and outputting an output signal corresponding to the light amount of the received light; an integrating capacitor 54 for integrating the output signal of the sensor 53; an amplifier circuit 55 for amplifying a result of the integration by the integrating capacitor 54; and a transistor Q13 performing an on operation according to a selection signal SEL to output an output signal of the amplifier circuit 55 to a signal line SIG for the sensor unit.

Figure 13:
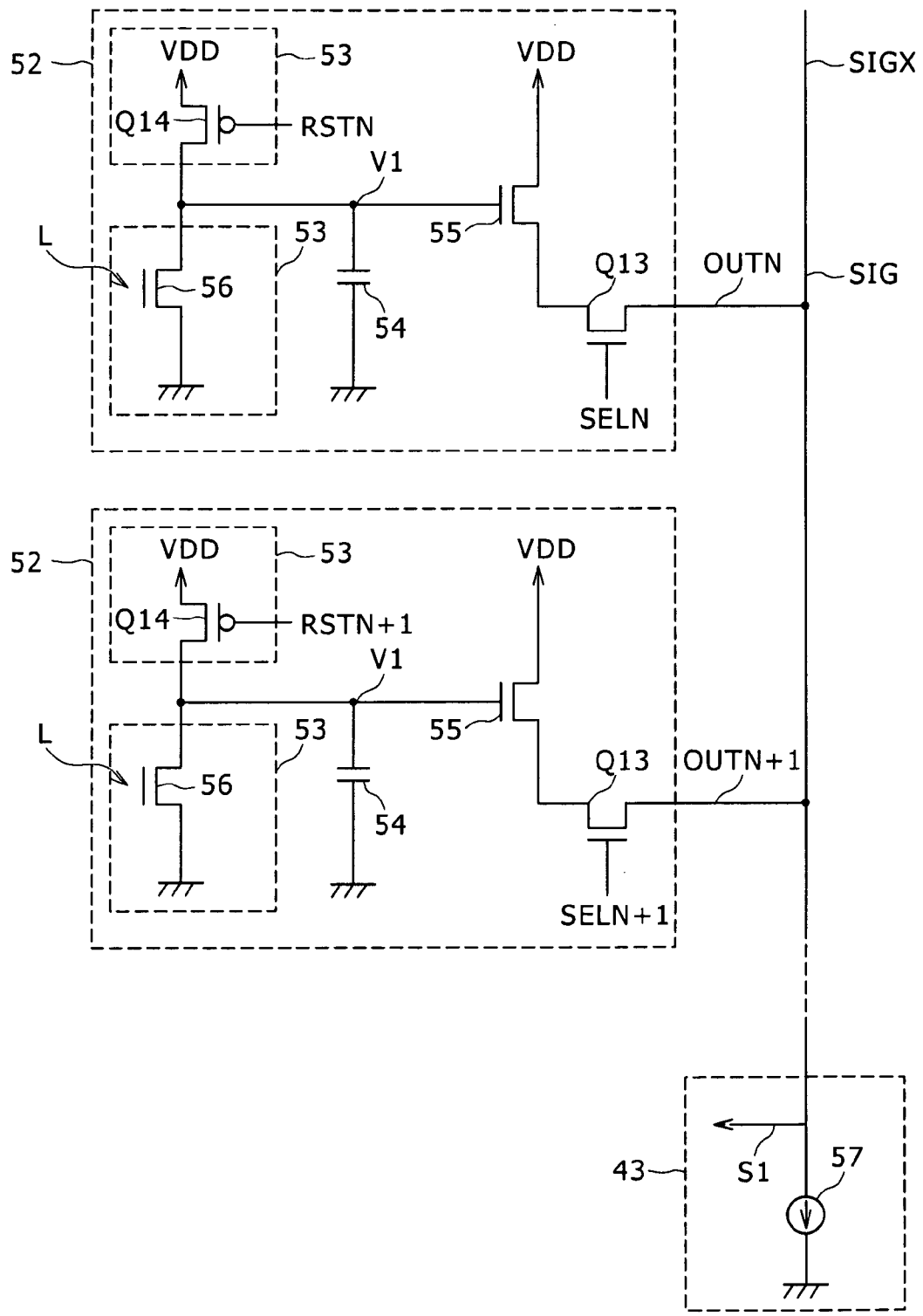
FIG. 13 is a connection diagram of assistance in explaining operation of a sensor unit in the basic unit of FIG. 12.

FIG. 13 is a connection diagram showing a detailed configuration of the sensor unit 52 together with a related configuration. In the sensor unit 52, a photosensor 56 that outputs a current corresponding to the light amount of received light is applied to the sensor 53. An output signal of the sensor 53 is supplied to one terminal of the integrating capacitor 54. In the sensor unit 52, another terminal of the integrating capacitor 54 is connected to a ground as a predetermined fixed potential, and the one terminal of the integrating capacitor 54 is connected to a power supply VDD via a PMOS transistor Q14 performing an on operation according to a reset signal RST.

As shown in FIGS. 14A to 14D, the reset signal RST is supplied from the scan unit 48 to the sensor unit 52 in synchronism with timing of setting of a gradation to the liquid crystal cells 22R, 22G, and 22B in the basic unit 51 provided with the sensor unit 52 (FIG. 14A). The transistor Q14 performs an on operation according to the reset signal RST, so that a voltage V1 (FIG. 14B) of the one terminal of the integrating capacitor 54 is connected to a power supply voltage VDD. Thereby a charge accumulated in the integrating capacitor 54 is reset. The voltage V1 of the one terminal of the integrating capacitor 54 thereafter decreases gradually according to the light amount of returned light.

The sensor unit 52 amplifies the voltage of the one terminal of the integrating capacitor 54 by means of the amplifier circuit 55 formed by an NMOS transistor. An output of the amplifier circuit 55 is output to the signal line SIG via the transistor Q13. In the sensor unit 52, the selection signal SEL is input from the scan unit 48 immediately before the voltage V1 of the one terminal of the integrating capacitor 54 is reset to the power supply voltage VDD by the reset signal RST (FIG. 14C). Thereby a result of integration by the integrating capacitor 54 is output to the signal line SIG in timing of the selection signal SEL.

In the liquid crystal display device 41, as shown in FIGS. 15A1 to 15C, the reset signal RST (RST1, RST2, . . . ) and the selection signal SEL (SEL1, SEL2, . . . ) are output to each basic unit 51 via a scanning line so as to sequentially select and reset the basic units 51 arranged along the signal line SIG. Thereby results OUT1, OUT2, . . . of measurement by the basic units 51 arranged along the signal line SIG are output to the signal line SIG on a time division basis.

In the present embodiment, the sensing unit 43 (FIG. 13) has a constant-current source 57 connected to each signal line SIG. The sensing unit 43 subjects an output signal SIGX of a sensor unit 52 which signal is detected at an input terminal of the constant-current source 57 to analog-to-digital conversion processing, and thereby obtains a result of detection by a basic unit 51 connected to the signal line SIG. The sensing unit 43 divides the result of the analog-to-digital conversion by the pixel value of corresponding image data SDI or DV1, and thereby normalizes the light amount of the returned light. In addition, the sensing unit 43 determines the normalized result by a predetermined threshold value, and thereby detects a basic unit 51 that has received returned light in a predetermined amount or larger. The sensing unit 43 notifies the coordinates X and Y of the detected basic unit 51 to the controller 44.

FIG. 16 is a plan view of the TFT substrate, showing a layout of a basic unit 51. In the present embodiment, the display unit 42 is formed by so-called vertical stripes by arranging pixels formed by liquid crystal cells 22R, 22G, and 22B such that the pixels are aligned in an extending direction of scanning lines. In the display unit 42, transistors Q1R, Q1G, and Q1B are arranged in the respective liquid crystal cells 22R, 22G, and 22B. The sensor unit 52 is disposed in the pixels formed by the green liquid crystal cell 22G and the blue liquid crystal cell 22B. Incidentally, the sensor 53 of the sensor circuit is disposed in the blue liquid crystal cell 22B. Storage capacitors CsR, CsG, and CsB of the respective liquid crystal cells 22R, 22G, and 22B are disposed in the pixel formed by the red liquid crystal cell 22R. However, the storage capacitor CsB of the blue liquid crystal cell 22B is disposed in the red liquid crystal cell 22R of the adjacent basic unit 51.

Further, a shield layer 31 as described above with reference to FIG. 1 is provided for at least the storage capacitors CsG and CsB of the green liquid crystal cell 22G and the blue liquid crystal cell 22B among the storage capacitors CsR, CsG, and CsB. The shield layer 31 is connected to a ground or a fixed potential. Thereby the present embodiment effectively avoids effects of the pixel electrodes of the blue liquid crystal cell 22B and the green liquid crystal cell 22G in the red liquid crystal cell 22R.

According to the present embodiment, even when there is an extreme imbalance in the layout of the TFT substrate in the constitution provided with a sensor unit for detecting the light amount of returned light, a necessary storage capacitor can be secured sufficiently.

Third Embodiment

Figure 17:
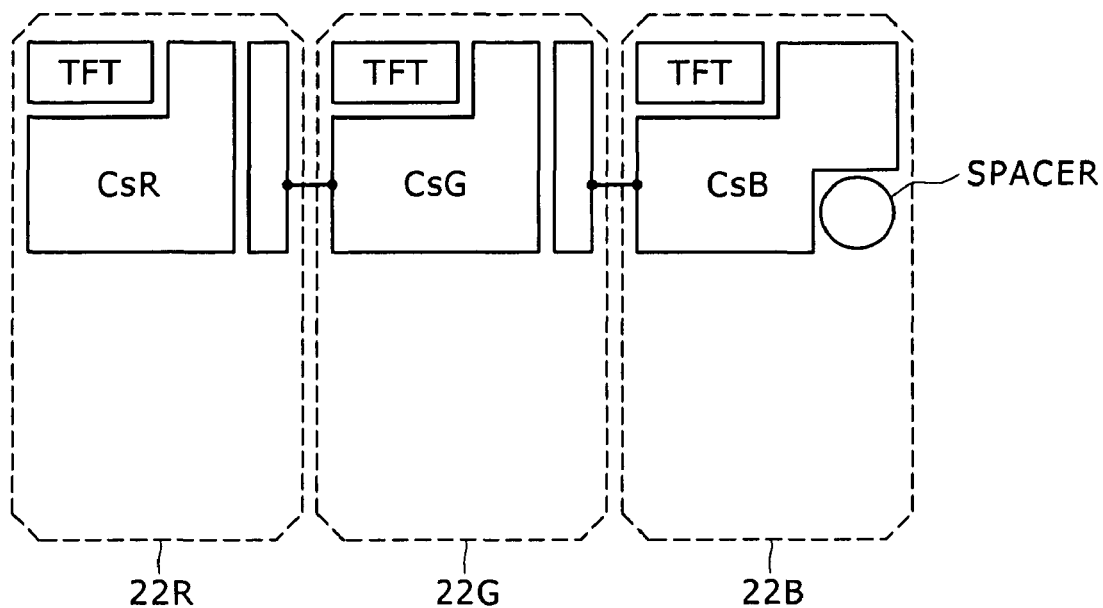
FIG. 17 is a plan view of a layout of a TFT substrate in a liquid crystal display device according to a third embodiment of the present invention.

FIG. 17 is a plan view of a TFT substrate applied to a liquid crystal display device according to a third embodiment of the present invention by contrast with FIG. 16 or the like. In this liquid crystal display device, a spacer for securing a gap between the TFT substrate and a CF substrate is arranged at a predetermined pixel pitch. In the liquid crystal display device, the arrangement of the spacer causes insufficiency of a space for creating a storage capacitor in a pixel in which the spacer is arranged. Accordingly, in the liquid crystal display device, the insufficient space is sequentially distributed to an adjacent pixel to create a storage capacitor.

Specifically, a storage capacitor CsB for the pixel of a blue liquid crystal cell 22B in FIG. 17 is disposed in the pixel of the blue liquid crystal cell 22B and the pixel of an adjacent green liquid crystal cell 22G. A storage capacitor CsG for the pixel of the adjacent green liquid crystal cell 22G is disposed in the pixel of the green liquid crystal cell 22G and the pixel of an adjacent red liquid crystal cell 22R.

In regard to the storage capacitors thus arranged in the adjacent pixels, a correct gradation can be displayed by arranging a similar shield layer 31 to that of the first embodiment or the second embodiment.

According to the present embodiment, even when an extreme imbalance occurs in the layout of the TFT substrate due to the arrangement of the spacer, and an area in which a storage capacitor can be created is reduced, a necessary storage capacitor can be secured sufficiently.

Fourth Embodiment

Figure 18:
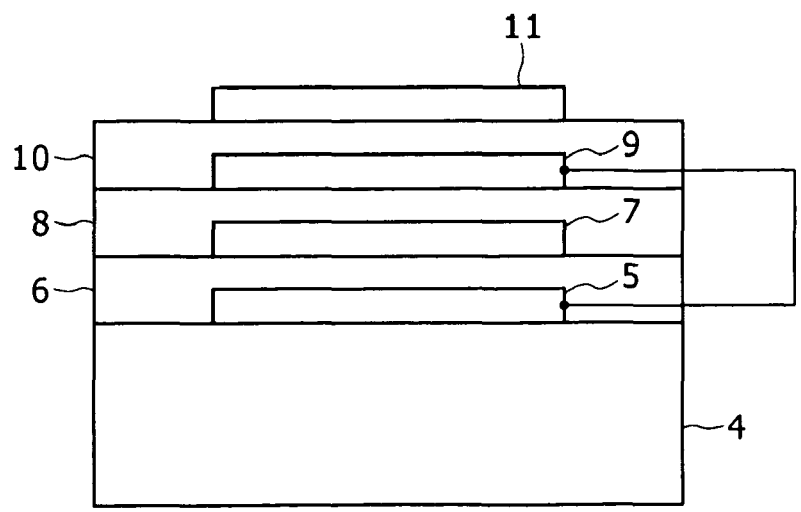
FIG. 18 is a sectional view of the TFT substrate of FIG. 17.
Figure 19:
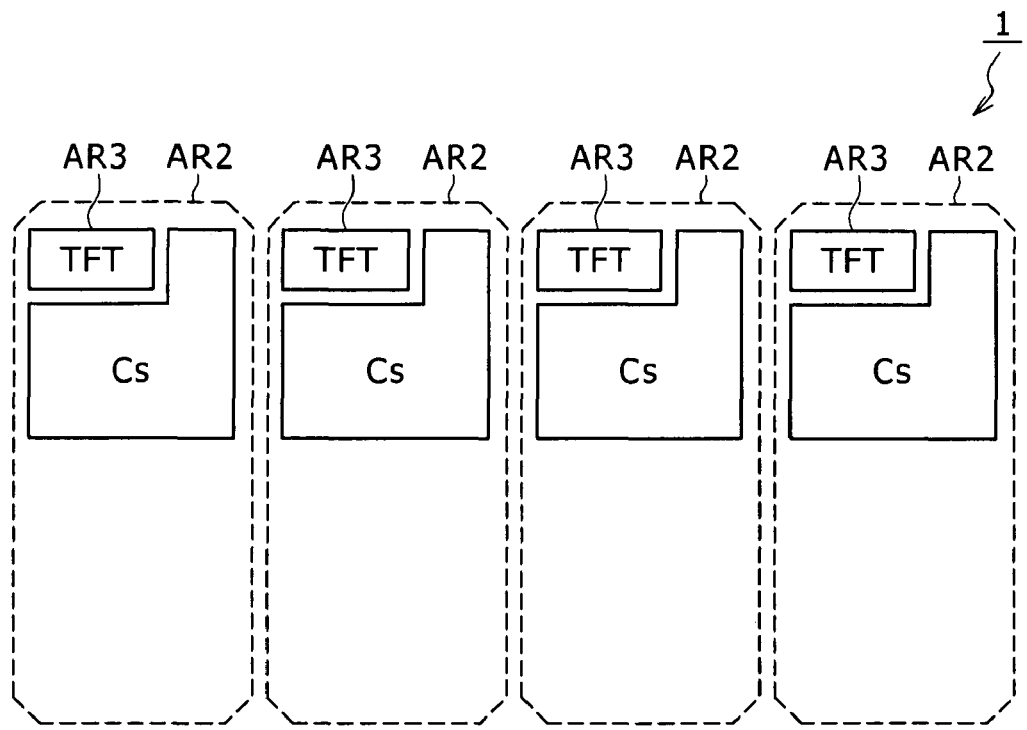
FIG. 19 is a plan view of a layout of a TFT substrate in a existing liquid crystal display device.
Figure 20:
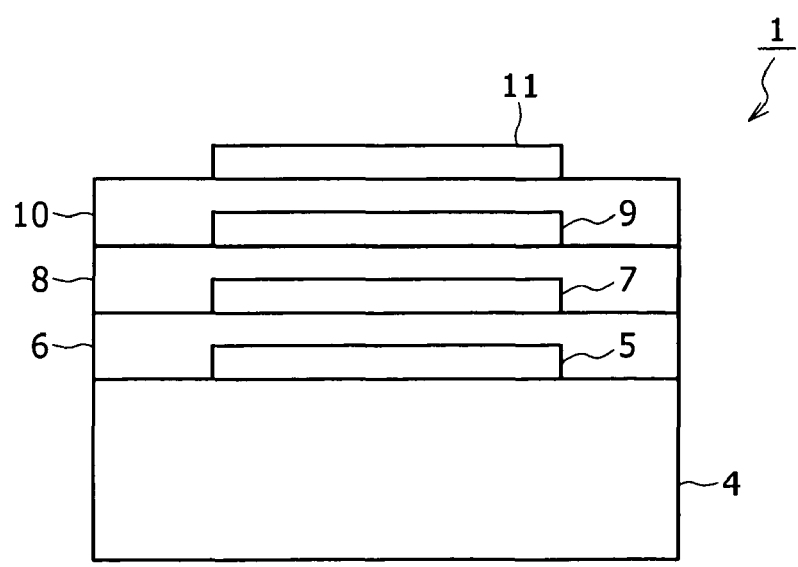
FIG. 20 is a sectional view of the TFT substrate of FIG. 19.
Figure 21:
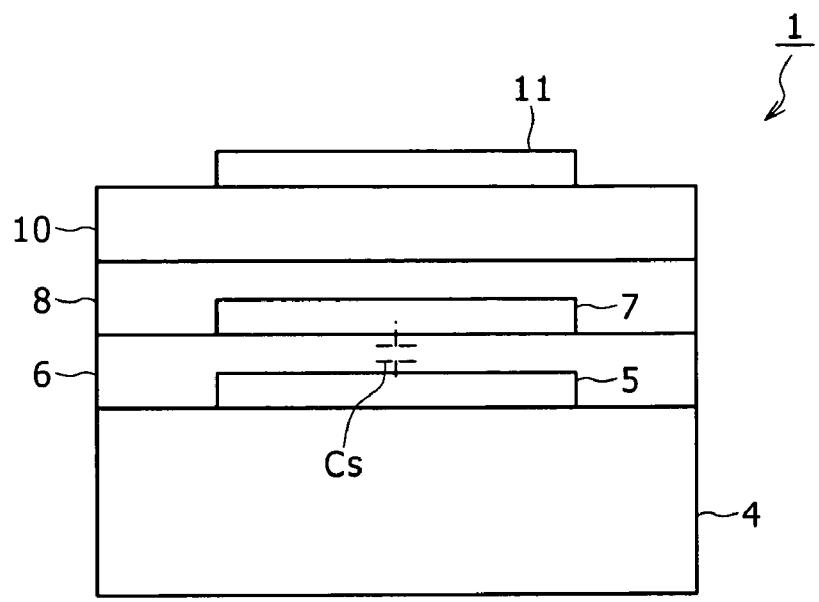
FIG. 21 is a sectional view of an auxiliary electrode.
Figure 22:
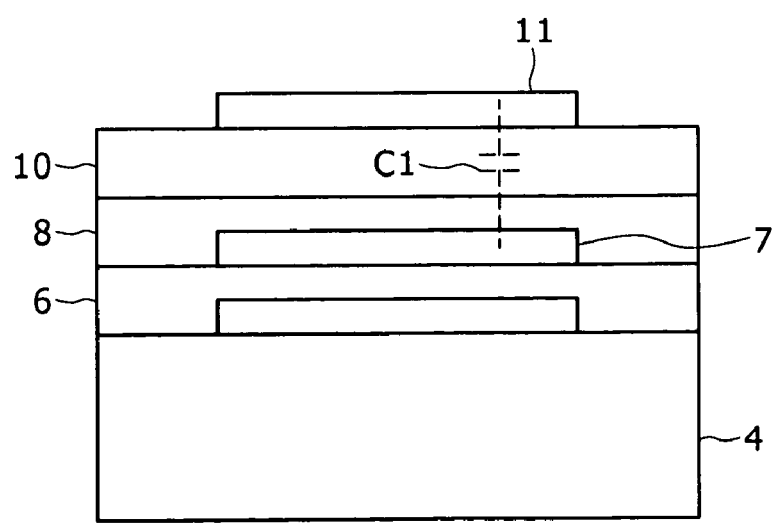
FIG. 22 is a sectional view of assistance in explaining effect of coupling with a pixel electrode.

FIG. 18 is a sectional view of a TFT substrate applied to a liquid crystal display device according to a fourth embodiment of the present invention by contrast with FIG. 1. In the liquid crystal display device according to the present embodiment, a counter electrode opposed to an electrode on a pixel potential side of a storage capacitor is formed by a wiring layer 9. In addition, this counter electrode is internally connected to an electrode on a driving signal CS side of the storage capacitor. Thereby, in the present embodiment, the capacitance of the storage capacitor per unit area is set substantially twofold as compared with the existing constitution in which the storage capacitor is created by a gate layer 5 and a wiring layer 7.

In the liquid crystal display device, this storage capacitor is disposed in a layer below a liquid crystal cell associated with the storage capacitor.

According to the present invention, by further creating the counter electrode between a pixel electrode and the electrode on the pixel potential side of the storage capacitor and thereby increasing the capacitance of the storage capacitor twofold, a necessary storage capacitor can be secured sufficiently even when an area in which the storage capacitor can be disposed in each pixel is reduced due to increased resolution or the like.

Fifth Embodiment

It is to be noted that while in the foregoing first to third embodiments, the present invention is applied to cases where an imbalance occurs in the layout of a TFT substrate due to the disposition of a memory unit, a sensor circuit, or a spacer, and an area in which a storage capacitor can be created is decreased in a particular pixel, the present invention is not limited to this, but is widely applicable to cases where an imbalance occurs in the layout of a TFT substrate due to the disposition of a constitution other than a memory unit, a sensor circuit, or a spacer as described above, and an area in which a storage capacitor can be created is decreased in a particular pixel.

In addition, in the foregoing embodiments, description has been made of a case where switching is performed between the memory system and the analog driving system to display a desired image, or a case where a desired image is displayed by the analog driving system. However, the present invention is not limited to this, but is widely applicable to a case where a desired image is displayed by only the analog driving system, a case where a desired image is displayed by only the memory system, and the like.

In addition, in the foregoing embodiments, description has been made of a case where a shield layer or a separate counter electrode is provided. However, the present invention is not limited to this. A liquid crystal display device may be formed with a combination of the shield layer and the separate counter electrode.

In addition, in the foregoing embodiments, description has been made of a case where a shield layer or the like is created by using a wiring layer. However, the present invention is not limited to this. For example, a shield layer or the like may be created by using a common electrode layer in an FFS system or an ISP system. Further, a shield layer or the like may be created by laminating a separate metallic film or the like.

An intra-pixel selector system will hereinafter be described in detail.

For this kind of liquid crystal display device, a so-called intra-pixel selector system is also provided by which system the gradation of each pixel is set. The intra-pixel selector system has a selector provided for a unit of a plurality of pixels in a display unit, and sequentially sets the gradations of a plurality of liquid crystal cells forming the plurality of pixels by the selector.

Figure 40:
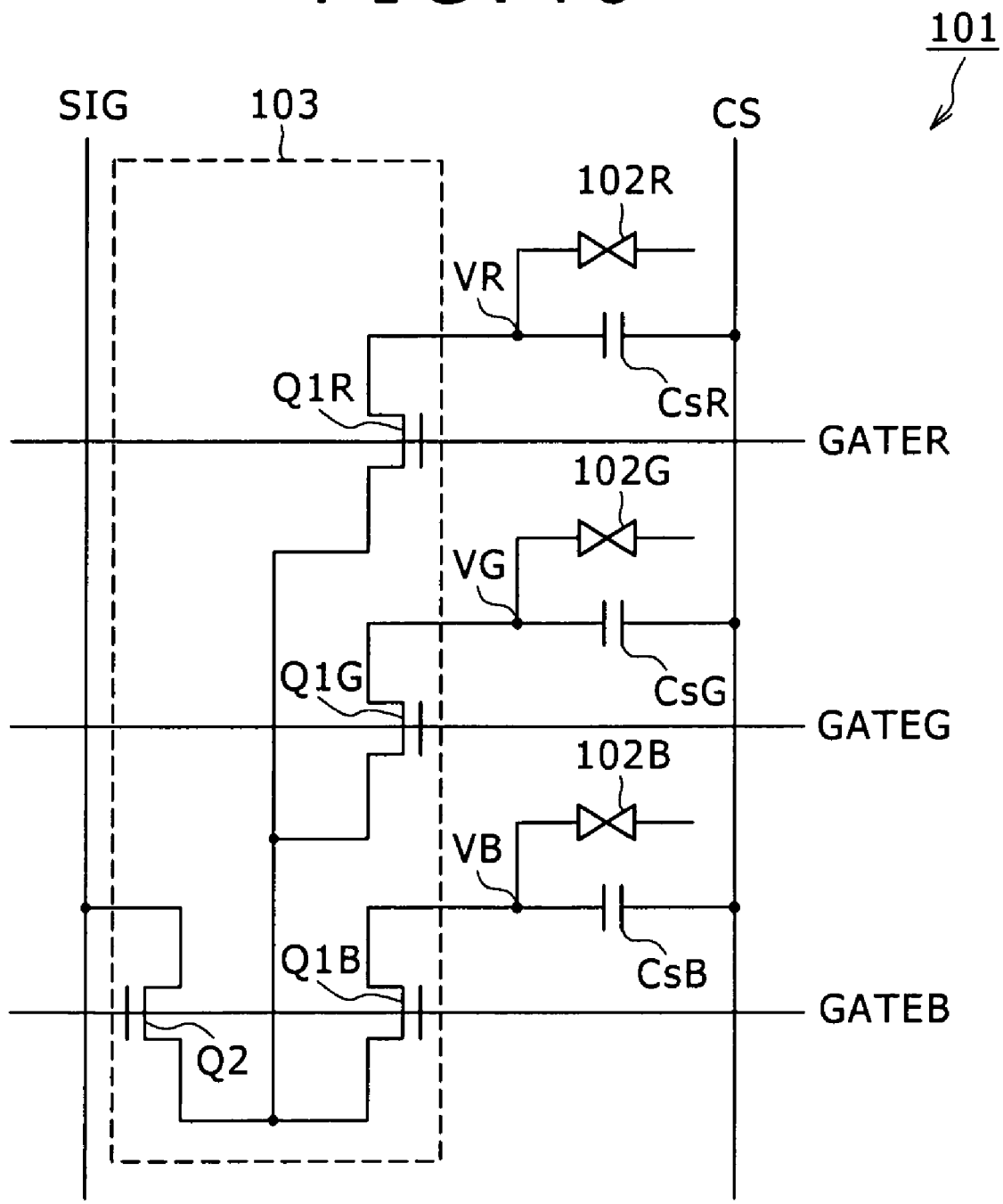
FIG. 40 is a connection diagram showing a basic unit of a liquid crystal display device based on an intra-pixel selector system.

FIG. 40 is a connection diagram showing a basic unit of a liquid crystal display device based on the intra-pixel selector system. The basic unit 101 is a constituent unit of a display unit based on the intra-pixel selector system. The display unit of the liquid crystal display device is formed by arranging such basic units 101 in the form of a matrix. In the example of FIG. 40, the basic unit 101 has one selector 103 provided for three sub-pixels formed by liquid crystal cells 102R, 102G, and 102B of red, green, and blue. In the basic unit 101, the common electrode of the liquid crystal cells 102R, 102G, and 102B is connected to a common signal line, and the signal line is connected to a driving power supply for the common electrode which power supply is not shown in the figure. Incidentally, CsR, CsG, and CsB denote a storage capacitor. The storage capacitors CsR, CsG, and CsB have one terminal connected to the pixel electrodes of the liquid crystal cells 102R, 102G, and 102B, respectively, and have another terminal supplied with a driving signal CS for precharge. The pixel electrodes of the liquid crystal cells 102R, 102G, and 102B of red, green, and blue are connected to an NMOS transistor Q2 via NMOS transistors Q1R, Q1G, and Q1B, which perform an on/off operation according to gate signals GATER, GATEG, and GATEB, respectively. The transistor Q2 performs an on/off operation according to the gate signal GATEB for blue. The transistor Q2 connects the transistors Q1R, Q1G, and Q1B to a signal line SIG.

Figure 41:
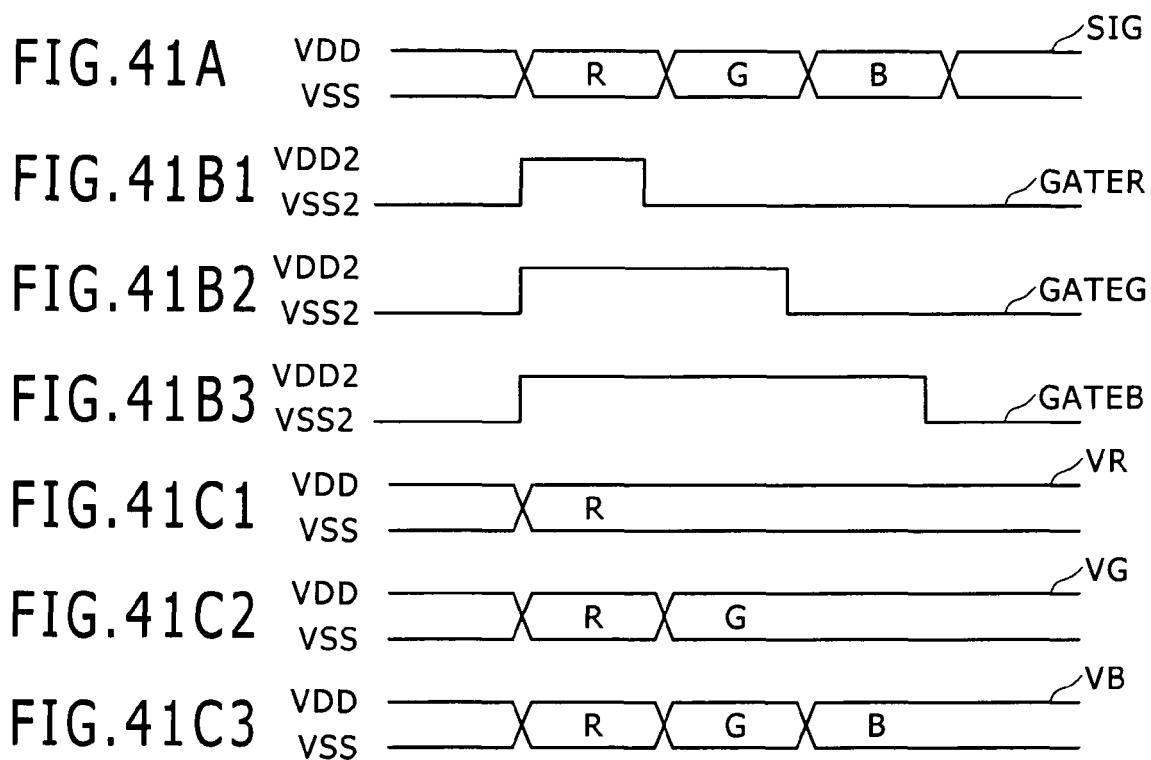

As shown in FIGS. 41A to 41C3, a horizontal driving unit sets the voltage of the signal line SIG for the basic unit 101 to voltages corresponding to the gradations of the liquid crystal cells 102R, 102G, and 102B of red, green, and blue on a time division basis (FIG. 41A). Incidentally, in FIGS. 41A to 41C3, the voltages corresponding to the gradations of the respective liquid crystal cells 102R, 102G, and 102B are indicated by references R, G, and B. In the basic unit 101, the transistors Q1R, Q1G, Q1B, and Q2 are set in an on state according to the gate signals GATER, GATEG, and GATEB, and are sequentially set in an off state in such a manner as to be interlocked with the setting of the voltage of the signal line SIG (FIGS. 41B1, 41B2, and 41B3). Specifically, in a period in which the voltage of the signal line SIG is set to a voltage R corresponding to the gradation of the red liquid crystal cell 102R, the transistors Q1R, Q1G, Q1B, and Q2 are raised to an on state, and thereafter the transistor Q1R connected to the red liquid crystal cell 102R is changed to an off state. Thereby a voltage VR of the pixel electrode of the red liquid crystal cell 102R is set to the voltage R of the signal line SIG (FIG. 41C1). Next, in a period in which the voltage of the signal line SIG is set to a voltage G corresponding to the gradation of the green liquid crystal cell 102G, the transistor Q1G connected to the green liquid crystal cell 102G is changed to an off state. Thereby a voltage VG of the pixel electrode of the green liquid crystal cell 102G is set to the voltage G of the signal line SIG (FIG. 41C2). Next, in a period in which the voltage of the signal line SIG is set to a voltage B corresponding to the gradation of the blue liquid crystal cell 102B, the transistor Q1B connected to the blue liquid crystal cell 102B is changed to an off state together with the transistor Q2. Thereby a voltage VB of the pixel electrode of the blue liquid crystal cell 102B is set to the voltage B of the signal line SIG (FIG. 41C3).

In regard to such a liquid crystal display device, Japanese Patent Laid-Open No. Hei 9-243995 discloses a constitution in which a memory is provided for each pixel, and each pixel is driven according to a recording of the memory. This system will hereinafter be referred to as a memory system. This memory system makes it possible to omit a gradation setting process for each pixel once the gradation of each pixel is set, and can thus reduce power consumption.

Figure 42:
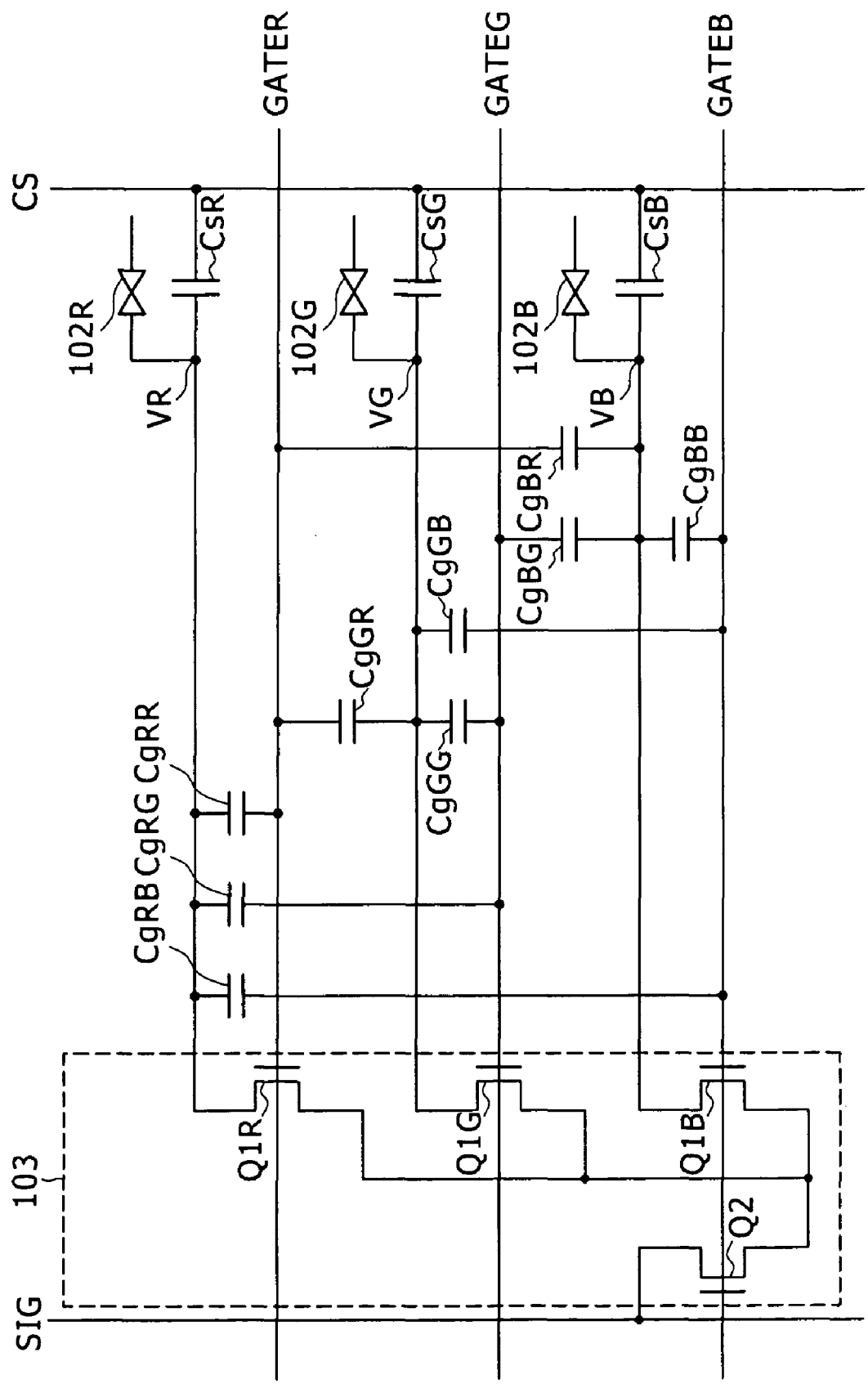
FIG. 42 is a connection diagram of assistance in explaining parasitic capacitances in the basic unit of FIG. 40.

In the basic unit 101 of the intra-pixel selector system shown in FIGS. 41A to 41C3, as shown in FIG. 42, capacitances Cg occur between scanning lines for the respective gate signals GATER, GATEG, and GATEB and the pixel electrodes of the respective liquid crystal cells 102R, 102G, and 102B. In this case, CgRR, CgRG, and CgRB denote capacitances between the pixel electrode of the red liquid crystal cell 102R and the scanning lines for the respective gate signals GATER, GATEG, and GATEB, respectively. CgGR, CgGG, and CgGB denote capacitances between the pixel electrode of the green liquid crystal cell 102G and the scanning lines for the respective gate signals GATER, GATEG, and GATEB, respectively. CgBR, CgBG, and CgBB denote capacitances between the pixel electrode of the blue liquid crystal cell 102B and the scanning lines for the respective gate signals GATER, GATEG, and GATEB, respectively.

As a result, due to gate coupling by these capacitances Cg in the basic unit 101, the potentials VR, VG, and VB of the pixel electrodes set in the respective liquid crystal cells 102R, 102G, and 102B change when the signal levels of the gate signals GATER, GATEG, and GATEB are changed.

In the basic unit 101, as shown in FIGS. 43A to 43C3 by contrast with FIGS. 41A to 41C3, the transistor Q1R is first made to perform an off operation by the gate signal GATER for red, and the gradation of the red liquid crystal cell 102R is set. Thereafter, the transistors Q1G and Q1B are sequentially made to perform an off operation by the gate signals GATEG and GATEB for green and blue, and the gradations of the green liquid crystal cell 102G and the blue liquid crystal cell 102B are set. Thus, the potential VR of the pixel electrode of the red liquid crystal cell 102R is lowered each time the signal levels of the gate signals GATER, GATEG, and GATEB for red, green, and blue are lowered. The potential VG of the pixel electrode of the green liquid crystal cell 102G is sequentially lowered due to the falling edges of the signal levels of the gate signals GATEG and GATEB for green and blue. The potential VB of the pixel electrode of the blue liquid crystal cell 102B is lowered due to the falling edge of the signal level of the gate signal GATEB for blue.

As a result, in the basic unit 101, the potential VR, the potential VG, and the potential VB set at the pixel electrodes via the signal line SIG are changed, and amounts of change ΔVR, ΔVG, and ΔVB in the potential VR, the potential VG, and the potential VB are decreased in order of the red liquid crystal cell 102R, the green liquid crystal cell 102G, and the blue liquid crystal cell 102B. The amounts of change ΔVR, ΔVG, and ΔVB in the potential VR, the potential VG, and the potential VB of the pixel electrodes are caused by driving by the gate signals GATER, GATEG, and GATEB, and are thus maintained at substantially fixed values even when the driving of the signal line SIG on the basis of field reversal, frame reversal, line reversal, or the like is changed.

The intra-pixel selector system thus has a problem in that a direct-current electric field is applied to a liquid crystal between a plurality of liquid crystal cells to which one selector is assigned. Incidentally, when a direct-current electric field continues being thus applied to a liquid crystal, the liquid crystal is degraded in a liquid crystal display device.

Embodiments below are to propose a liquid crystal display device that can prevent application of a direct-current electric field to a liquid crystal when each liquid crystal cell is driven by the intra-pixel selector system.

Sixth Embodiment (1) Constitution of Embodiment

Figure 23:
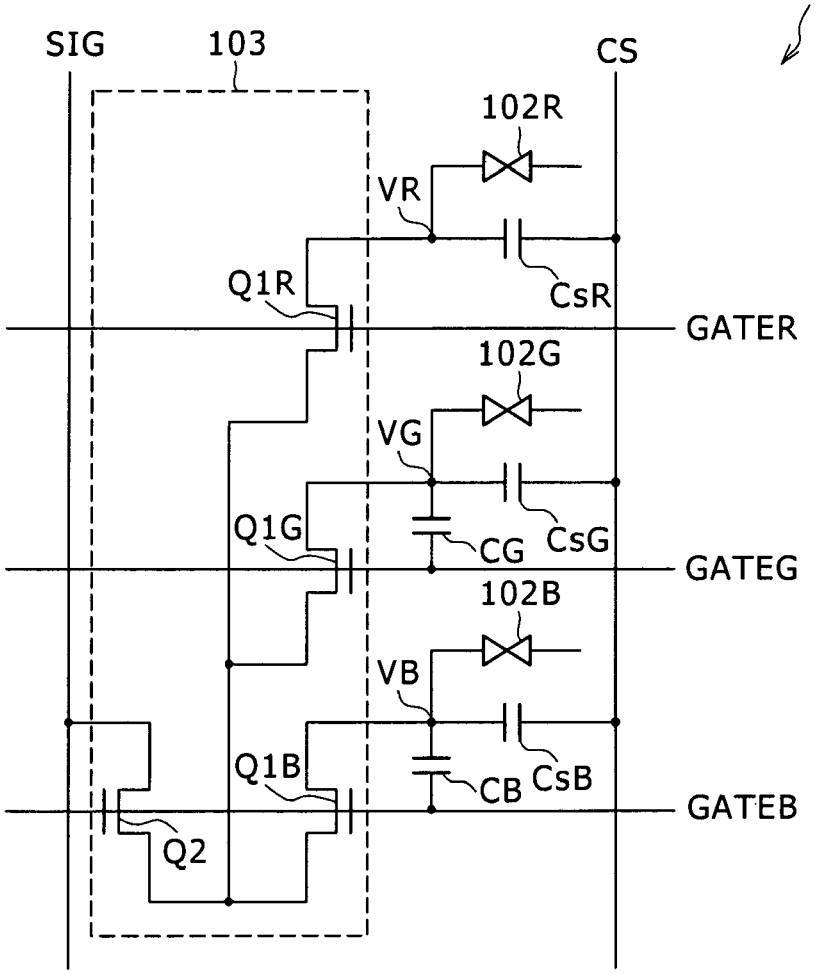
FIG. 23 is a connection diagram showing a basic unit of a liquid crystal display device according to a sixth embodiment of the present invention.

FIG. 23 is a block diagram showing a liquid crystal display device according to a sixth embodiment of the present invention. This liquid crystal display device 111 is a liquid crystal display device based on the intra-pixel selector system, in which device a display unit 112 is formed by arranging pixels formed by liquid crystal cells in the form of a matrix. A horizontal driving unit 113 and a vertical driving unit 114 drive the display unit 112 to display a desired image on the display unit 112. The display unit 112 is formed by arranging predetermined basic units in the form of a matrix, whereby the pixels formed by the liquid crystal cells are arranged in the form of a matrix.

FIG. 23 is a connection diagram showing a basic unit forming the display unit 112 by contrast with FIG. 40. In FIG. 23, the same constituent elements as in FIG. 40 are identified by the corresponding reference numerals, and repeated description thereof will be omitted. This basic unit 116 has pixel electrode potential correcting capacitances CG and CB provided between the respective pixel electrodes of a green liquid crystal cell 102G and a blue liquid crystal cell 102B other than a red liquid crystal cell 102R whose amount of change ΔVR is largest among the amounts of change ΔVR, ΔVG, and ΔVB in the potential VR, the potential VG, and the potential VB of the pixel electrodes described with reference to FIGS. 43A to 43C3 and scanning lines for gate signals GATEG and GATEB. The basic unit 116 is formed in the same manner as the basic unit 101 of FIG. 40 except for a constitution related to the pixel electrode potential correcting capacitances CG and CB. Hence, in the basic unit 116, the gradations of the respective liquid crystal cells 102R, 102G, and 102B are sequentially set in the same manner as described with reference to FIGS. 41A to 41C3.

In the configuration shown in FIG. 23, the falling edge voltage ΔVR of the potential VR of the pixel electrode of the red liquid crystal cell 102R due to the falling edge of a gate signal GATER for the red liquid crystal cell 102R can be expressed by a voltage obtained by dividing a change in voltage of the gate signal GATER by a capacitance between the pixel electrode of the liquid crystal cell 102R and a ground and a capacitance CgRR between the pixel electrode and a scanning line for the gate signal GATER. Hence, this amount ΔVR of voltage change can be expressed by the following equation, where CtotalR is a total capacitance of capacitances between the pixel electrode of the red liquid crystal cell 102R and all other parts, and ΔVg is an amount of change in voltage of the gate signals GATER, GATEG, and GATEB.

$$\Delta VRR = \frac{CgRR}{CtotalR} = \Delta Vg \quad (1)$$

In addition, in the red liquid crystal cell 102R, a falling edge amount ΔVRG of the potential VR of the pixel electrode of the red liquid crystal cell 102R due to the falling edge of the gate signal GATEG for the green liquid crystal cell 102G can be similarly expressed by a voltage obtained by dividing a change in voltage of the gate signal GATEG by the capacitance between the pixel electrode of the liquid crystal cell 102R and the ground and a capacitance CgRG between the pixel electrode and the scanning line for the gate signal GATEG. In addition, in the red liquid crystal cell 102R, a falling edge amount ΔVRB of the potential VR of the pixel electrode of the red liquid crystal cell 102R due to the falling edge of the gate signal GATEB for the blue liquid crystal cell 102B can be similarly expressed by a voltage obtained by dividing a change in voltage of the gate signal GATEB by the capacitance between the pixel electrode of the liquid crystal cell 102R and the ground and a capacitance CgRB between the pixel electrode and the scanning line for the gate signal GATEB. Hence, these amounts ΔVRG and ΔVRB of voltage change can be expressed by the following equations, where CtotalG is a total capacitance of capacitances between the pixel electrode of the green liquid crystal cell 102G and all other parts, and CtotalB is a total capacitance of capacitances between the pixel electrode of the blue liquid crystal cell 102B and all other parts.

$$\Delta VRG = \frac{CgRG}{CtotalR} \times \Delta Vg \quad (2)$$

$$\Delta VRB = \frac{CgRg}{CtotalR} \times \Delta Vg \quad (3)$$

Hence, the voltage drop amount ΔVR of the pixel electrode potential VR at the red liquid crystal cell 102R described with reference to FIGS. 43A to 43C3 can be expressed by the following equation.

$$\Delta VR = \Delta VRR + \Delta VRG + VRB \quad (4)$$

$$= \frac{CgRR + CgRG + CgRB}{CtotalR} \times \Delta Vg$$

Similarly, the amounts ΔVG and ΔVB of change in the pixel electrode potentials VG and VB at the green liquid crystal cell 102G and the blue liquid crystal cell 102B can be expressed by the following equations, respectively.

$$\Delta VG = \Delta VGG + \Delta VGB = \frac{CgGG + CgGB}{CtotalG} = \Delta Vg \quad (5)$$

$$\Delta VB = \Delta VGB = \frac{CgBB}{CtotalB} = \Delta Vg \quad (6)$$

When the pixel electrode potential correcting capacitances CG and CB are removed, the capacitances CgRR, CgGG, and CgBB between the pixel electrodes of the respective liquid crystal cells 102R, 102G, and 102B and the scanning lines for the corresponding gate signals GATER, GATEG, and GATEB can be made substantially equal to each other by setting the layout of the transistors Q1R, Q1G, and Q1B and the like identical with each other between these liquid crystal cells 102R, 102G, and 102B. Hence, letting CE be the equal capacitances, the capacitances CgRR, CgGG, and CgBB can be expressed as CE, CE+CG, and CE+CB, respectively.

Letting CE and CE+CG be respectively CgRR and CgGG in Equation (4) and Equation (5), and setting ΔVR=ΔVG, the following relational equation can be obtained.

$$\frac{CE + CgRG + CgRB}{CtotalR} \times \Delta Vg = \frac{CE + CG + CgGB}{CtotalG} \times \Delta Vg \quad (7)$$

In this case, because CtotalR≈CtotalG, the following relational equation can be obtained when this Equation (7) is rearranged.

$$CG = CgRG + CgRB - CgGB \quad (8)$$

The pixel electrode potential correcting capacitance CG is set to a capacitance obtained by subtracting a capacitance CgGB between the pixel electrode of the green liquid crystal cell 102G and the scanning line for the gate signal GATEB for blue from a combined capacitance of the capacitance CgRG between the pixel electrode of the red liquid crystal cell 102R and the scanning line for the gate signal GATEG for green and the capacitance CgRB between the pixel electrode of the red liquid crystal cell 102R and the scanning line for the gate signal GATEB for blue, so as to satisfy the relational equation of Equation (8).

Similarly, letting CE and CE+CB be respectively CgRR and CgGB in Equation (4) and Equation (6), and setting ΔVR=ΔVB, the following relational equation can be obtained.

$$\frac{CE + CgRG + CgRB}{CtotalR} \times \Delta Vg = \frac{CE + CB}{CtotalG} \times \Delta Vg \quad (9)$$

Setting CtotalG≈CtotalB and rearranging this Equation (9), the following relational equation can be obtained.

$$CB = CgRG + CgRB \quad (10)$$

The pixel electrode potential correcting capacitance CB is set to the combined capacitance of the capacitance CgRG between the pixel electrode of the red liquid crystal cell 102R and the scanning line for the gate signal GATEG for green and the capacitance CgRB between the pixel electrode of the red liquid crystal cell 102R and the scanning line for the gate signal GATEB for blue, so as to satisfy the relational equation of Equation (10).

Figure 25A:
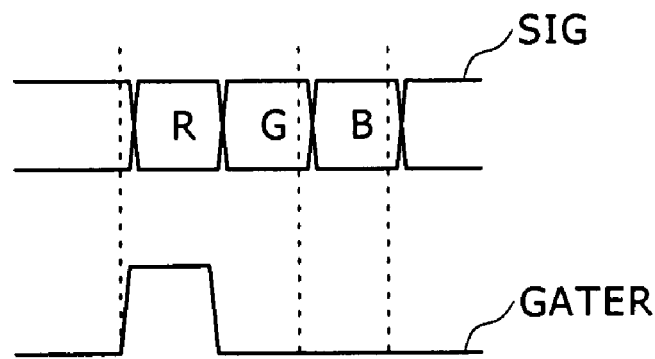

The pixel electrode potential correcting capacitances CG and CB are set so as to satisfy these relational equations of Equation (8) and Equation (10). As shown in FIGS. 25A to 25C3 by contrast with FIGS. 43A to 43C3, the basic unit 116 is set such that the voltage drops ΔVR, ΔVG, and ΔVB of the pixel electrode potentials VR, VG, and VB due to gate coupling at the red liquid crystal cell 102R, the green liquid crystal cell 102G, and the blue liquid crystal cell 102B are substantially equal to each other. It is thereby possible to prevent the application of a direct-current electric field to a liquid crystal in these adjacent liquid crystal cells 102R, 102G, and 102B of red, green, and blue.

Figure 26:
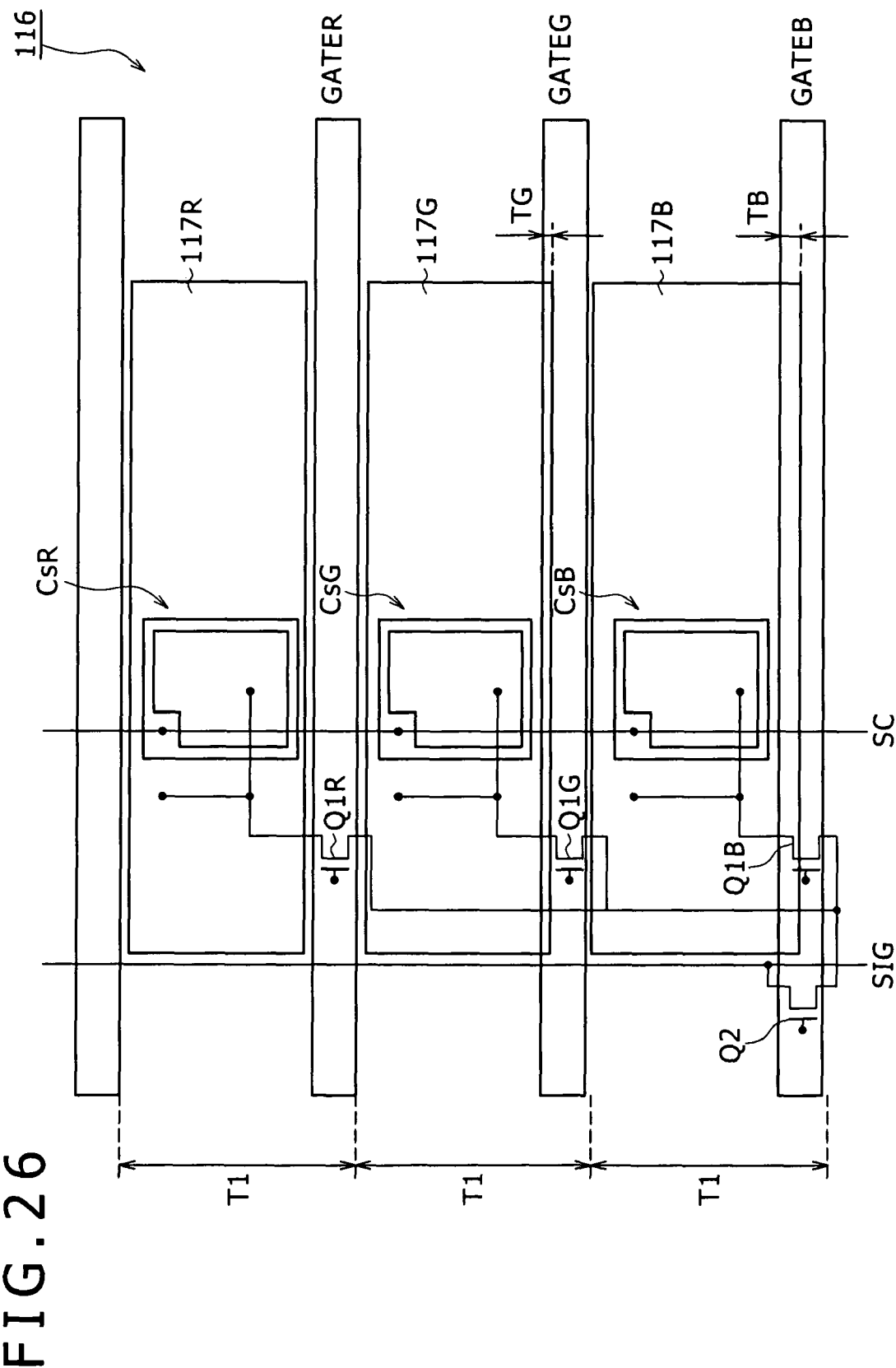
FIG. 26 is a plan view of a layout of the basic unit of FIG. 23.

FIG. 26 is a plan view of a layout of the basic unit 116. In the display unit 112, the scanning lines for the gate signals GATER, GATEG, and GATEB are sequentially provided at a fixed pitch T1. The basic unit 116 has pixel electrodes 117R, 117G, and 117B of red, green, and blue sequentially provided between adjacent scanning lines, and has corresponding storage capacitors CsR, CsG, and CsB and the like. In the basic unit 116, the pixel electrode 117G of the green liquid crystal cell 102G and the pixel electrode 117B of the blue liquid crystal cell 102B are formed in a larger size than the pixel electrode 117R of the red liquid crystal cell 102R in a direction along the signal line SIG such that the pixel electrodes 117G and 117B of the green liquid crystal cell 102G and the blue liquid crystal cell 102B overlap the scanning lines for the gate signals GATEG and GATEB for green and blue by predetermined amounts TG and TB, respectively. Thereby the pixel electrode potential correcting capacitances CG and CB are created by the overlapped parts. The liquid crystal cells 102R, 102G, and 102B are each formed by an identical layout, except for a layout relating to the pixel electrodes 117R, 117G, and 117B and a transistor Q2.

(2) Operation of Sixth Embodiment

Figure 24:
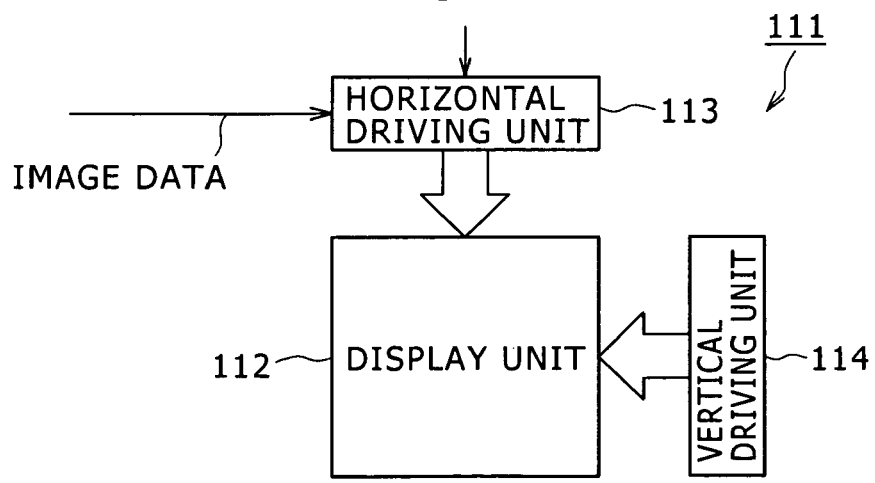
FIG. 24 is a block diagram showing the liquid crystal display device according to the sixth embodiment of the present invention.

In the liquid crystal display device 111 (FIG. 24) having the above constitution, the horizontal driving unit 113 and the vertical driving unit 114 drive the display unit 112 to set the gradation of each pixel formed by a liquid crystal cell provided in the display unit 112. Thereby a desired image can be displayed on the display unit 112.

In addition, in the display unit 112 (FIG. 23), the pixel electrode potentials VR, VG, and VB of the adjacent liquid crystal cells 102R, 102G, and 102B of red, green, and blue are sequentially set to the voltage of the signal line SIG via the selector formed by the transistors Q1R, Q1G, Q1B, and Q2. Thereby the gradation of each pixel is set by the intra-pixel selector system to display a desired image.

However, in the intra-pixel selector system, the signal levels of the gate signal GATER for red, the gate signal GATEG for green, and the gate signal GATEB for blue are changed to sequentially perform on-off control on the transistors Q1R, Q1G, Q1B, and Q2, and the pixel electrodes of the liquid crystal cells 102R, 102G, and 102B assigned to one selector are sequentially connected to the signal line SIG to set the gradations of the plurality of liquid crystal cells 102R, 102G, and 102B. Thus the pixel electrode potentials VR, VG, and VB are decreased due to gate coupling (FIG. 42). In addition, the pixel electrode potential VR, VG, or VB that is set earlier to one of the liquid crystal cells 102R, 102G, and 102B assigned to one selector is decreased more (FIGS. 43A to 43C3). As a result, when no device is provided, direct-current potential differences occur between the pixel electrodes of the plurality of liquid crystal cells 102R, 102G, and 102B assigned to one selector, and a direct-current electric field is applied to a liquid crystal.

Accordingly, in the liquid crystal display device 111 according to the present embodiment, the basic unit 116 has the pixel electrode potential correcting capacitances CG and CB provided therein such that the capacitances CgGG and CgBB between the pixel electrodes of the liquid crystal cells 102G and 102B, to which the pixel electrode potentials are set later, and the scanning lines for the corresponding gate signals GATER and GATEB are increased. Thereby, in each basic unit 116, the pixel electrode potentials of the liquid crystal cells 102G and 102B to which the pixel electrode potentials are set later are lowered more greatly by gate coupling (FIGS. 25A to 25C3). Thus, direct-current potential differences between the pixel electrodes of the plurality of liquid crystal cells 102R, 102G, and 102B assigned to one selector are eliminated, and the application of a direct-current electric field to a liquid crystal is prevented.

In the liquid crystal display device 111, the pixel electrode potential correcting capacitances CG and CB are created by overlaps between the corresponding pixel electrodes and the scanning lines (FIG. 26). Thereby the application of a direct-current electric field to a liquid crystal can be prevented by simply improving a mask for manufacturing.

(3) Effect of Sixth Embodiment

According to the above constitution, a setting is made so as to increase a capacitance between the pixel electrode of a liquid crystal cell to which a pixel electrode potential is set later among a plurality of liquid crystal cells assigned to one selector by the intra-pixel selector system and a scanning line for a corresponding gate signal. Thereby the application of a direct-current electric field to a liquid crystal can be prevented between the plurality of liquid crystal cells assigned to one selector. Thus the reliability of the liquid crystal display device can be improved as compared with the existing liquid crystal display device.

In addition, the capacitance between the pixel electrode and the scanning line for the corresponding gate signal is increased by an overlap between the corresponding pixel electrode and the scanning line. Thereby the application of a direct-current electric field to a liquid crystal can be prevented with a simple constitution.

Seventh Embodiment

Figure 27:
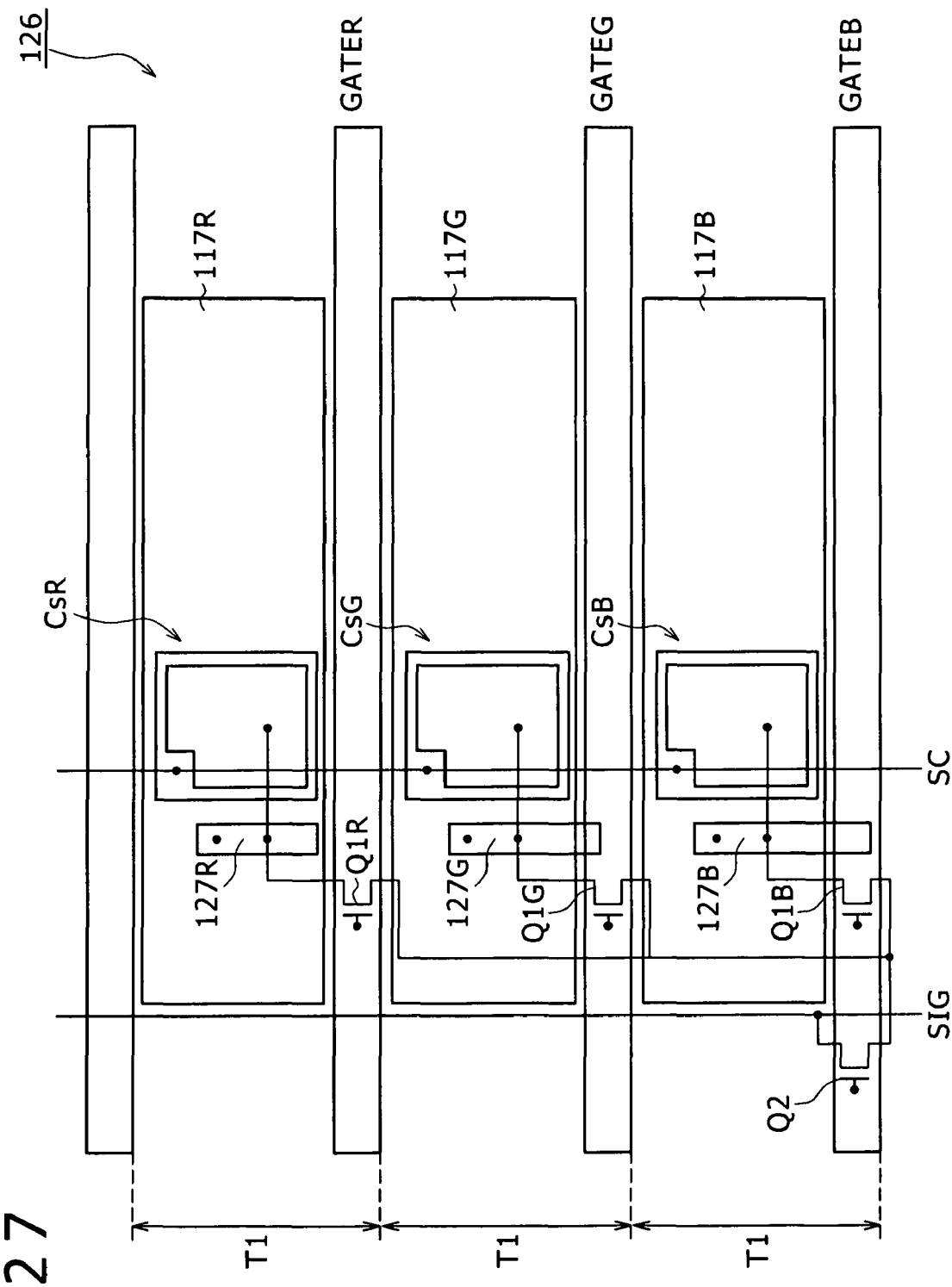
FIG. 27 is a plan view of a layout of a basic unit of a liquid crystal display device according to a seventh embodiment of the present invention.

FIG. 27 is a plan view of a layout of a basic unit in a liquid crystal display device according to a seventh embodiment of the present invention. The liquid crystal display device according to the present embodiment is formed in the same manner as the liquid crystal display device according to the sixth embodiment except that the basic unit 126 based on the layout of FIG. 27 is applied in place of the basic unit 116 based on the layout of FIG. 26. In this basic unit 126, pixel electrode potential correcting capacitances are created by making wiring patterns 127R, 127G, and 127B for connecting transistors Q1R, Q1G, and Q1B to pixel electrodes 117R, 117G, and 117B in place of the pixel electrodes 117R, 117G, and 117B of respective liquid crystal cells 102R, 102G, and 102B overlap corresponding scanning lines.

Hence, in the red liquid crystal cell 102R in FIG. 27, the wiring pattern 127R for connecting the transistor Q1R to the pixel electrode 117R is created without overlapping the corresponding scanning line at all. In the green liquid crystal cell 102G, on the other hand, the wiring pattern 127G for connecting the transistor Q1G to the pixel electrode 117G is created so as to overlap the corresponding scanning line by a predetermined area, whereby the pixel electrode potential correcting capacitance CG of the green liquid crystal cell 102G is created. Further, in the blue liquid crystal cell 102B, the wiring pattern 127B for connecting the transistor Q1B to the pixel electrode 117B is created so as to overlap the corresponding scanning line in a larger area, whereby the pixel electrode potential correcting capacitance CB of the blue liquid crystal cell 102B is created.

Similar effects to those of the first embodiment can be obtained even when pixel electrode potential correcting capacitances are created by making wiring patterns for connecting transistors forming a selector to pixel electrodes overlap corresponding scanning lines as in the present embodiment.

Eighth Embodiment

Figure 28:
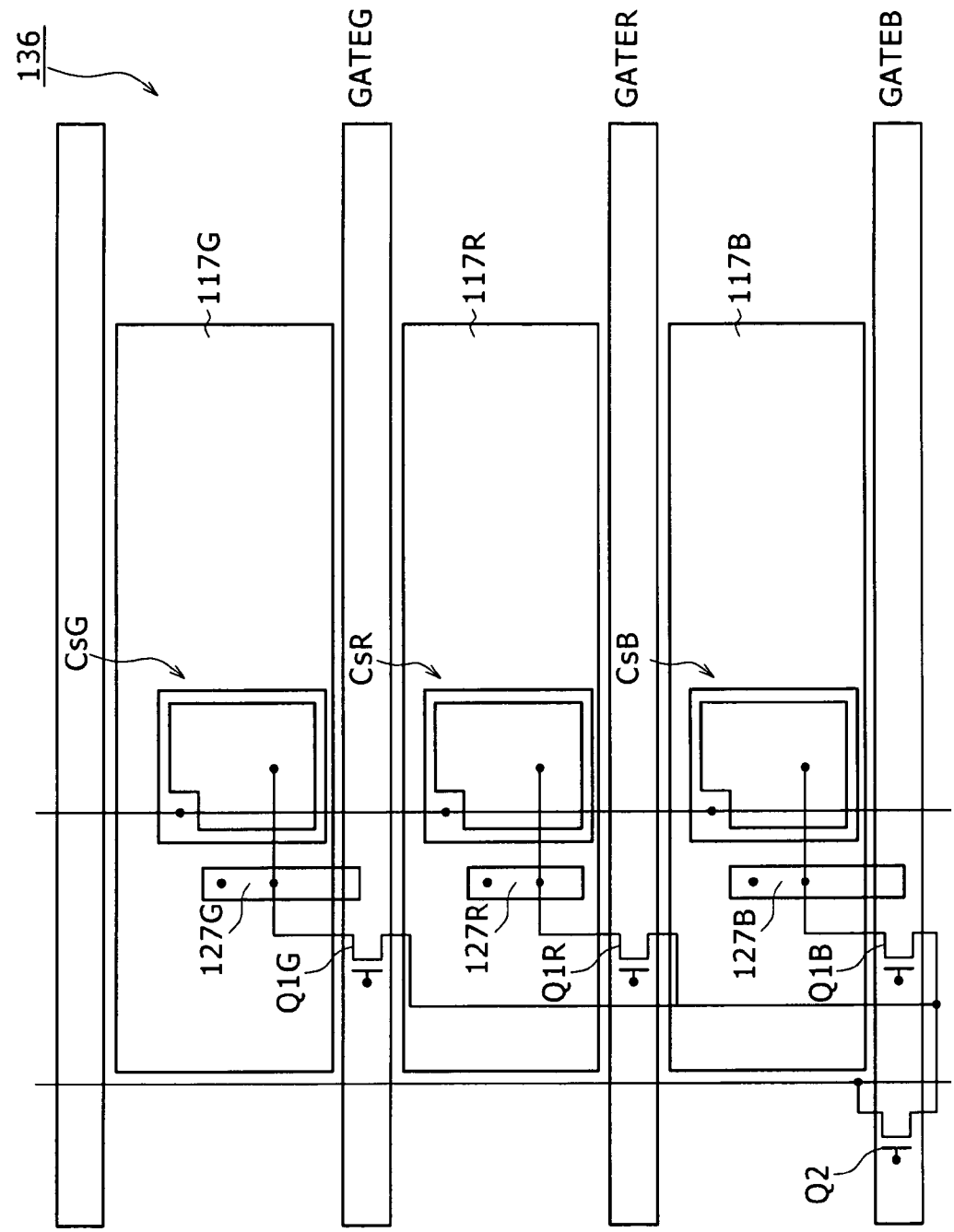
FIG. 28 is a plan view of a layout of a basic unit of a liquid crystal display device according to an eighth embodiment of the present invention.

FIG. 28 is a plan view of a layout of a basic unit in a liquid crystal display device according to an eighth embodiment of the present invention. The liquid crystal display device according to the present embodiment is formed in the same manner as the liquid crystal display device according to the seventh embodiment except that the basic unit 136 based on the layout of FIG. 28 is applied in place of the basic unit 126 based on the layout of FIG. 27.

In the basic unit 136 according to the present embodiment, the aperture ratios of a red liquid crystal cell 102R, a green liquid crystal cell 102G, and a blue liquid crystal cell 102B are set in consideration of the transmittance of a color filter. The areas of pixel electrodes 117R, 117G, and 117B of the red liquid crystal cell 102R, the green liquid crystal cell 102G, and the blue liquid crystal cell 102B are set to secure the aperture ratios. More specifically, the aperture ratios of the red liquid crystal cell 102R and the blue liquid crystal cell 102B are set to equal values, and the aperture ratio of the green liquid crystal cell 102G is set to a value higher than the aperture ratios of the red liquid crystal cell 102R and the blue liquid crystal cell 102B. Thereby, in the basic unit 136, the pixel electrodes 117R and 117B in the red liquid crystal cell 102R and the blue liquid crystal cell 102B are set in equal areas, whereas the pixel electrode 117G in the green liquid crystal cell 102G is set in an area larger than the pixel electrodes 117R and 117B in the red liquid crystal cell 102R and the blue liquid crystal cell 102B.

In addition, the liquid crystal cells 102G, 102R, and 102B are arranged in order of the green liquid crystal cell 102G, the red liquid crystal cell 102R, and the blue liquid crystal cell 102B so as to correspond to the settings of the aperture ratios. Thereby a whiteness level and white luminance on a display screen are optimized.

On the other hand, a general-purpose integrated unit is applied as a horizontal driving unit and a vertical driving unit for driving a display unit based on the basic unit 136. The horizontal driving unit and the vertical driving unit set the gradations of the respective liquid crystal cells 102G, 102R, and 102B in the same order as in the foregoing sixth and seventh embodiments. Incidentally, pixel electrode potential correcting capacitances may be created by overlaps between the pixel electrodes 117G and 117B and scanning lines as described above in the sixth embodiment in place of overlaps between wiring patterns 127G and 127B and the scanning lines.

Similar effects to those of the foregoing embodiments can be obtained even when the order of arrangement of the liquid crystal cells and gradation setting order are changed as in the present embodiment.

Ninth Embodiment

Effect of gate coupling of a next liquid crystal cell but one on variation in pixel electrode potential may be ignored depending on the layout of a substrate having pixel electrodes arranged thereon, decreased amplitude of gate signals GATER, GATEG, and GATEB, or the like.

Figure 30A:
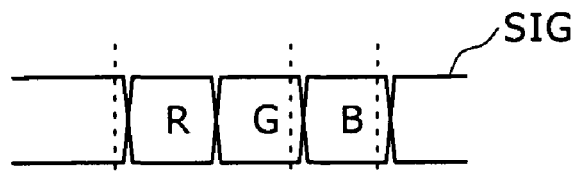
Figure 31:
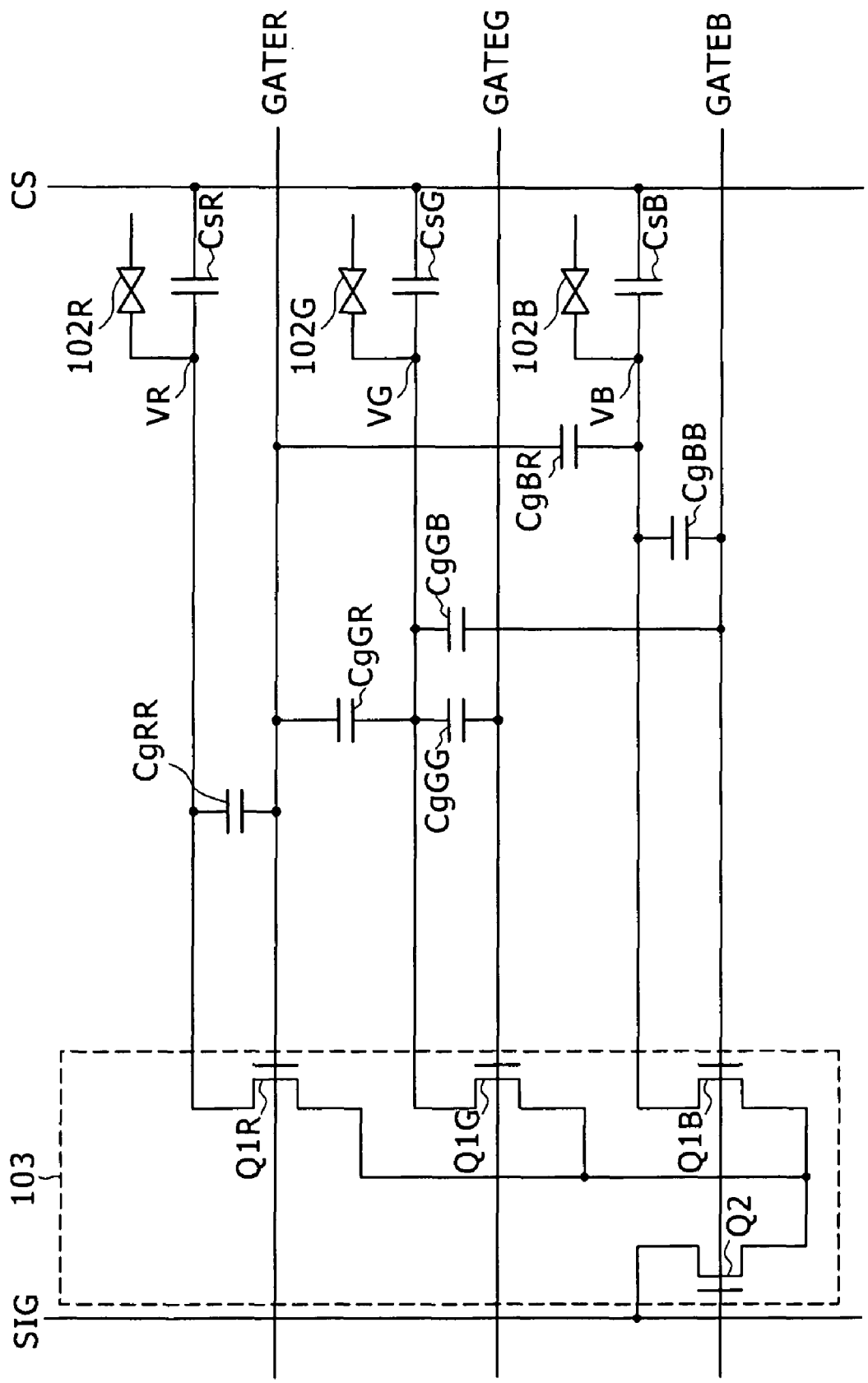
FIG. 31 is a connection diagram of assistance in explaining effects of gate coupling in the liquid crystal display device according to the ninth embodiment of the present invention.

In this case, when the gradations of respective liquid crystal cells are set in order of arrangement of a basic unit, as shown in FIGS. 29A to 29C3 by contrast with FIGS. 43A to 43C3, voltage drops ΔVR and ΔVG of the pixel electrodes in the red liquid crystal cell 102R and the green liquid crystal cell 102G are substantially equal to each other. On the other hand, in the case of the arrangement of the liquid crystal cells and the gradation setting order in the constitution of the eighth embodiment, as shown in FIGS. 30A to 30C3, voltage drops ΔVG and ΔVB of the pixel electrodes in the liquid crystal cells 102G and 102B disposed at both ends are substantially equal to each other. Incidentally, FIG. 31 shows parasitic capacitances affecting variations in pixel electrode potentials in the case of the arrangement of the liquid crystal cells and the gradation setting order in the constitution of the foregoing eighth embodiment by contrast with FIG. 42.

Accordingly, in the present embodiment, a pixel electrode potential correcting capacitance is disposed ignoring effect of gate coupling of a next liquid crystal cell but one in the constitutions of the foregoing sixth to eighth embodiments. In this case, when gate coupling of a next liquid crystal cell but one is ignored, Equation (7) can be expressed by the following equation.

$$\frac{CE + CgRG}{CtotalR} \times \Delta Vg = \frac{CE + CG + CgGB}{CtotalG} \times \Delta Vg \quad (11)$$

Because CtotalR≈CtotalG, the following relational equation can be obtained when this Equation (11) is rearranged.

$$CG = CgRG - CgGB \quad (12)$$

When wiring patterns at respective liquid crystal cells are laid out in the same manner, a relational equation CgRG≈CgGB holds. Thereby the pixel electrode potential correcting capacitance CG in Equation (12) is a value of zero. When the gate coupling of the next liquid crystal cell but one is similarly ignored, Equation (9) can be expressed by the following equation.

$$\frac{CE + CgRG}{CtotalR} \times \Delta Vg = \frac{CE + CB}{CtotalB} \times \Delta Vg \quad (13)$$

Setting CtotalG≈CtotalB and rearranging this Equation (13), the following relational equation can be obtained.

$$CB = CgRG \quad (14)$$

Thus, when a pixel electrode potential correcting capacitance is disposed ignoring effect of gate coupling of a next liquid crystal cell but one in the constitution of the foregoing sixth or seventh embodiment, it suffices to provide the pixel electrode potential correcting capacitance CB to only the liquid crystal cell 102B to which the pixel electrode potential is set last. Thereby, in this case, the constitution of a display panel can be simplified.

On the other hand, when a pixel electrode potential correcting capacitance is disposed ignoring effect of gate coupling of a next liquid crystal cell but one in the constitution based on the arrangement of the liquid crystal cells and the gradation setting order according to the foregoing eighth embodiment, an analysis of variation in similar pixel electrode potentials shows that it suffices to arrange substantially identical pixel electrode potential correcting capacitances CG and CB at the green liquid crystal cell 102G and the blue liquid crystal cell 102B disposed at both ends.

According to the present embodiment, similar effects to those of the foregoing embodiments can be obtained also when effect of gate coupling of a next liquid crystal cell but one can be ignored.

Tenth Embodiment

Figure 32:
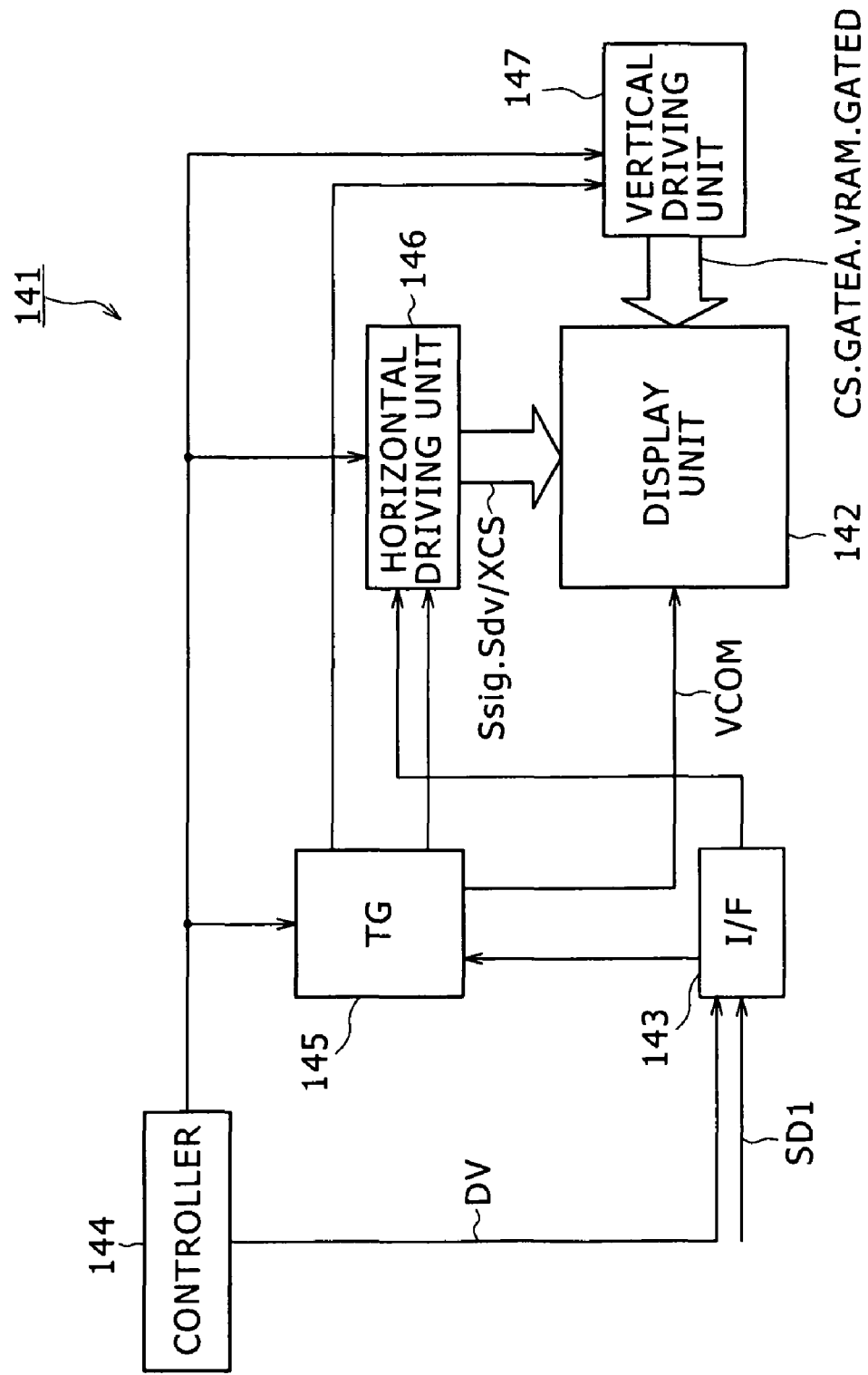
FIG. 32 is a block diagram showing a liquid crystal display device according to a tenth embodiment of the present invention.

FIG. 32 is a block diagram showing a liquid crystal display device according to a tenth embodiment of the present invention. This liquid crystal display device 141 for example displays a moving image or a still image based on video data output from a tuner unit, an external device or the like not shown in the figure on a display unit 142 by an analog driving system, and displays various menu images and the like on the display unit 142 by a memory system. Incidentally, in this case, the analog driving system is a system in which a connection is established to the pixel electrode signal line of each liquid crystal cell and a pixel electrode potential is set to the potential of the signal line, and is a driving system of the foregoing sixth to ninth embodiments.

In this liquid crystal display device 141, an interface (I/F) 143 is supplied with image data SDI formed by serial data sequentially indicating the gradation of each pixel and various timing signals synchronized with the image data SDI. Incidentally, the image data SDI is image data to be displayed on the display unit 142 by the analog driving system. In addition, the interface 143 is supplied from a controller 144 with binary image data DV to be displayed on the display unit 142 by the memory system. The interface 143 outputs the image data SDI and DV and the various timing signals input to the interface 143 to respective parts under control of the controller 144.

A timing generator (TG) 145 under control of the controller 144 generates various timing signals necessary for the memory system and the analog driving system, and then outputs the various timing signals to a horizontal driving unit 146 and a vertical driving unit 147. The timing generator 145 also generates a driving power VCOM for a common electrode of liquid crystal cells, and then outputs the driving power VCOM to the display unit 142. Incidentally, the display unit 142 in the present embodiment may be a reflective type, a transmissive type, or a combined type of a reflective type and a transmissive type.

The horizontal driving unit 146 switches operation between the analog driving system and the memory system under control of the controller 144. In the analog driving system, the horizontal driving unit 146 sequentially distributes the image data SDI input from the interface 143 to each signal line SIG, subjects the image data SDI to digital-to-analog conversion processing, and generates a driving signal Ssig for each signal line SIG on the basis of field reversal, frame reversal, line reversal, or the like. The horizontal driving unit 146 in the analog driving system outputs the driving signal Ssig to each signal line SIG of the display unit 142.

The horizontal driving unit 146 in the memory system outputs a driving signal Sdv corresponding to the logical value of the binary image data DV output from the controller 144 to a corresponding signal line SIG, and thereafter outputs a predetermined driving signal XCS to the signal line.

The vertical driving unit 147 switches operation between the analog driving system and the memory system under control of the controller 144. The vertical driving unit 147 outputs a predetermined driving signal to a scanning line of the display unit 142.

Figure 33:
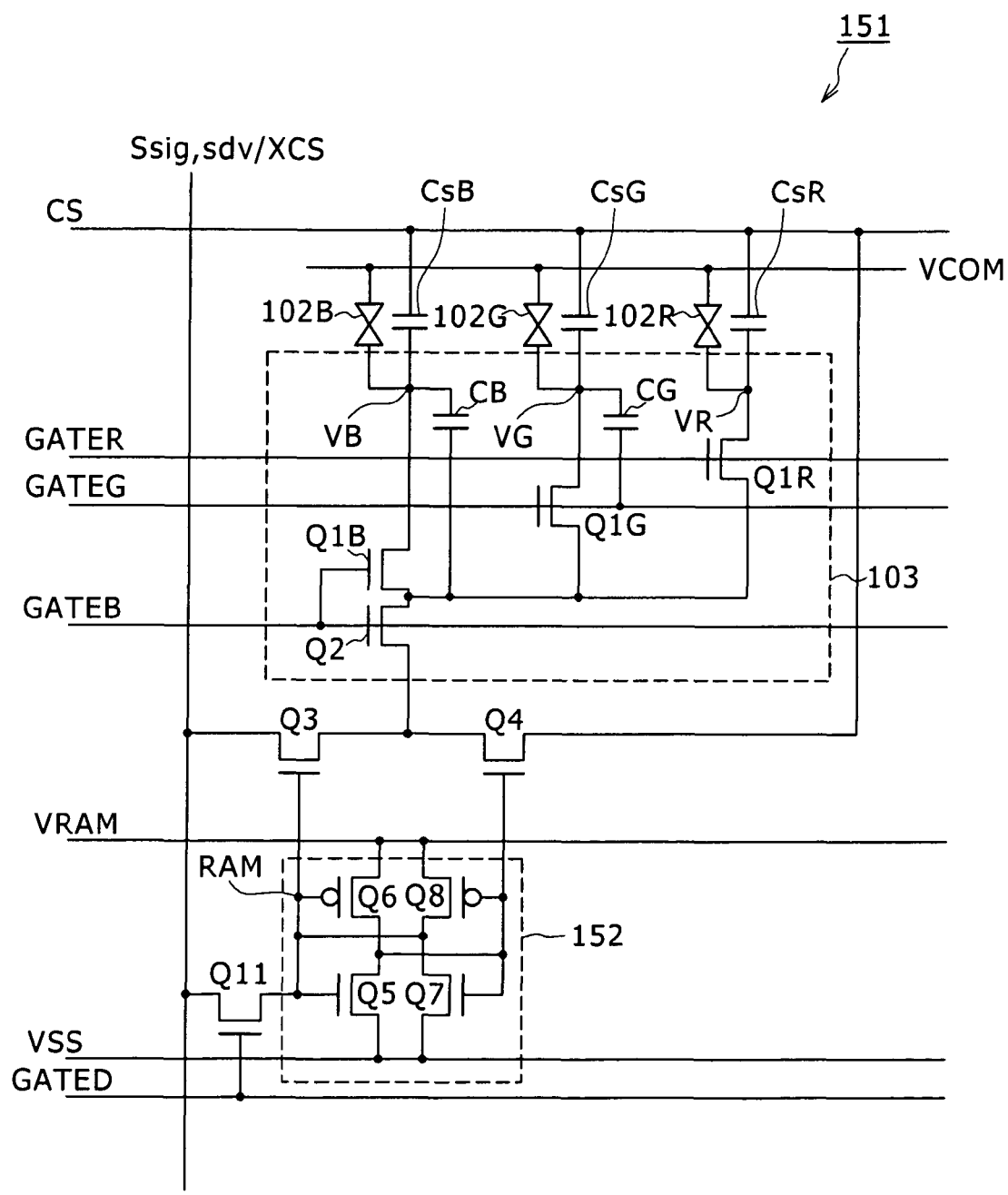
FIG. 33 is a connection diagram showing a basic unit in the liquid crystal display device according to the tenth embodiment of the present invention.

The display unit 142 operates according to the various signals output from the horizontal driving unit 146 and the vertical driving unit 147 to display an image based on the image data SDI or DV. FIG. 33 is a connection diagram showing a basic unit of the display unit 142. In the basic unit 151 of FIG. 33, the same constituent elements as in the basic unit 116 according to the sixth embodiment are identified by the corresponding reference numerals, and repeated description thereof will be omitted.

The basic unit 151 in the analog driving system connects liquid crystal cells 102R, 102G, and 102B to a signal line SIG via a selector 103 and an NMOS transistor Q3 to sequentially set the gradations of the respective liquid crystal cells 102R, 102G, and 102B. The basic unit 151 in the memory system records a setting of the signal line SIG in a memory unit 152, and thereafter sequentially sets the setting of the signal line SIG which setting is recorded in the memory unit 152 to the liquid crystal cells 102R, 102G, and 102B by the selector 103, the NMOS transistor Q3, and an NMOS transistor Q4, so that the gradations of the liquid crystal cells 102R, 102G, and 102B are sequentially set.

The basic unit 151 sets the gradations of the liquid crystal cells 102R, 102G, and 102B by the selector 103 in the same order as described in the sixth and seventh embodiments. Thus pixel electrode potential correcting capacitances CG and CB are provided for the green liquid crystal cell 102G and the blue liquid crystal cell 102B. Incidentally, the pixel electrode potential correcting capacitances CG and CB are set in the same manner as described in the sixth and seventh embodiments. Incidentally, the gradations of the liquid crystal cells 102R, 102G, and 102B may be set in the order described in the eighth embodiment or the like, and a pixel electrode potential correcting capacitance may be provided by applying the method of the foregoing eighth embodiment or the like.

That is, in the display unit 142, basic units as shown in FIG. 33 are arranged in the form of a matrix, and liquid crystal cells 102R, 102G, and 102B of red, green, and blue are arranged in the form of a matrix, such that these liquid crystal cells 102R, 102G, and 102B continue sequentially and cyclically.

Storage capacitors CsR, CsG, and CsB of these liquid crystal cells 102R, 102G, and 102B of red, green, and blue in the basic unit 151 each have one terminal supplied with a driving signal CS involved in a precharge process, and each have another terminal connected to the pixel electrode of the corresponding liquid crystal cells 102R, 102G, and 102B. The common electrode of the liquid crystal cells 102R, 102G, and 102B is supplied with the driving power VCOM whose signal level is changed in such a manner as to be interlocked with the driving signal CS.

The memory unit 152 in the basic unit 151 is an SRAM (Static Random Access Memory) formed by a CMOS inverter of an NMOS transistor Q5 and a PMOS transistor Q6 whose gates are connected to each other and whose drains are connected to each other and a CMOS inverter of a similar NMOS transistor Q7 and a similar PMOS transistor Q8. The memory unit 152 outputs an output RAM corresponding to the logical level of the signal line SIG and an inverted output having an opposite logical level from the output RAM to the NMOS transistors Q3 and Q4, respectively. The memory unit 152 thereby subjects these transistors Q3 and Q4 to complementary on-off control. The memory unit 152 is connected to the signal line SIG via an NMOS transistor Q11, which performs an on operation according to a gate signal GATED.

Figure 34:
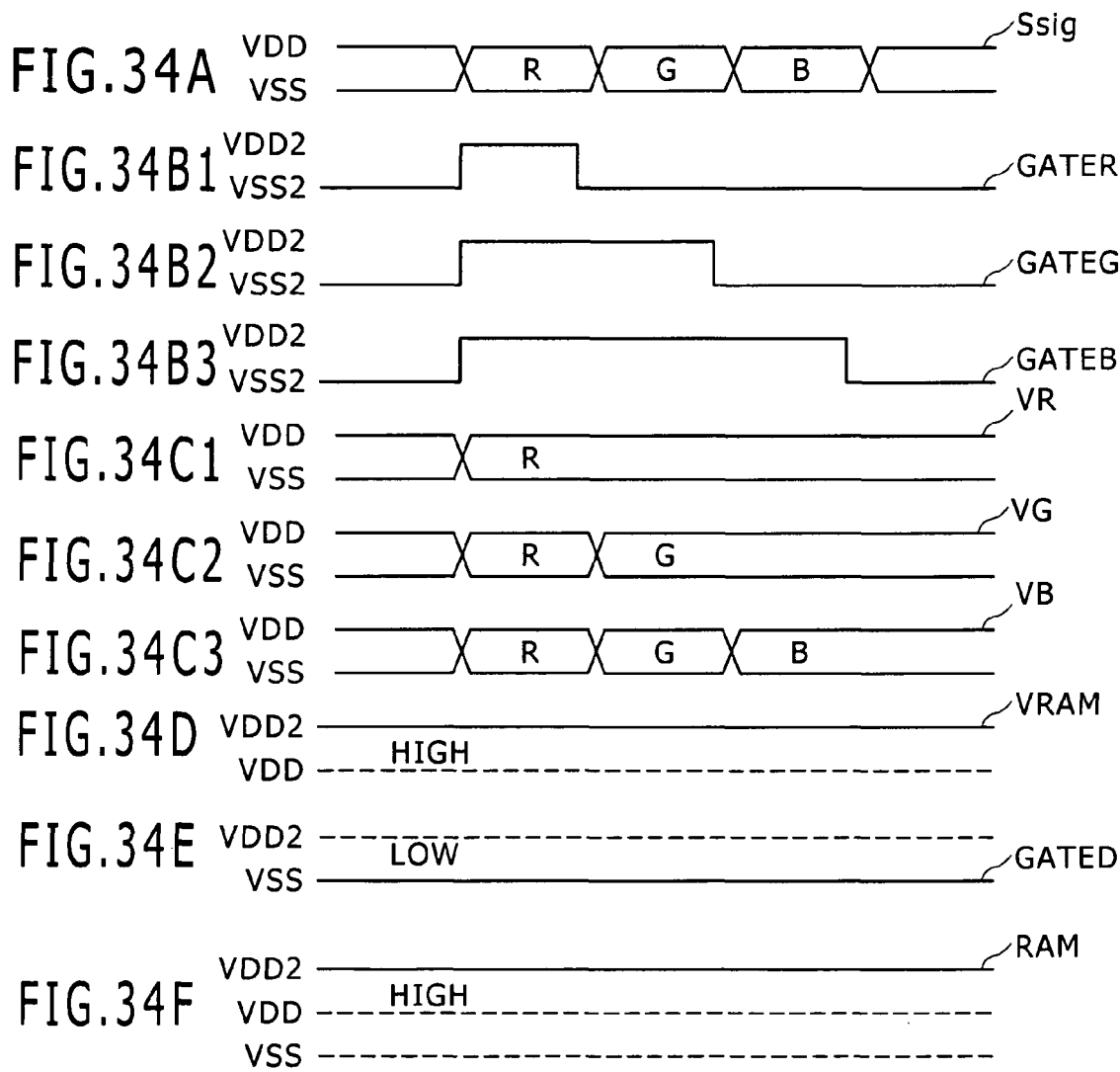
Figure 35:
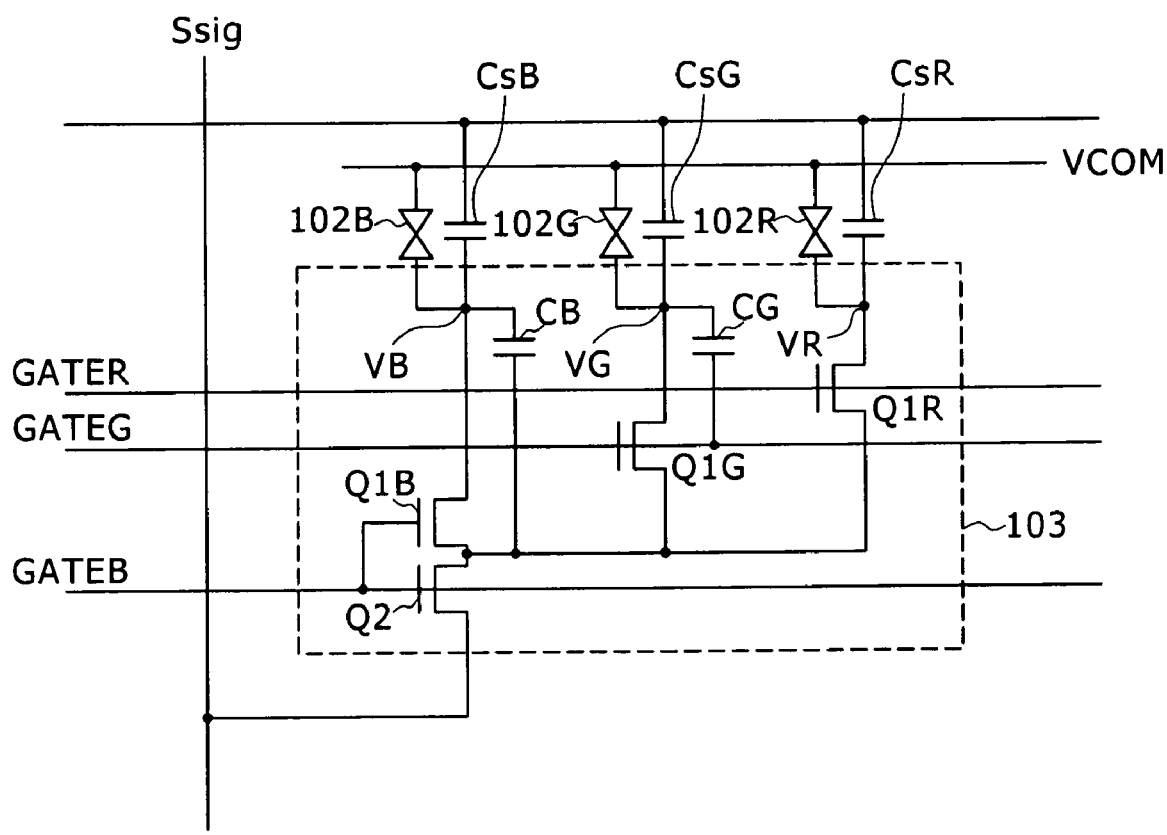
FIG. 35 is a connection diagram of assistance in explaining the operation of the basic unit of FIG. 33 in the analog driving system.

In the basic unit 151, as shown in FIGS. 34A to 34F and FIG. 35, in the case of the analog driving system, the horizontal driving unit 146 and the vertical driving unit 147 set the memory unit 152 in advance so that the transistor Q3 is set in an on state (FIGS. 34D and 34E), and thereafter sequentially change settings of the gate signals GATER, GATEG, and GATEB (FIGS. 34B1 to 34B3), whereby the liquid crystal cells 102R, 102G, and 102B are sequentially connected to the signal line SIG, as shown in FIG. 35. Incidentally, FIG. 35 is a diagram showing a simplified configuration of the basic unit 151 by contrast with FIG. 33 for the description of the connection between the signal line SIG and the liquid crystal cells 102R, 102G, and 102B.

In the basic unit 151, in the case of the analog driving system, the horizontal driving unit 146 sequentially sets the driving signal Ssig of the signal line SIG to gradation voltages R, G, and B indicating the gradations of the liquid crystal cells 102R, 102G, and 102B, respectively (FIG. 34A). The settings of the gate signals GATER, GATEG, and GATEB are changed sequentially in such a manner as to correspond to the settings of the signal line SIG (FIGS. 34B1 to 34B3). Thereby the basic unit 151 sets pixel electrode potentials VR, VG, and VB of the liquid crystal cells 102R, 102G, and 102B to the gradation voltages R, G, and B by the driving signal Ssig. Thereby the basic unit 151 sets the gradations of the liquid crystal cells 102R, 102G, and 102B by the analog driving system.

On the other hand, at a time of advance setting of the memory unit 152 in the analog driving system, or at a time of writing by the memory system, as shown in FIGS. 36A to 36F and FIG. 37, the basic unit 151 sets the transistors Q1R, Q1G, and Q1B in an off state by the gate signals GATER, GATEG, and GATEB (FIGS. 36B1 to 36B3 and 36C1 to 36C3), temporarily lowers the power supply voltage VRAM of the memory unit 152 to a voltage VDD corresponding to the H-level of the signal line SIG (FIGS. 36A and 36D), and sets the transistor Q11 in an on state by the gate signal GATED, so that the memory unit 152 is connected to the signal line SIG (FIG. 36E). Thereby the basic unit 151 sets the logical level of the driving signal Sdv output to the signal line SIG in the memory unit 152 (FIG. 36F). The basic unit 151 thereafter raises the power supply voltage VRAM to a voltage VDD2 corresponding to the driving voltage of the liquid crystal cells 102R, 102G, and 102B (FIGS. 36D and 36F), and thus sets the power supply voltage VRAM such that the transistors Q3 and Q4 can be controlled to be on or off. Incidentally, FIG. 37 is a diagram showing a simplified configuration of the basic unit 151 shown in FIG. 33 for the description of the operation of the memory unit 152.

In the basic unit 151, at a time of advance setting of the memory unit 152 in the analog driving system, the signal line SIG is set to an H-level by the horizontal driving unit 146, and the above series of operations is performed, whereby the memory unit 152 is set such that the transistor Q3 is set in an on state. At a time of writing by the memory system, on the other hand, the signal line SIG is set to the logical value of image data DV by the horizontal driving unit 146, whereby the logical value of the image data DV is set in the memory unit 152. When the logical value is at an H-level, the memory unit 152 is set such that the transistor Q3 is set in an on state. When the logical value is at an L-level, on the other hand, the memory unit 152 is set such that the transistor Q4 is set in an on state.

Figure 39:
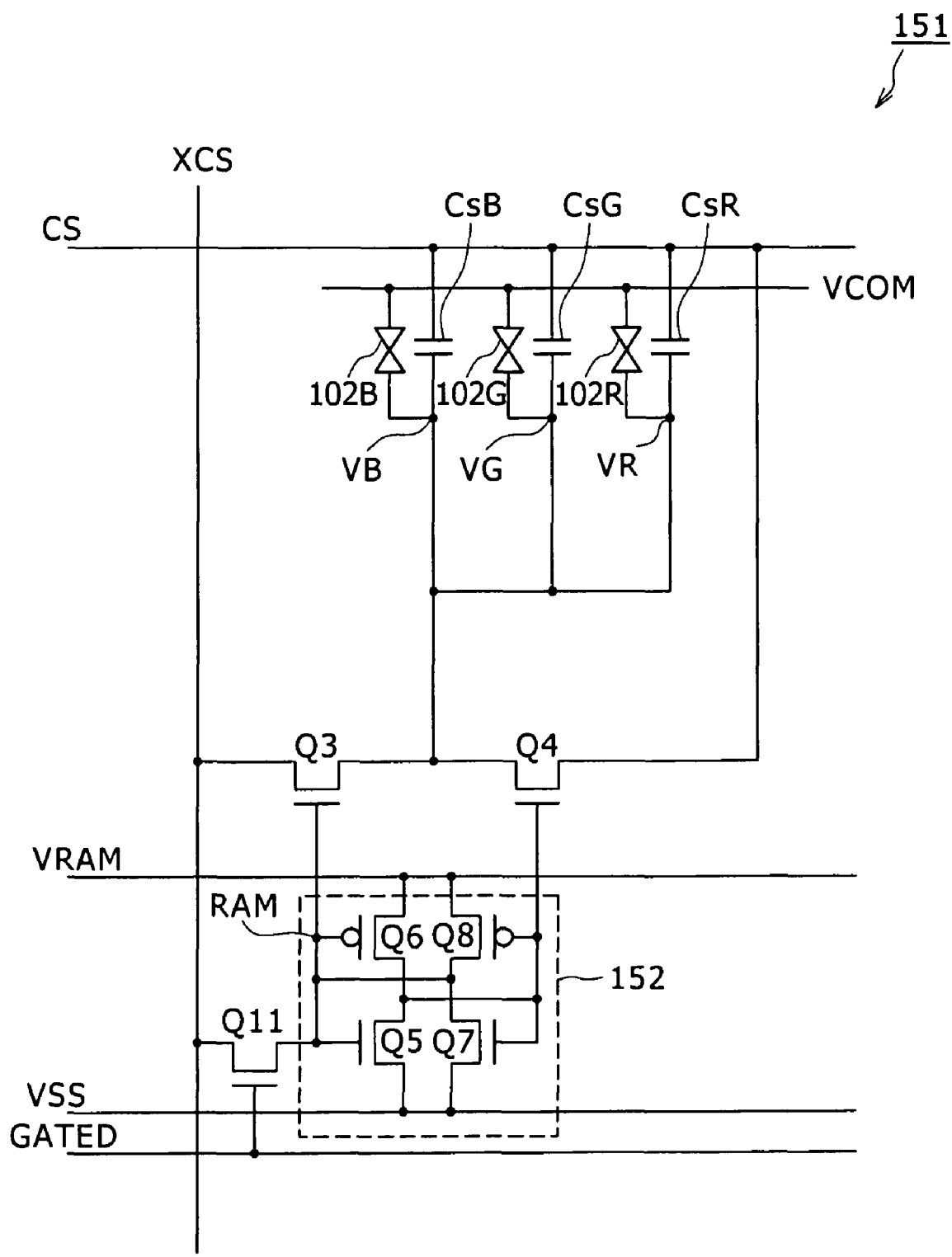
FIG. 39 is a connection diagram of assistance in explaining the operation of the basic unit of FIG. 33 by the memory system.

At a time of display by the memory system, in the basic unit 151, as shown in FIGS. 38A to 38G and FIG. 39, the inverted signal XCS of the driving signal CS, the signal level of the inverted signal XCS being changed complementarily to the driving signal CS, is supplied from the horizontal driving unit 146 to the signal line SIG (FIGS. 38A and 38B). In addition, the gate signals GATER, GATEG, and GATEB are supplied from the horizontal driving unit 146 so as to make all of the transistors Q1R, Q1G, Q1B, and Q2 perform an on operation (FIGS. 38C1 to 38C3). The basic unit 151 selectively sets the transistor Q3 or Q4 in an on state according to the logical value set in the memory unit 152, and thereby selectively supplies the inverted signal XCS or the driving signal CS to the pixel electrodes of the liquid crystal cells 102R, 102G, and 102B (FIGS. 38D1 to 38D3). The liquid crystal cells 102R, 102G, and 102B are thereby set to a black gradation or a white gradation in correspondence with the logical value of the image data DV set in the memory unit 152. Incidentally, FIG. 39 is a diagram showing a simplified configuration of the basic unit 151 shown in FIG. 33 for the description of the display by the memory system.

According to the present embodiment, similar effects to those of the foregoing embodiments can be obtained also in the case of the memory system and the case of switching between the memory system and the analog driving system.

Eleventh Embodiment

It is to be noted that while in the foregoing embodiments, description has been made of cases where a pixel electrode potential correcting capacitance is created by changing the size of the pixel electrode or changing the shape of a wiring pattern to the pixel electrode, the present invention is not limited to this. Various methods are widely applicable to a method of creating a pixel electrode potential correcting capacitance in for example a case of creating a pixel electrode potential correcting capacitance by shifting the position of a scanning line and thereby setting an amount of overlap between the pixel electrode and the scanning line and a case of creating a pixel electrode potential correcting capacitance by creating a separate counter electrode.

In addition, in the foregoing embodiments, description has been made of a case where three liquid crystal cells of red, green, and blue are assigned to one selector. However, the present invention is not limited to this. The present invention is widely applicable to for example cases where two consecutive liquid crystal cells are assigned to one selector and cases where four or more liquid crystal cells are assigned to one selector.

The present invention is applicable to a liquid crystal display device that switches operation between the analog driving system and the memory system, for example. In addition, the present invention is applicable to a liquid crystal display device based on the so-called intra-pixel selector system.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device for displaying a desired image by a display unit, said display unit being formed by sandwiching a liquid crystal layer between a thin film transistor substrate and a color filter substrate and arranging liquid crystal cells formed by said liquid crystal layer in a form of a matrix,
wherein said thin film transistor substrate is created by disposing at least a transistor used to drive said liquid crystal cell and a pixel electrode of said liquid crystal cell on an insulating substrate, and
a part or all of a storage capacitor of an adjacent liquid crystal cell is created in a layer below said pixel electrode with a shield layer interposed between said pixel electrode and said storage capacitor, and further wherein the shield layer is maintained at a redetermined fixed potential.

2. The liquid crystal display device according to claim 1, wherein counter electrodes of said storage capacitor are formed by a gate layer of said transistor and a wiring layer of said transistor, and
said shield layer is formed by a wiring layer for connecting said transistor to said pixel electrode.

3. The liquid crystal display device according to claim 1, wherein said transistor is
a transistor of a memory unit, said memory unit being assigned to a plurality of said liquid crystal cells adjacent to each other and recording a gradation of said plurality of liquid crystal cells adjacent to each other, and
a transistor for setting the gradation of said liquid crystal cells according to a recording of said memory unit.

4. The liquid crystal display device according to claim 1, wherein said transistor is a transistor that switches operation between a memory system and an analog driving system, and sets a gradation of said liquid crystal cell.

5. A liquid crystal display device for displaying a desired image by a display unit, said display unit being formed by sandwiching a liquid crystal layer between a thin film transistor substrate and a color filter substrate and arranging liquid crystal cells formed by said liquid crystal layer in a form of a matrix,
wherein said thin film transistor substrate is created by disposing at least a transistor used to drive said liquid crystal cell and a pixel electrode of said liquid crystal cell on an insulating substrate, and
a storage capacitor of said liquid crystal cell is created by a first counter electrode, a second counter electrode connected to said pixel electrode, and a third counter electrode connected to said first counter electrode in a layer below said pixel electrode, and further wherein a shield layer between the pixel electrode and the storage capacitor is maintained at a predetermined fixed potential.

6. The liquid crystal display device according to claim 5, wherein said first counter electrode is formed by a wiring layer for connecting said transistor to said pixel electrode,
said second counter electrode is formed by a wiring layer of said transistor, and
said third counter electrode is formed by a gate layer of said transistor.

7. An image displaying method of a liquid crystal display device for displaying a desired image by a display unit, said display unit being formed by sandwiching a liquid crystal layer between a thin film transistor substrate and a color filter substrate and arranging liquid crystal cells formed by said liquid crystal layer in a form of a matrix, said image displaying method comprising the steps of:
forming said thin film transistor substrate by disposing at least a transistor used to drive said liquid crystal cell and a pixel electrode of said liquid crystal cell on an insulating substrate; and
creating a part or all of a storage capacitor of an adjacent liquid crystal cell in a layer below said pixel electrode with a shield layer interposed between said pixel electrode and said storage capacitor, and further wherein the shield layer is maintained at a predetermined fixed potential.

8. An image displaying method of a liquid crystal display device for displaying a desired image by a display unit, said display unit being formed by sandwiching a liquid crystal layer between a thin film transistor substrate and a color filter substrate and arranging liquid crystal cells formed by said liquid crystal layer in a form of a matrix, said image displaying method comprising the steps of:
forming said thin film transistor substrate by disposing at least a transistor used to drive said liquid crystal cell and a pixel electrode of said liquid crystal cell on an insulating substrate; and
creating a storage capacitor of said liquid crystal cell by a first counter electrode, a second counter electrode connected to said pixel electrode, and a third counter electrode connected to said first counter electrode in a layer below said pixel electrode, and further wherein a shield layer between the pixel electrode and the storage capacitor is maintained at a predetermined fixed potential.

9. A liquid crystal display device for displaying a desired image by a display unit formed by sequentially arranging a basic unit,
   wherein said basic unit includes
      a plurality of liquid crystal cells and
      a selector for sequentially setting gradations of said plurality of liquid crystal cells by sequentially setting pixel electrodes of said plurality of liquid crystal cells to a setting of a signal line by a transistor performing on-off operation according to a gate signal, and
   a setting is made so as to increase a capacitance between said pixel electrode of a liquid crystal cell to which a gradation is set later among said plurality of liquid crystal cells and a scanning line for the corresponding said gate signal, and further wherein a shield layer between the pixel electrode and the storage capacitor is maintained at a predetermined fixed potential.

10. The liquid crystal display device according to claim 9, wherein said capacitance is formed by an overlap between said pixel electrode and said scanning line.

11. The liquid crystal display device according to claim 9, wherein said capacitance is formed by an overlap between a wiring pattern to said pixel electrode and said scanning line.

12. The liquid crystal display device according to claim 9, wherein said basic unit further includes a memory unit for recording a setting of said signal line, and
said selector sequentially sets the gradations of said plurality of liquid crystal cells by sequentially setting the setting of said signal line, the setting of said signal line being recorded in said memory unit, to said plurality of liquid crystal cells.

* * * * *